United States Patent
Uehara

(10) Patent No.: US 7,288,712 B2
(45) Date of Patent: Oct. 30, 2007

(54) MUSIC STATION FOR PRODUCING VISUAL IMAGES SYNCHRONOUSLY WITH MUSIC DATA CODES

(75) Inventor: Haruki Uehara, Shizuoka (JP)

(73) Assignee: Yamaha Corporation, Shizuoka-Ken (JP)

( * ) Notice: Subject to any disclaimer, the term of this patent is extended or adjusted under 35 U.S.C. 154(b) by 366 days.

(21) Appl. No.: 11/031,724

(22) Filed: Jan. 7, 2005

(65) Prior Publication Data

US 2005/0150362 A1 Jul. 14, 2005

(30) Foreign Application Priority Data

| Jan. 9, 2004 | (JP) | 2004-004570 |
| Jan. 9, 2004 | (JP) | 2004-004571 |
| Jan. 9, 2004 | (JP) | 2004-004572 |

(51) Int. Cl.
G10H 7/00 (2006.01)
G10H 1/00 (2006.01)
G06F 3/048 (2006.01)
G06F 3/00 (2006.01)

(52) U.S. Cl. .......... 84/645; 84/477 R; 84/609; 386/96; 709/248; 715/709; 715/777; 725/110; 707/104.1

(58) Field of Classification Search .......... None
See application file for complete search history.

(56) References Cited

U.S. PATENT DOCUMENTS

| 5,623,591 | A | * | 4/1997 | Cseri | 715/762 |
| 5,737,531 | A | * | 4/1998 | Ehley | 709/208 |
| 5,745,716 | A | * | 4/1998 | Tchao et al. | 715/777 |
| 5,761,439 | A | * | 6/1998 | Kar et al. | 709/248 |
| 5,864,868 | A | * | 1/1999 | Contois | 707/104.1 |
| 5,886,273 | A | * | 3/1999 | Haruyama | 84/478 |
| 6,143,973 | A | * | 11/2000 | Kikuchi | 84/645 |
| 6,204,441 | B1 | * | 3/2001 | Asahi et al. | 84/470 R |
| 6,247,072 | B1 | * | 6/2001 | Firestone | 710/53 |
| 6,323,883 | B1 | * | 11/2001 | Minoura et al. | 715/784 |
| 6,388,181 | B2 | * | 5/2002 | Moe | 84/477 R |
| 6,449,653 | B2 | * | 9/2002 | Klemets et al. | 709/231 |
| 6,480,902 | B1 | * | 11/2002 | Yuang et al. | 709/248 |

(Continued)

FOREIGN PATENT DOCUMENTS

JP 5-173546 7/1993

(Continued)

*Primary Examiner*—Lincoln Donovan
*Assistant Examiner*—Christina Russell
(74) *Attorney, Agent, or Firm*—Harness, Dickey & Pierce, PLC

(57) ABSTRACT

In order to make a tutor give a remote music lesson to a trainee, the audio-visual station transmits MIDI music data codes/time stamp data codes and click time data codes through a packet switching network and an audio-visual signal, which expresses real images of tutor's hands on the keyboard, and click signal through a teleconference system to another audio-visual station; the controller for the trainee makes the internal clock synchronous with the internal clock for the tutor through the pairing work between the click time data codes and the click signals so that the images of note bars and real images are synchronously produced on a display unit in front of the trainee's keyboard; moreover, while the tutor's exhibition is being carried out, any oral direction does not reach the trainee so that the trainee concentrate himself to the exhibition.

20 Claims, 30 Drawing Sheets

U.S. PATENT DOCUMENTS

| | | | |
|---|---|---|---|
| 6,512,884 B1 * | 1/2003 | Sawada | 386/96 |
| 6,516,323 B1 * | 2/2003 | Kamba | 707/104.1 |
| 6,520,410 B2 * | 2/2003 | Putman et al. | 235/380 |
| 6,538,998 B1 * | 3/2003 | Garimella | 370/241 |
| 6,654,950 B1 * | 11/2003 | Barnishan | 717/136 |
| 6,660,922 B1 * | 12/2003 | Roeder | 84/477 R |
| 6,667,751 B1 * | 12/2003 | Wynn et al. | 715/833 |
| 6,691,138 B1 * | 2/2004 | Kirkpatrick et al. | 707/204 |
| 6,741,268 B1 * | 5/2004 | Hayakawa | 715/777 |
| 6,842,877 B2 * | 1/2005 | Robarts et al. | 715/708 |
| 6,857,130 B2 * | 2/2005 | Srikantan et al. | 725/93 |
| 6,924,425 B2 * | 8/2005 | Naples et al. | 84/609 |
| 7,098,392 B2 * | 8/2006 | Sitrick et al. | 84/477 R |
| 7,106,298 B1 * | 9/2006 | Turner et al. | 345/156 |
| 7,174,510 B2 * | 2/2007 | Salter | 715/709 |
| 2002/0004191 A1 * | 1/2002 | Tice et al. | 434/350 |
| 2002/0162445 A1 * | 11/2002 | Naples et al. | 84/610 |
| 2002/0174202 A1 * | 11/2002 | Kohyama et al. | 709/220 |
| 2003/0153992 A1 * | 8/2003 | Maruyama et al. | 700/83 |
| 2004/0060070 A1 * | 3/2004 | Mizushima | 725/110 |
| 2005/0169532 A1 * | 8/2005 | Yamana et al. | 382/200 |
| 2006/0053455 A1 * | 3/2006 | Mani et al. | 725/87 |

FOREIGN PATENT DOCUMENTS

| | | |
|---|---|---|
| JP | 7-199790 | 8/1995 |
| JP | 2000-3171 | 1/2000 |
| JP | 3058051 | 4/2000 |

\* cited by examiner

MUSIC STATION FOR PRODUCING VISUAL IMAGES SYNCHRONOUSLY WITH MUSIC DATA CODES

FIELD OF THE INVENTION

This invention relates to an audio-visual system and, more particularly, to a music station incorporated in an audio-visual system and communicable through plural communication channels to another music station.

DESCRIPTION OF THE RELATED ART

It is not easy for trainees to make good progress in fingering on musical instruments. Various music education support systems have been proposed to the trainees. For example, a typical example of the music education support system is disclosed in Japanese Patent Application laid-open No. Hei 5-173546. The prior art music education support system is provided in association with a keyboard such as, for example, a piano. Guide indicators are arranged in the vicinity of the black/white keys, respectively, and are sequentially indicative of the keys to be depressed by the trainee. First, a controller, which is connected to the guide indicators through a cable, instructs the guide indicators to emit green light slightly before the timing to depress the associated keys and, thereafter, change the light from the green to red at the timing. The trainee gets ready to depress the keys under the guidance of the green light, and depresses the keys at the timing to change the light to the red.

Another prior art music education support system indicates the five finger positions on the keyboard by using the light emitting diodes, and a controller, which is also connected to the light emitting diodes through a cable, changes the five energized light emitting diodes to indicate the finger positions along the music passage. Yet another prior art music education support system produces messages "OPEN" and "CLOSE" for the guidance of the fingering.

The above-described prior art music education support systems are categorized in a group which guides the trainee by directly indicating the keys to be depressed.

The second prior art group is featured by images on a display unit. Trainees are guided through the picture on the display unit. A typical example of the prior art music education support system categorized in the second group is disclosed in Japanese Patent Application laid-open No. 2000-3171, and the prior art music education support system is capable of producing a performance on the basis of pieces of MIDI (Musical Instrument Digital Interface) music data. Pieces of guide data, which represent the fingers to be used for depressing the keys, are further stored in the prior art music education support system in association with the pieces of duration data. While a trainee is fingering on the keyboard, the controller produces images of hands on a display unit, and selectively makes the fingers to be used tremble on the display unit at the timing to depress the keys.

Another prior art music education support system categorized in the second group is disclosed in Japanese Patent No. 3058051. The prior art music education support system reproduces images of notes on the staff or images of symbols of the notes on the display unit, and scrolls the images along the music passage. The image scrolling is also disclosed in U.S. Pat. No. 6,388,181 B2.

The third group is featured by voice messages of a tutor. A typical example of the music education support system is illustrated in FIG. 1. The prior art music education support system is broken down into a master audio-visual station 50a, a slave audio-visual station 50b and the Internet 10. The master audio-visual station 50a is connected through the Internet 10 to the slave audio-visual station 50b, and audio data and visual/voice data are transmitted from the master audio-visual station 50a to the slave audio-visual station 50b for the remote lesson.

The master audio-visual station 50a includes a controller 51, a videophone 52 and an electronic keyboard 53. The electronic keyboard 53 includes an array of keys, a key switch circuit (not shown) and a data processor (not shown), and the data processor is connected through a MIDI interface to the controller 51. While a tutor is fingering a pieces of music on the array of keys, the depressed keys and released keys cause the switch circuit to turn on and off, and the data processor monitors the switch circuit so as to produce and supply MIDI music data codes through the MIDI interface to the controller 51.

The controller 51 includes an internal clock 51a, a packet transmitter module 51b and a time stamper 51c. The internal clock 51a measures a lapse of time, and the time stamper 51c checks the internal clock 51a to see what time the MIDI music data codes arrive thereat. The packet transmitter module 51b produces packets in which the MIDI music data codes and time codes are loaded, and delivers the packets to the Internet 10.

While the tutor is performing the piece of music, the MIDI music data codes intermittently arrive at the time stamper 51c, and the time stamper 51c adds the time data codes representative of the arrival times to the MIDI music data codes. The time stamper 51c supplies the MIDI music data codes together with the time data codes to the packet transmitter module 51b, and the packet transmitter module 51b transmits the packets to the slave audio-visual station 50b through the internet 10.

The videophone 52 is independent of the electronic keyboard 53, and produces audio data codes representative of voice messages of the tutor and visual data codes from the scene where the tutor acts. The videophone 52 is connected to the Internet 10, and transmits the audio data codes and visual data codes to the slave audio-visual station 50b.

The slave audio-visual station 50b includes a controller 61, a videophone 62 and an automatic player piano 63. The controller 61 receives the MIDI music data codes and time data codes, and the MIDI music data codes are timely supplied from the controller 61 to the electronic keyboard 63 so that the automatic player piano 63 produces the tones along the music passage.

The videophones 52 and 62 form parts of a video conference system or a streaming system. While the audio data codes and visual data codes are arriving at the videophone 62, the videophone 62 produces the visual images and voice messages from the audio data codes and visual data codes.

The controller 61 includes an internal clock 61a, a packet receiver module 61b and a MIDI out buffer 61c. The packet receiver module 61b unloads the MIDI music data codes and time data codes from the packets, and the MIDI music data codes are temporarily stored in the MIDI out buffer 61c together with the associated time data codes. The MIDI out buffer 61c periodically checks the internal clock 61a to see what MIDI music data codes are to be transferred to the automatic player piano 63. When the time comes, the MIDI out buffer 61c delivers the MIDI music data code or codes to the automatic player piano 63, and the solenoid-operated key actuators (not shown) give rise to the key motion along the piece of music.

The trainee moves his or her fingers under the guidance of the solenoid-operated key actuators, and hears oral directions through the monitor unit 62a.

Yet another prior art music education system includes a master station and plural slave stations as disclosed in Japanese Patent Application laid-open No. Hei 7-199790. A tutor at the master station monitors the tones produced by trainees at the slave stations to see whether or not the trainees properly play a piece of music on the keyboards at the slave stations, and gives oral instructions to the trainees through the monitor units.

The trainees express their complains about the prior art music education support systems. As to the first group, the trainees say that they can not understand how to move their fingers to the keys to be depressed. There are various techniques to be practiced. For example, the trainees must pass their middle fingers under the thumbs and move their middle fingers over the thumbs. When a trainee needs to repeatedly depress a key at high speed, he or she must depress the key with both first fingers. However, the prior art music education support systems of the first group merely indicate the keys to be depressed. Although the prior art music education support system of the second group gives the guidance through the images of the hands produced on the display unit, the controller merely makes the images of the fingers tremble, and does not give any image how to move the fingers on the keyboard.

Another complaint about the second group is that a time lag is liable to take place between the images and the tones. In case where the source of music/visual data is remote from the musical instrument, the time lag becomes serious. This is because of the fact that the MIDI music data and image data are asynchronously transmitted to the musical instrument.

A complaint about the third group is that the trainees hardly capture the oral directions. This is because of the fact that the microphone at the master station picks up the electronic tones together the oral directions. A mute device such as a mixer is provided at the slave station, and the trainee manipulates the mute device for hearing the tutor's oral directions. The trainees feel the manipulation on the mute device troublesome. In other words, the trainees hardly concentrate themselves to the lesson.

As described hereinbefore, although various music education systems have been proposed, the prior art music education systems do not satisfy the trainees.

SUMMARY OF THE INVENTION

It is therefore an important object of the present invention to provide a music station, which makes the trainees satisfied.

In accordance with one aspect of the present invention, there is provided a music station for producing visual images of tones to be produced together with visual images of a performance comprising a receiver connected to a communication channel and receiving pieces of music data representative of the tones to be produced and pieces of first timing data mixed with the pieces of music data, another receiver connected to another communication channel independent of the communication channel and receiving pieces of video data representative of the performance carried out in synchronism with the tones produced at another station remote from the music station and pieces of second timing data mixed with the pieces of video data and delivered to the aforesaid another communication channel concurrently with the delivery of the pieces of first timing data to the communication channel, respectively, a timing adjuster connected to the receiver and the aforesaid another receiver, and eliminating a time lag from between each of the pieces of first timing data and associated one of the pieces of second timing data so as to establish the pieces of video data and the pieces of music data in synchronization with one another, a display unit having plural image producing areas at least two of which are assigned to images of the performance and visual images of the tones, respectively, and a display driver connected to the receiver, the aforesaid another receiver and the display unit, producing an image-carrying signal representative of the visual images of the performance and another image-carrying signal representative of the visual images of the tones and supplying the image-carrying signal and the aforesaid another image-carrying signal to the display unit so that the visual images of the performance and the visual images of the tones are produced in the at least two areas, respectively, in correlation with one another.

In accordance with another aspect of the present invention, there is provided a music station for producing visual images of tones comprising a receiver connected to a communication channel and receiving pieces of music data representative of the tones to be produced and pieces of time data each representative of a time at which associated one of the tones is to be produced, a display unit having an image producing area where the visual images of the tones are to be produced, a timing generator connected to the receiver and analyzing the pieces of time data so as to determine timings at which the visual images of the tones appear in the image producing area on the display unit, and a display driver connected to the receiver, the timing generator and the display unit, producing an image-carrying signal representative of the visual images of the tones on the basis of the pieces of music data and supplying the image-carrying signal to the display unit so as to produce the visual images of the tones in the image producing area on the display unit at the timings.

In accordance with yet another aspect of the present invention, there is provided a music station for producing a music passage of tones and voice comprising a receiver connected to a communication system, and receiving pieces of music data representative of the tones, a tone generating system connected to the receiver so as to produce the music passage of the tones, another receiver connected to the communication system and receiving pieces of audio data representative of the voice for producing an audio signal, a signal-to-sound converter for converting the audio signal to the voice, a controller connected between the receiver and the tone generating system and analyzing the tones to be produced to see whether or not a loudness of the tones exceeds a threshold for producing a control signal, and a switch connected between the aforesaid another receiver and the signal-to-sound converter and responsive to the control signal so as to interrupt the audio signal while the loudness is keeping over the threshold.

BRIEF DESCRIPTION OF THE DRAWINGS

The features and advantages of the music station will be more clearly understood from the following description taken in conjunction with the accompanying drawings, in which.

DESCRIPTION OF THE PREFERRED EMBODIMENTS

In the following description, term "MIDI music data" means messages defined in the MIDI protocols, and term "MIDI music data codes" is representative of the MIDI music data, which are coded in the formats defined in the MIDI protocols. Term "audio-visual data" is representative of visual images and/or voice. Term "analog audio-visual signal" is representative of an analog signal, which carries the audio-visual data, and term "audio-visual signal data codes" is representative of a digital signal, which carries the audio-visual data.

Term "click data" is information that a click occurs, and term "click time" is indicative of a time when a click occurs. Term "click time data" is information indicative of the click time. Term "click time data code" is a binary code representative of the clock time data. Term "click signal" is a predetermined pulse train representative of each click.

Term "stamp time" is indicative of a time when a MIDI music data code or codes are imprinted with the stamp time, and term "time stamp data" is representative of the stamp time. Term "time stamp data code" is a binary code representative of the time stamp data.

First Embodiment

Figure 1:
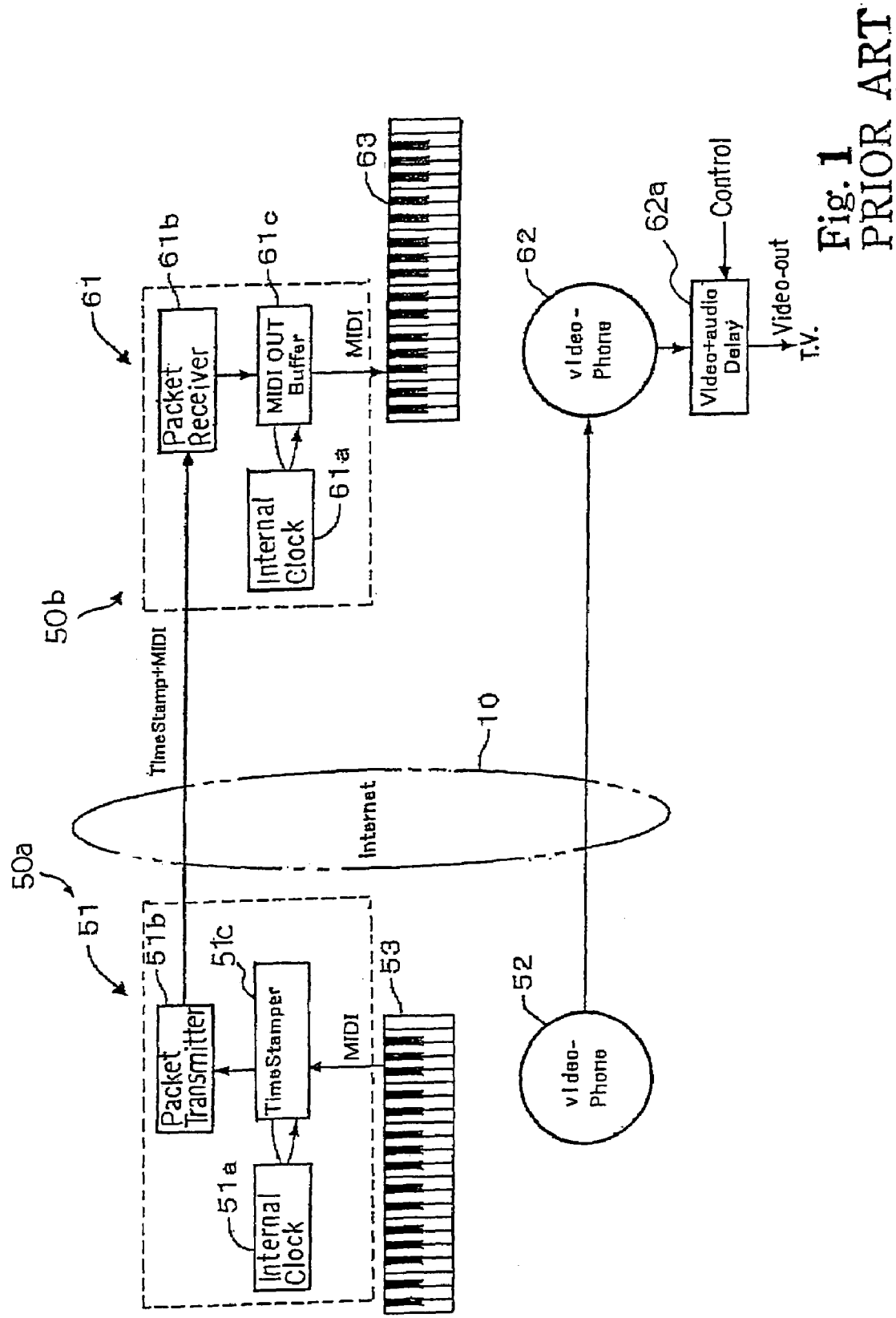
FIG. 1 is a schematic view showing the system configuration of the prior art music education system.
Figure 2:
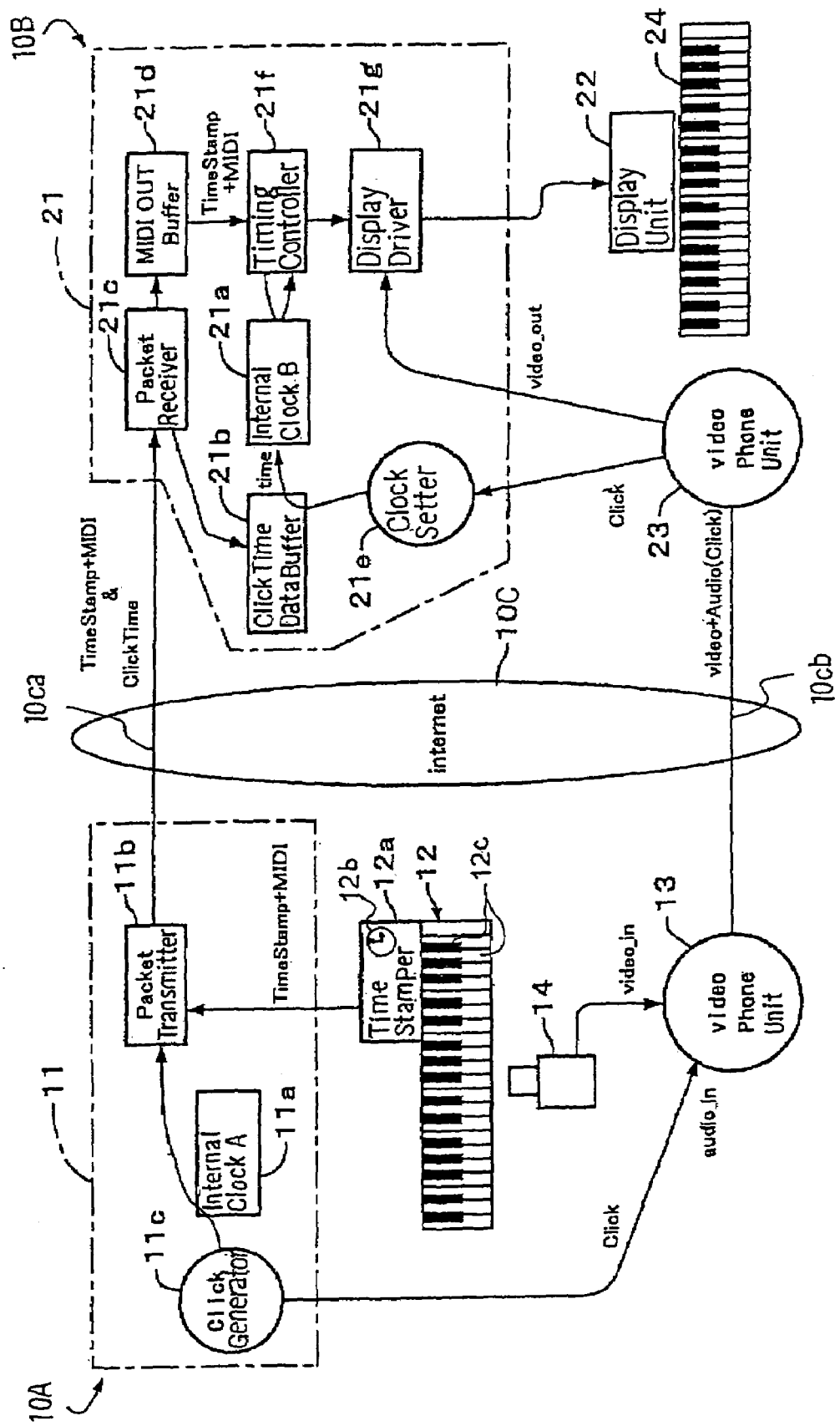
FIG. 2 is a schematic view showing the system configuration of a music education support system according to the present invention.

Referring to FIG. 2 of the drawings, an audio-visual system is illustrated as a music education support system. The music education support system embodying the present invention largely comprises an audio-visual station 10A, another audio-visual station 10B and communication channels 10C. The communication channel assigned to the MIDI music data, time stamp data and click time data is hereinafter referred to as "communication channel 10*ca*", and the other communication channel assigned to the audio-visual data and click data is hereinafter referred to as "communication channel 10*cb*". In this instance, the Internet serves as the communication channels 10*c*.

The audio-visual station 10A is communicable with the audio-visual station 10B through the communication channels 10C, and the MIDI music data/time stamp data/click time data and the audio-visual data/click data are independently transmitted from the audio-visual station 10A to the audio-visual station 10B through the communication channels 10C. The audio-visual station 10B compares the click time data with the click data to see whether or not the data processing is well synchronized with the data generation in the audio-visual station 10A. If the time difference is found, the audio-visual station 10B accelerates or retards the data processing on either MIDI music data or audio-visual data. Thus, the click data and click time data makes the audio-visual stations 10A and 10B synchronized with each other. The click data only expresses the fact that the click occurs. In other words, the click data is so simple that the audio-visual station 10B can clearly discriminate the occurrence of the click from the audio-visual data after the transmission through the communication channel 10*cb*. Even though the communication channel 10*cb* offers the base band data transmission to between the audio-visual station 10A and the audio-visual station 10B, the occurrence of the click is exactly reported to the audio-visual station 10B.

The audio-visual station 10A includes a controller 11, an electronic keyboard 12 and a videophone unit 13. While a tutor is fingering on the electronic keyboard 12, MIDI music data codes and time stamp data codes are periodically supplied from the electronic keyboard 12 to the controller 11. The controller 11 periodically produces a click, and imprints the MIDI music data with the click time. The controller 11 mixes the click time data codes with the MIDI music data codes and associated time stamp data codes, and transmits the click time data codes and MIDI music data codes/time stamp data codes to the audio-visual station 10B through the channel 10ca.

The videophone 13 picks up images of the tutor's hands and voice/electronic tones, and produces audio-visual codes. The controller 11 supplies the click signal to the videophone synchronously with the click time data code, and the videophone 13 mixes the click signal with the audio-visual codes so as to transmit the click signal and audio-visual signal to the audio-visual station 10B through the channel 10cb.

In this instance, the controller 11 is implemented by a personal computer system, and includes a microprocessor, a program memory, a working memory and interfaces. However, these components are not shown in FIG. 2. The microprocessor selectively runs on appropriate application programs, and cooperates with other system components so as to achieve functions of an internal clock "A" 11a, a packet transmitter module 11b and a click generator module 11c.

A time stamper module 12a is incorporated in the electronic keyboard 12, and is implemented by a built-in data processing system (not shown) of the electronic keyboard 12. The built-in data processing system runs on application programs so as to achieve given tasks. The electronic keyboard 12 includes keys 12c, a tone generator (not shown) and a sound system (not shown), and the plural keys 12c are selectively depressed and released by the tutor so as to generate and decay electronic tones. The tasks are to specify depressed/released keys 12c, produce MIDI music data codes, measure a lapse of time as an internal timer 12b, imprints the MIDI music data codes with the stamp time as the time stamper module 12a and so forth.

While the tutor is fingering on the keys 12c, the MIDI music data codes intermittently arrive at the time stamper module 11e. When a MIDI music data code or codes arrive at the time stamper module 11e, the time stamper 11e fetches the time stamp data representative of the stamp time from the internal clock 12b, and produces the time stamp data code. Thus, the MIDI music data code or codes are accompanied with the time stamp data code. The MIDI music data codes and associated time stamp data codes are supplied form the built-in data processing system to the packet transmitter module 11b of the controller 11.

The click generator module 11c start to produce the click data at the initiation of the transmission of packets, and periodically produces the click time data codes. In other words, the click periodically occurs in the click generator module 11c. When the click occurs, the click generator module 11c fetches the click time from the internal clock "A" 11a so as to produce the click time data code, and further produces the click signal. The click time data code is supplied to the packet transmitter module 11b, and the click signal is supplied to the videophone 13.

The packet transmitter module 11b is connected to the time stamper module 12a and click generator module 11c. The packet transmitter module 11b produces two sorts of packets. The packets of the first sort are assigned to the MIDI music data codes and associated time stamp data codes. On the other hand, the packets of the second sort are assigned to the click time data codes. The packets of the first sort are different in data bits in the header field from the packets of the second sort. Each packet of the first sort has data bits representative of the MIDI music data and associated time stamp data, i.e., the first sort together with the data bits representative of the addresses in the header field, and the music data codes and associated time stamp data codes are loaded in the payload data field. On the other hand, each packet of the second sort has the data bits representative of the click time data, i.e., the second sort together with the address bits in the header field, and the time stamp data code is loaded in the payload data field.

When the MIDI music data are imprinted with the stamp time, the MIDI music data codes and associated time stamp data code are supplied from the time stamper module 12a to the packet transmitter module 11b, and are loaded in the payload field of the packet or packets. The packet or packets are delivered to the Internet 10C, and are transmitted from the packet transmitter module 11b to the audio-visual station 10B.

On the other hand, when the time stamp data code is produced, the time stamp data code is supplied from the click generator module 11c to the packet transmitter module 11b, and is loaded in the payload data field of the packet. The packet is delivered to the Internet 10c, and is transmitted from the packet transmitter module 11b to the audio-visual station 10B.

The videophone unit 13 includes a digital circuit (not shown) and a movie camera/microphone 14. Though not shown in the drawings, at least an encoder and a digital mixer are incorporated in the digital circuit. The movie camera/microphone 14 are directed to the tutor, who is sitting in front of the electronic keyboard 12, and convert the images and voice/electronic tones to the audio visual data. While the tutor is fingering on the keyboard 12a and periodically giving oral directions, the movie camera/microphone 14 picks up the visual images of tutor's hands and oral directions/electronic tones, and convert the images and oral directions/electronic tones to the analog audio-visual signal. The analog audio-visual signal is supplied from the movie camera/microphone 14 to the digital circuit (not shown) in the videophone unit 13. The analog audio-visual signal is compressed and converted to the audio-visual data codes through the encoder (not shown). The audio-visual data codes are transmitted from the digital circuit (not shown) to the audio-visual station 10B through the communication channel 10cb as a digital mixed signal.

As described hereinbefore, the click signal, i.e., a predetermined pulse train is periodically produced in the click generator module 11c. The click signal is supplied from the click generator module 11c to the digital circuit (not shown). The click signal is mixed with the audio-visual data codes by means of the digital mixer (not shown), and the digital mixed signal, which contains audio-visual data and click data, is transmitted through the communication channel 10cb to the audio-visual station 10B. As described hereinbefore, the click time data code and MIDI music data codes are transmitted from the packet transmitter module 11b through the communication channel 10ca to the audio-visual station 10B as the packets. Although the different communication channels 10ca and 10cb are respectively assigned to the packets and the digital mixed signal, the digital mixed signal, which contains the click signal, and the packets, which contains the click time data code, are delivered to the communication channels 10ca and 10cb in such a manner that the click time data code and click signal arrive at the audio-visual station 10B almost concurrently. Even if a time difference occurs between the arrival of the click time data code and the arrival of the click signal, the audio-visual station 10B makes the click time data code paired with the corresponding click signal in so far as the time difference is fallen within a predetermined value.

The audio-visual station 10B includes a controller 21, a display unit 22, a videophone unit 23 and an electronic keyboard 24. A trainee sits on a stool in front of the electronic keyboard 24, and practices a music passage on the electronic keyboard 24. The image of tutor's hands on the keys 12c and images of note bars, which will be hereinafter described in detail, are produced on the display unit 22 so as to assist the trainee.

The controller 21 is also implemented by a personal computer system, and includes a microprocessor, a program memory, a working memory and interfaces. The microprocessor selectively runs on computer programs stored in a program memory (not shown), and achieves functions of an internal clock "B" 21a, a click time data buffer 21b, a packet receiver module 21c, a MIDI out buffer 21d, a clock setter module 21e, a timing controller 21f and a display driver 21g.

The internal clock "B" 21a measures a lapse of time, and is set with the click time data. The click time data codes are temporarily stored in the click time data buffer 21b, and the MIDI music data codes and associated time stamp data codes are accumulated in the MIDI out buffer 21d. The packets arrive at the packet receiver module 21c, and the packet receiver module 21c checks the header to see whether the payload is the MIDI music data codes/associated time stamp data code or the click time data codes. When the packet receiver module 21c decides that the payload is the MIDI music data code or codes and associated time stamp data code, the packet receiver module 21c transfers the MIDI music data code or codes and associated time stamp data code to the MIDI out buffer 21d, and the MIDI music data code or codes and associated time stamp data code are stored in the MIDI out buffer 21d. On the other hand, when the click time data code arrives at the packet receiver module 21c, the click time data code is transferred to the click time data buffer 21b, and is temporarily stored therein.

The clock setter 21e monitors the videophone unit 23, and checks the videophone unit 23 to see whether or not the click signal arrives thereat. While the videophone unit 23 is receiving the audio-visual data codes, the videophone unit 23 demodulates the audio-visual signal, and the clock setter 21e stands idle. However, when the click signal arrives at the videophone unit 23, the clock setter 21e reads out the click time data code from the click time data buffer 21b, and sets the internal clock "B" 21a to the click time represented by the click time data code.

The timing controller 21f reads out the time stamp data code from the MIDI out buffer 21d, and determines the timing at which the electronic tones are to be produced on the basis of the associated MIDI music data code or codes. The internal clock "B" 21a offers a reference time to the timing controller 21f, and the timing controller 21f determines the timing on the passage of the reference time. The timing controller supplies a timing signal to the display driver 21g at the timing.

The videophone 23 receives the digital mixed signal, and separates the digital mixed signal into the click signal and the audio-visual signal. The click signal is supplied to the clock setter 21e as described hereinbefore. The audio-visual signal is supplied to the display driver 21g, and reproduces the images of tutor's hands on the display unit 22.

The display driver 21g is responsive to the timing signal so as to change the images of note bars, which guide the fingers of the trainee to the keys to be depressed on the display unit 22. The display driver 21g is further responsive to the audio-visual data codes so as to reproduce the real images of tutor's hands on the display unit 22. In other words, the display driver 21g supplies an image-carrying signal representative of the real images and another image-carrying signal representative of the images of note bars to the display unit 22a so that the real images and images of note bars are produced in correlation with one another. The tutor's oral directions and electronic tones are reproduced through the videophone 23 so that the tutor gives the lesson to the trainee through the real images of tutor's hands, electronic tones and oral directions in association with the images of note bars. Since the click signal and click time codes make the images of note bars synchronized with the real images of tutor's hands and electronic tones, it is easy for the trainee to understand the tutor's oral directions and how to move the fingers.

Figure 3:
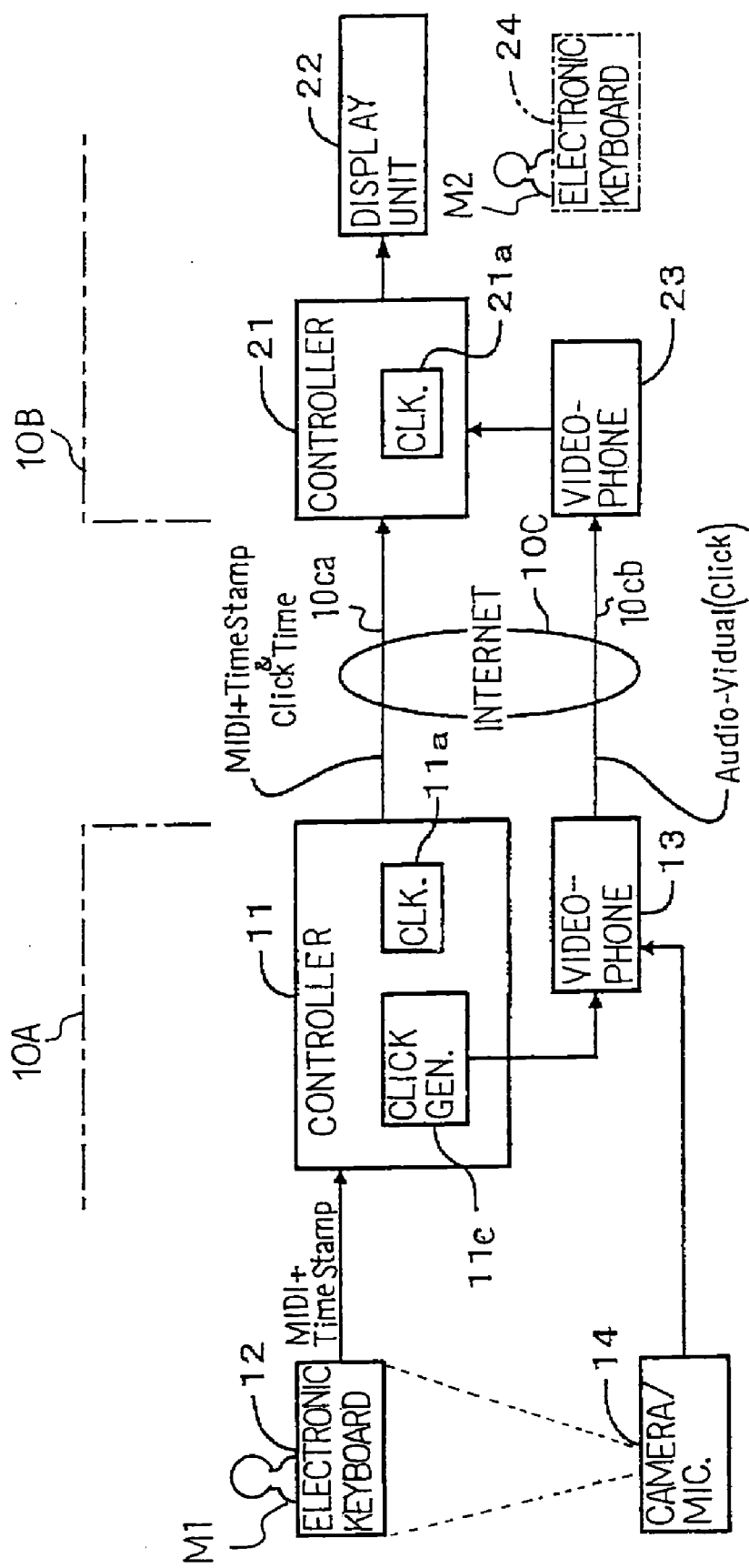
FIG. 3 is a block diagram showing audio-visual stations and communication channels incorporated in the music education support system.

A tutor M1 is assumed to give a lesson to a trainee M2 through the music education support system as shown in FIG. 3. The audio-visual station 10A is remote from the audio-visual station 10B, and the controller 11, which is implemented by the personal computer system, is connected to the controller 21, which is also implemented by the personal computer system, through the Internet 10C. A packet switching network forms an important part of the communication channel 10ca, and the click time data codes and MIDI music data codes/associated time stamp data codes are transmitted through the communication channel 10ca as the payload of the packets. On the other hand, a teleconference system or a stream system forms an important part of the other communication channel 10cb, and the digital mixed signal, i.e., the audio-visual data codes and click signal are transmitted through the other communication channel 10cb as pieces of real time data. However, the teleconference system or steam system is not synchronized with the packet switching network.

While the tutor M1 is teaching the trainee M2 the fingering on the electronic keyboard 12, the electronic keyboard 12 intermittently supplies the MIDI music data codes representative of the electronic tones and associated time stamp data codes to the controller 11, and controller 11 periodically produces the click time data codes. The controller 11 further produces the click signal CK concurrently with the click time data codes, and supplies the click signal CK to the videophone 13. In this instance, a periodical signal serves as the click signal CK (see FIG. 4), and is easily discriminated from the audio-visual signal. The click signals CK are periodically produced, and are respectively paired with the click time data codes CLD.

The movie camera/microphone 14 is located at a space over the electronic keyboard 12, and is directed to the tutor's hands on the array of keys 12c. The movie camera/microphone 14 picks up the images of the tutor's hands and the electronic tones/oral directions, and supplies the analog audio-visual signal representative of the images of tutor's hands and electronic tones/oral directions to the videophone 13. The keys 12c depressed by the tutor's fingers are well synchronized with the images of the tutor's hands and electronic tones. The videophone 13 produces the digital mixed signal from the audio-visual signal and click signal as described hereinbefore.

Figure 4:
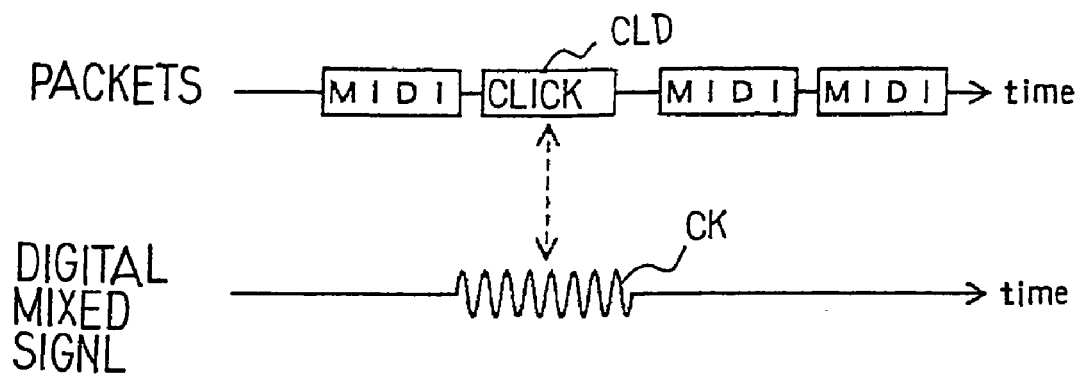
FIG. 4 is a waveform diagram showing a click signal concurrently produced with a click time data code.

The controller 11 loads the MIDI music data codes/time stamp data codes and the click time data codes in the packets in a real time fashion, and transmits the packets to the controller 21 through the communication channel 10ca. On the other hand, the videophone 13 transmits the digital mixed signal to the videophone 23 through the communication channel 10cb also in a real time fashion. Since the click signal CK is produced concurrently with the click time data code, the videophone 13 delivers the click signal CK, which is a part of the digital mixed signal, to the communication channel 10cb synchronously with the delivery of the associated click time data code CLD to the communication channel 10ca as shown in FIG. 4.

Even though the click signal CK is delivered concurrently with the corresponding click time data code CLD, there is not any guarantee that the packets, the payload of which are the click time data codes, arrive at the controller 21 concurrently with the arrival of the associated click signal CK at the videophone 23. Moreover, there is also not guaranteed that the internal clock "B" 21a is synchronized with the internal clock "A" 11a. However, the click signal CK makes the clock setter 21e periodically set the internal clock "B" 21a with the click signal CK. This results in that the synchronization between the internal clock "B" and the internal clock "A" 11a.

When the packets arrive at the controller 21, the packet receiver module 21c selectively transfers the MIDI music data codes/associated time stamp data codes and the click time data codes to the MIDI out buffer 21d and the click time data buffer 21b. On the other hand, the digital mixed signal successively conveys the audio-visual data codes and click signals to the videophone 23, and the videophone 23 separates the digital mixed signal into the click signals and the audio-visual data codes so as to transfer the audio visual data codes and click signals to the display driver 21g and the clock setter 21e, respectively.

The clock setter 21e is responsive to each click signal CK so as to set the internal clock "B" 21a with the click time indicated by the click time data code CLD. Thus, the internal clock "B" 21a is periodically synchronized with the internal clock "A" 11a.

The timing controller 21f compares the click time indicated by the click time data codes already stored in the MIDI out buffer 21d with the time indicated by the internal clock "B" 21a to see whether or not the associated MIDI music data codes are to be processed. When the answer is given affirmative, the display driver 21g produces the images of the note bars corresponding to the electronic tones to be produced on a certain area of the display unit 22 and the images of the tutor's hands on another area of the display unit 22. Since the timing at which the images of tutor's hands are to be reproduced is marked with the click signal CK, the real images of tutor's hands are synchronously reproduced together with the images of the note bars, and the oral directions are timely given to the trainee. Thus, the tutor M1 gives the lesson to the trainee M2 as if they are close to each other.

The real images of tutor's hands are moved on the display unit 22 in the similar manner to the tutor's hands on the keys 12c. When the tutor M1 passes the thumb under the middle finger, the image of thumb also passes under the image of the middle finger on the display unit 22. For this reason, the trainee M2 well understands what the tutor M1 teaches him or her.

Figure 5A:
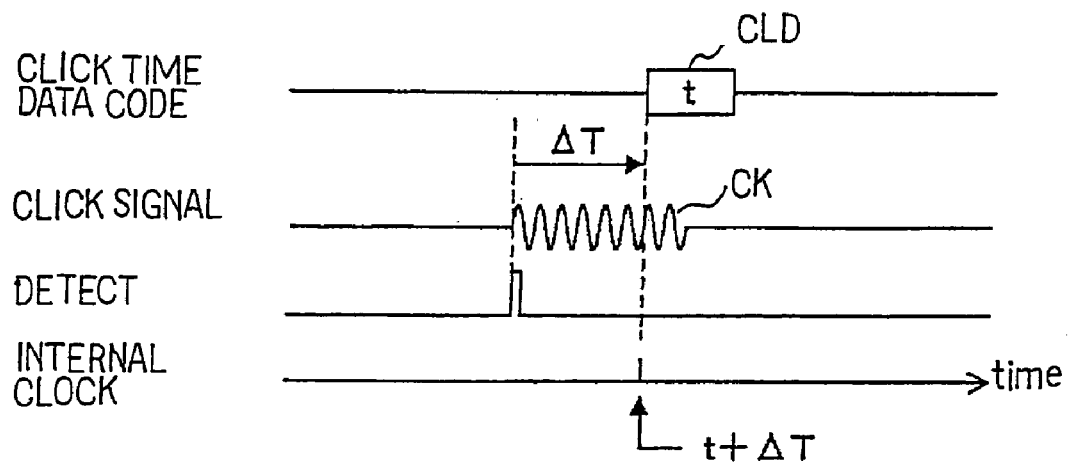
FIGS. 5A and 5B are waveform diagrams showing time lags between the click signal and the associated click time data code.

However, a time lag is unavoidable between the click signal CK and the associated click time data code CLD at the audio-visual station 10B. The click signal CK is assumed to arrive at the videophone 23 earlier than the associated click time data code CLD as shown in FIG. 5A. The videophone 23 supplies a detecting signal to the clock setter 21e. The click time data code CLD is indicative of the click time "t", and the time lag is delta-T, i.e. ÄT. Then, the clock setter 21e puts the internal clock "B" 21a to (t+delta-T). Since the click signal CK is transmitted to the videophone 13 at regular intervals, if the associated click time data code CLD does not arrive at the controller 21 within a certain time period after the arrival of the click signal CK, the clock setter 21e abandons the setting work.

Figure 5B:
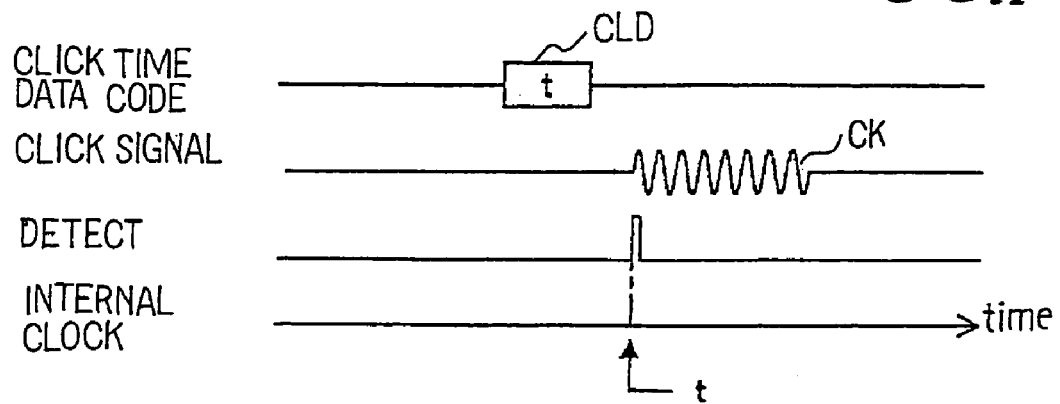

In case where the click time data code CLD arrives at the controller 21 earlier than the associated click signal CK as shown in FIG. 5B, the click time data code CLD is stored in the click time data buffer 21b, and the clock setter 21e waits for the associated click signal CK. When the associated click signal CK arrives at the videophone 23 within the certain time, the clock setter 21e puts the internal clock "B" 21a to "t". If, on the other hand, the associated click signal CK does not arrive at the videophone within the certain time, the clock setter 21e abandons the setting work, and deletes the click time data code CLD from the click time data buffer 21b.

As described hereinbefore, the teleconference system or stream system serves as the communication channel 10cb. Although the packets are usually delayed by 10 milliseconds to 100 milliseconds, the teleconference system introduces a time delay between 200 milliseconds and 300 milliseconds into the transmission of the digital mixed signal. Either click time data code CLD or click signal CK is delayed from the other as shown in FIGS. 5A and 5B. When the click time data code CLD arrives at the controller 21 earlier than the click signal CK, the certain time period is to be of the order of the sum of the minimum delay of the packets and the maximum delay of the digital mixed signal, i.e., (300+alpha) milliseconds where the margin alpha is fallen within the range between tens milliseconds and 200 milliseconds. On the other hand, when the click time data code CLD is delayed from the click signal CK, the certain time period is determined in such a manner as to permit the click time data code CLD to be delayed by 300 milliseconds, by way of example, and is equal to the difference from the minimum delay of the click signal CK, i.e., of the order of 100 milliseconds. However, it is unnatural that the click time data code CLD is delayed rather than the click signal CK. The traffic congestion may take place. In this situation, it may be better to request the audio-visual station 10A to stop the data transmission.

In case where the stream system offers the communication channel 10cb to the digital mixed signal, the digital mixed signal may be delayed by 15 seconds to 30 seconds. In this situation, the click time data code CLD usually arrives at the controller 21 earlier than the click signal CK, and the certain time period is equal to the sum of the maximum delay time and a margin, i.e., (30+beta) seconds where beta is several seconds. On the other hand, if the click time data code CLD is delayed from the click signal CK, the certain time period is zero. The margins alpha and beta are introduced in order to respond to a rapid change of the delay through the communication channel 10cb. In the following description, the certain time shown in figure SA is referred to as "certain time period A", and the certain time shown in FIG. 5B is referred to as "certain time period B".

The regular intervals of the click signals CK are determined as follows. In case where the teleconference system offers the communication channel 10cb to the digital mixed signal, the delay is fallen within the rage of 200 milliseconds to 300 milliseconds, and the regular intervals may be of the order of 2 seconds. The certain time period B may be of the order of 0.5 second, and the certain time period A may be of the order of 0.1 second.

On the other hand, if the stream system offers the communication channel 10cb to the digital mixed signal, the click signal CK may be produced at the regular intervals of 30 seconds. In this situation, if the certain time period is predicable to be 5 seconds to 20 seconds, the certain time period A is zero, and the certain time period B is of the order of 25 seconds.

Figure 6:
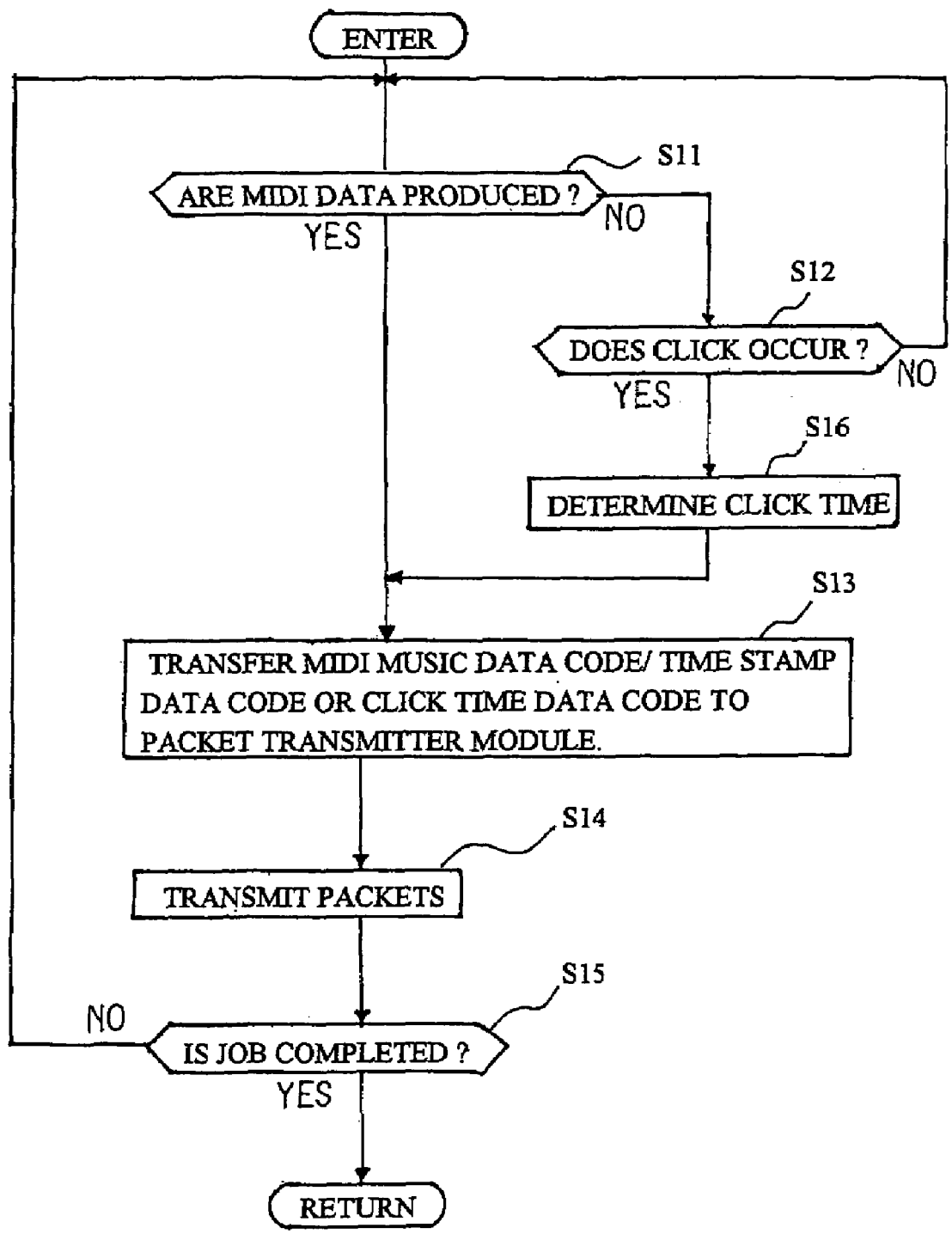
FIG. 6 is a flowchart showing a computer program on which a controller of the audio-visual station runs.

As described hereinbefore, the controller 11 is implemented by a personal computer system. The microprocessor, which forms a part of the personal computer system, periodically enters a subroutine program shown in FIG. 6, and reiterates the loop consisting of steps S11 to S16.

The microprocessor firstly checks the interface between the personal computer system and the electronic keyboard 12 to see whether or not a MIDI music data code or codes/associated time stamp data code arrives thereat. Whenever the tutor M1 depresses or releases the key or keys 12c, the answer at step S11 is given affirmative, and the microprocessor transfers the MIDI music data code or codes/associated time stamp data code to the packet transmitter module 11b as by step S13 so that the packet transmitter module 11b transmits the MIDI music data code or codes/associated time stamp data code through the communication channel 10ca to the controller 21 as the payload of the packet or packets as by step S14.

On the other hand, if the tutor M1 does not change the key state, the answer at step S11 is given negative, and the microprocessor checks the working memory to see whether or not the click generator 11c has stored the click time data code therein as by step S12. When the click occurs, the click generator 11c produces the click time data code as by step S16, and stores the click time data code in the working memory. In this situation, the answer at step S12 is given affirmative. Then, the microprocessor transfers the click time data code to the packet transmitter module 11b at step S13, and the packet transmitter module 11b transmits the click time data code to the controller 21 as the payload of a packet at step S14.

If, on the other hand, the microprocessor does not find any click time data code, the answer at step S12 is given negative, and returns to step S11. Thus, the microprocessor reiterates the loop consisting of steps S11 and S12 until the answer at step S11 or S12 is changed to affirmative.

When the microprocessor completes the job at step S14, the microprocessor checks a flag assigned the tutor's instruction to see whether or not the tutor M1 completes the lesson as by step S15. While the tutor M1 is giving the lesson to the trainee M2, the answer at step S15 is given negative, and the microprocessor returns to step S11. Thus, the microprocessor reiterates the loop consisting of steps S11 to S16 until the tutor M1 completes the lesson.

When the tutor M1 completes the lesson, the answer at step S15 is given affirmative, and the microprocessor immediately returns to the main routine program.

Figure 7A:
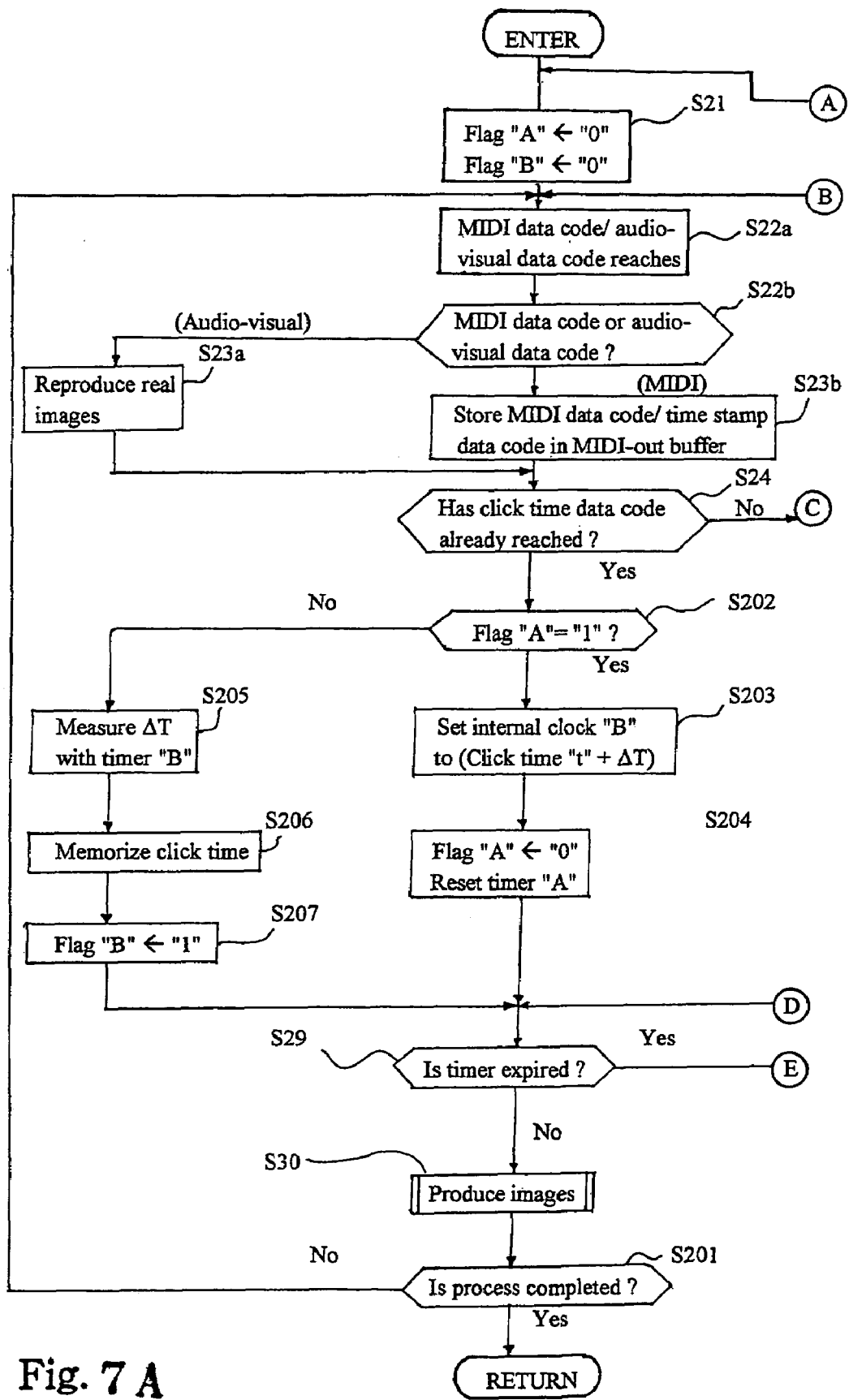
FIGS. 7A and 7B are flowcharts showing a computer program on which a controller of the other audio-visual station runs.
Figure 7:
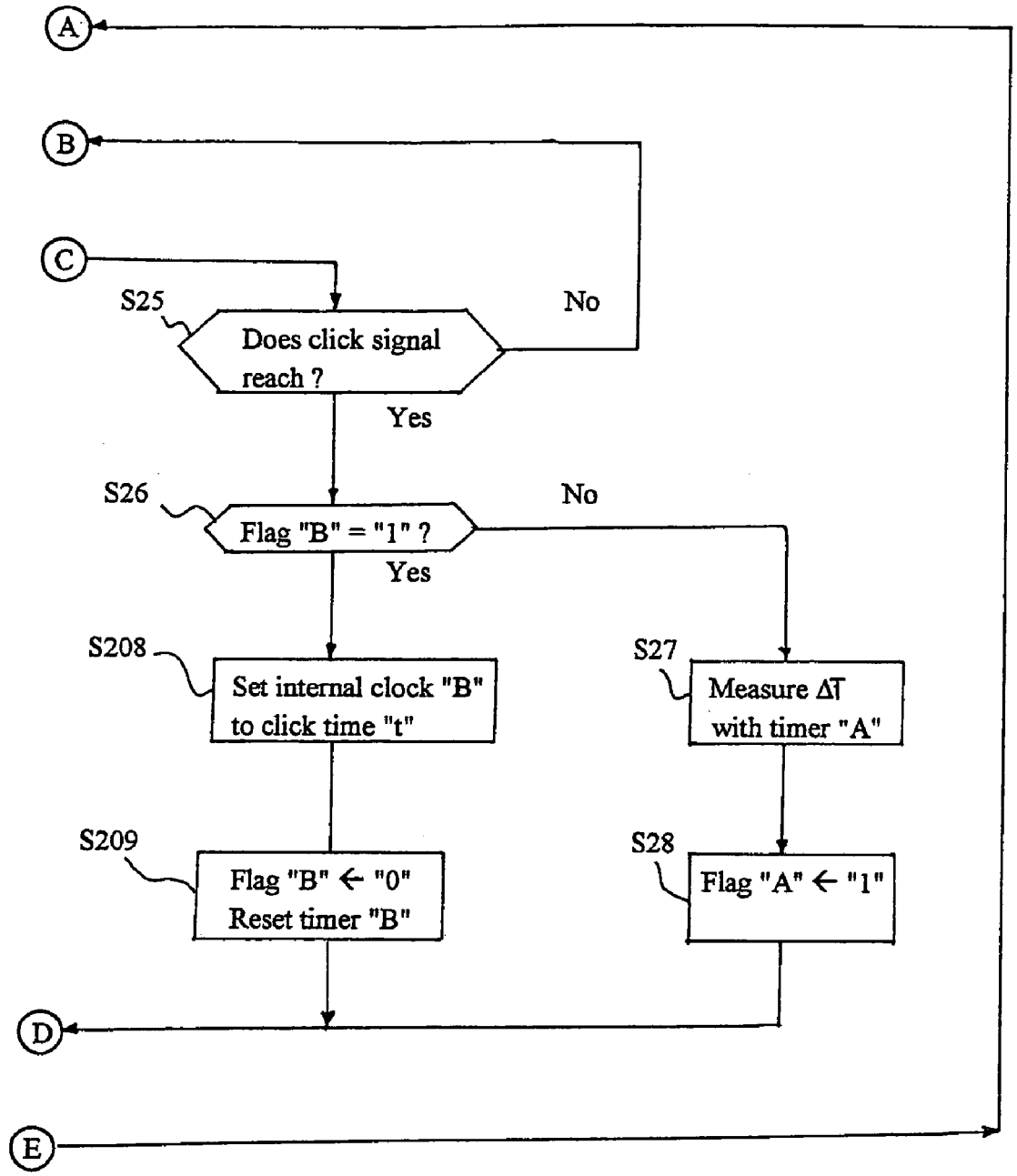

The controller 21 is also implemented by a personal computer system, and the personal computer system runs on a subroutine program shown in FIGS. 7A and 7B so as to accomplish the jobs represented by the boxes 21a, 21c, 21e and 21f. The certain time period "A" is measured with a timer "A", and another timer "B" is used for the certain time period "B".

The microprocessor, which is incorporated in the personal computer system, periodically enters the subroutine program, and reiterates the loop consisting of steps S21 to S30 and S201 to S209.

The microprocessor firstly sets flags "A" and "B" to zero as by step S21. The microprocessor receives the packets through another subroutine program as the packet receiver module 21c, and fetches the audio-visual data codes from the interface between the controller 21 and the videophone 23 through yet another subroutine program. Step S22a stands for the reception and data fetch.

The microprocessor checks the received data codes to see whether the data code expresses a piece of MIDI music data and associated time stamp or a piece of audio-visual data as by step S22b. When the microprocessor finds a piece of audio-visual data, the microprocessor produces an audio-visual signal from the piece of audio-visual data, and transfers the audio-visual signal to the display driver 21g so as to reproduce the real images of tutor's hands on the display unit 22 as by step S23a. On the other hand, when the MIDI music data code and associated time stamp data code reach the controller 21, the microprocessor transfers the MIDI music data code and associated time stamp data code to the MIDI out buffer 21d so as to store them in the MIDI out buffer 21d as by step S23b.

Upon completion of the jobs at step S23a or S23b, the microprocessor checks the click time data buffer 21b to see whether or not the click time data code has already reached as by step S24.

When the microprocessor does not find any click time data code in the click time data buffer 21b, the answer at step S24 is given negative, and the microprocessor checks the working memory to see whether or not the videophone 23 has already notified the microprocessor of the arrival of the click signal as by step S25. If the click signal has not reached the videophone, the answer at step S25 is given negative, and the microprocessor returns to step S22a. Thus, while the audio-visual station 10B is receiving the MIDI music data codes/associated time stamp data codes and audio-visual data codes in the absence of the click time data code and the click signal, the microprocessor reiterates the loop consisting of steps S22a, S22b, S23a, S23b, S24 and S25, and accumulates the MIDI music data codes/associated time stamp data codes in the MIDI out buffer 21d or transfers the audio-visual data codes to the display driver 21g for reproducing the real images of tutor's hands.

When the videophone 23 notifies the microprocessor of the arrival of the click signal, the answer at step S25 is changed to affirmative, and the microprocessor checks the flag "B" to see whether or not the click signal is delayed as by step S26. When the microprocessor finds the flag "B" to have been already changed to "1", the microprocessor determines that the click signal is delayed from the associated click time data code, and sets the internal clock "B" with the click time data code as by step S208. Thus, the microprocessor, which serves as the clock setter 21e, adjusts the internal clock "B" to time "t". Subsequently, the microprocessor changes the flag "B" to zero, and resets the timer "B" to zero as by step S209. Upon completion of the jobs at step S209, the microprocessor proceeds to step S29.

If the microprocessor finds the flag "B" to be still zero at step S26, the answer at step S24 is given negative, and the microprocessor determines that the click time data code is delayed from the click signal. Then, the microprocessor starts the timer "A" as by step S27, and changes the flag "A" to 1 as by step S28. Upon completion of the job at step S28, the microprocessor proceeds to step S29.

When the microprocessor finds a click time data code in the click time data buffer 21b at step S24, the answer at step S24 is given affirmative, and the microprocessor checks the working memory to see whether or not the flag "A" is indicative of "1" as by step S202. When the flag "A" is indicative of zero, the microprocessor determines that the click time data code is delayed from the associated click signal, and adjusts the internal clock "B" 21a to (t+ÄT) as by step S203. Subsequently, the microprocessor changes the flag "A" to zero, and resets the timer "A" to zero as by step S204. Upon completion of the jobs at step S204, the microprocessor proceeds to step S29.

If the flag "A" is indicative of zero, the answer at step S202 is given negative, and the microprocessor determines that the click signal is delayed from the associated click time data code. Then, the microprocessor starts the timer "B" as by step S205, stores the click time data code in the click time data buffer 21b as by step S206, and changes the flag "B" to 1 as by step S207. Upon completion of the job at step S207, the microprocessor proceeds to step S29.

Although the timer "A" or timer "B" started to measure the lapse of time at step S27 or S205, there is not any guarantee that the associated click time data code or associated click signal reaches the audio-visual station 10B. The microprocessor checks the timer "A" or timer "B" to see whether or not the certain time period is expired as by step S29. If the associated click time data code or associated click signal has not reached the audio-visual station 10B before expiry of the certain time period, the answer at step S29 is given affirmative, and the microprocessor returns to step S21, and resets both flags "A" and "B" to zero. This means that the microprocessor ignores the click signal or click time data code already reached. The microprocessor restarts the setting work after the next click time data code and associated click signal reaches the audio-visual station 10B. Even though the microprocessor once skips the setting work, the time lag between the images of note bars and the rear images of tutor's hands is ignoreable.

On the other hand, if the timer "A" or "B" is indicative of a lapse of time shorter than the certain time period, the answer at step S29 is given negative, and the microprocessor proceeds to a subroutine program S30 for producing the images of note bars. The microprocessor serves as the timing controller 21f, and determines the timing at which the electronic tone is to be produced or decayed. When predetermined time comes, the microprocessor supplies a piece of image data representative of the note bar to the display driver 21g. Then, the display driver 21g produces the audio-visual signal from the piece of image data, and supplies the audio-visual signal to the display unit 22 so as to produce the image of note bar. Thus, the images of note bars are reproduced synchronously with the fingering on the keys 12c. The subroutine program will be hereinafter described with reference to FIG. 8.

When the microprocessor returns from step S30, the microprocessor checks the working memory to see whether or not the tutor M1 has finished the lesson as by step S201. While the tutor M1 is continuing the lesson, the answer at step S201 is given negative, and the microprocessor returns to step S22a. Thus, the microprocessor reiterates the loop consisting of steps S22a to S30 and S201 to S209 during the lesson.

When the tutor M1 finishes the lesson, he or she instructs the controller 21 to terminate the data processing through the controller 11 so that the answer at step S201 is given affirmative. Then, the microprocessor immediately returns to the main routine program.

Description is hereinafter made on the subroutine program for producing the images of note bars with reference to FIG. 8. The trainee M2 sits on the stool in front of the electronic keyboard 24, and is opposed to the screen of the display unit 22. As shown in FIGS. 9A and 9B, the screen of the display unit 22 is split into two areas G1 and G2. The moving images of tutor's hands and keys 12c are reproduced in the area G1, and the images of note bars Ba are produced in the other area G2.

A piano roll system is employed. The piano scroll technique is disclosed in Japanese Patent No. 3058051. The scenes are duplicated at high speed. Parts of the scene are deleted from the previous scene, and new images are added to the previous scene.

The note bars Ba are produced over the images of the associated keys 12c, and are moved down toward the images of associated keys 12c as if the scene is scrolled. For example, the note bar Ba1 is indicative of the timing at which the key 12c1 is to be depressed and the time period over which the trainee M2 is to depress the key 12c1. When the images of note bars Ba reach the images of associated keys 12c, the trainee is expected to depress the corresponding keys of the electronic keyboard 24. The length of the images of note bars Ba is corresponding to the notes or the length of electronic tones to be produced so that the trainee M2 is to depress the keys until the associated note bars go down under the boundary between the area G1 and the area G2. Although the scene is intermittently moved down, the trainee M2 feels the scene to be continuously scrolled. Term "scroll time interval" means a lapse of time between the presently produced scene and the previous scene.

Figure 8:
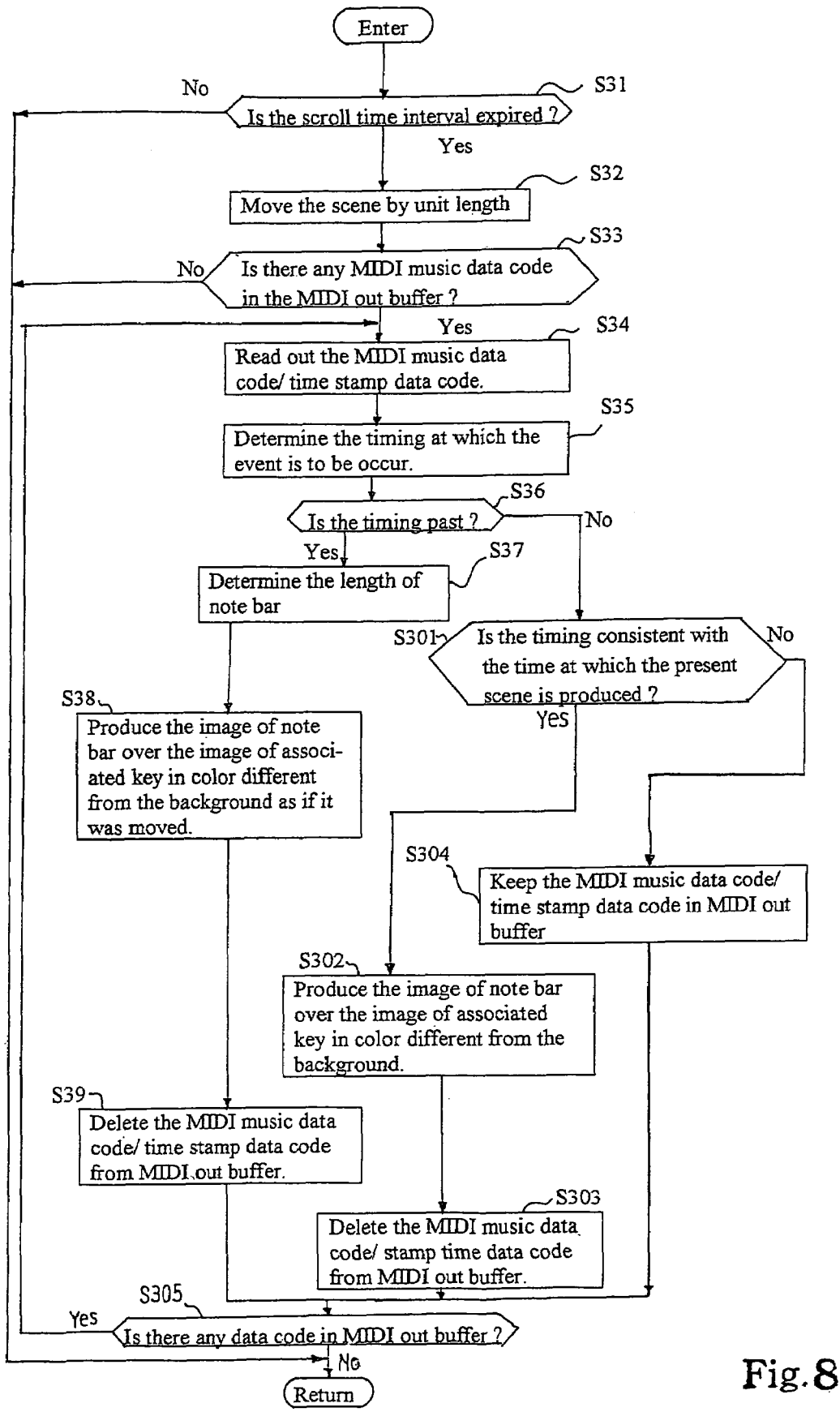
FIG. 8 is a flowchart showing a computer program for producing images of note bars on a display unit.
Figure 9:
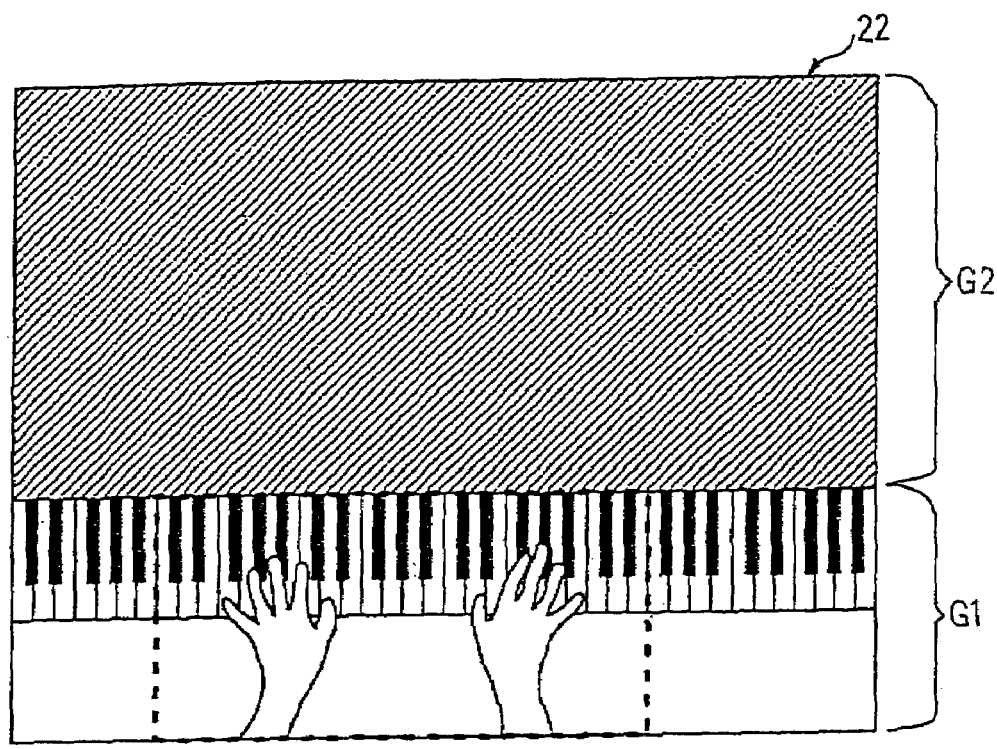
FIGS. 9A and 9B are views showing a scene before a lesson and a scene in the lesson.
Figure 9:
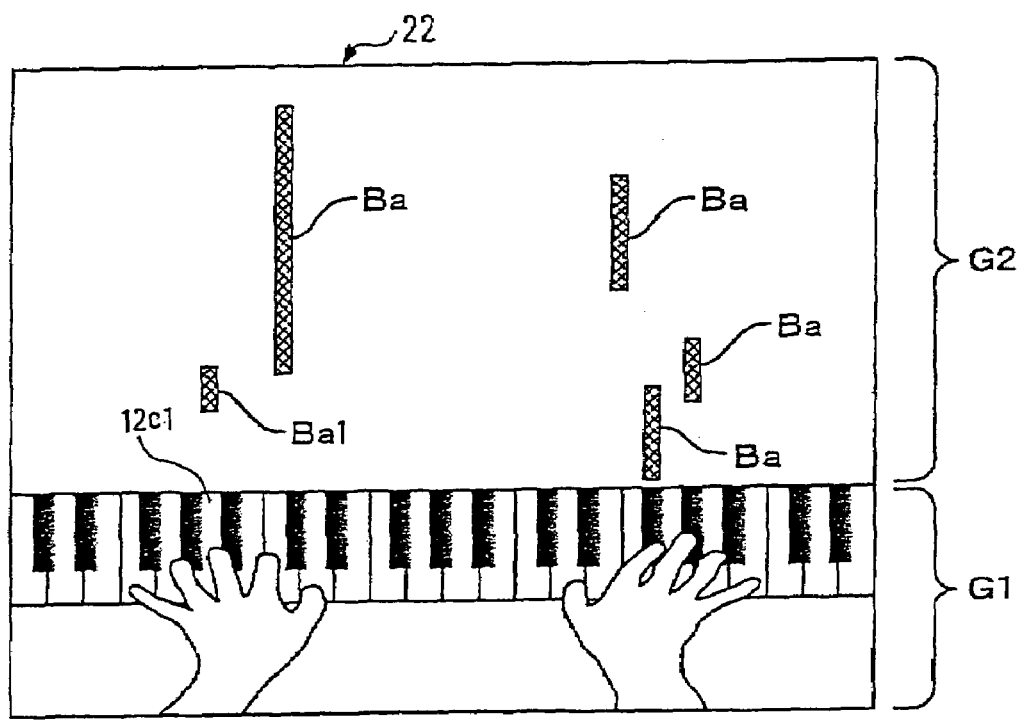

When the microprocessor enters the subroutine program shown in FIG. 8, the microprocessor firstly checks a timer to see whether or not the scroll time interval is expired as by step S31. If the lapse of time from the previous scroll is shorter than the scroll time interval, the answer is given negative, and the microprocessor immediately returns to the subroutine program shown in FIGS. 7A and 7B. On the other hand, when the microprocessor confirms that the scroll time interval is expired, the answer at step S31 is given affirmative, and the microprocessor scrolls the scene by unit length as by step S32.

Subsequently, the microprocessor checks the MIDI out buffer 21d to see whether or not a MIDI music data code/associated time stamp data code has been already stored therein as by step S33. When the microprocessor does not find any MIDI music data code, the answer at step S33 is given negative, and the microprocessor immediately returns to the subroutine program shown in FIGS. 7A and 7B.

On the other hand, if at least one MIDI music data code/associated time stamp data code have been already stored in the MIDI out buffer 21d, the answer at step S33 is given affirmative, and the microprocessor reads out the MIDI music data code or codes expressing a single event and associated time stamp data code from the MIDI out buffer 21d as by step S34. The microprocessor determines the time at which the event is to occur as by step S35. The microprocessor reads the time indicated by the internal clock "B" 21a, and compares the stamp time, which is represented by the time stamp data code, with the time indicated by the internal clock "B" 21a to see whether or not the time at which the event occur is past as by step S36.

If the answer at step S36 is given affirmative, the image of corresponding note bar Ba is to be produced as if it was continued from the previous scene, and the microprocessor determines the length of the corresponding note bar on the present scene as by step S37.

When the microprocessor determines the length of the corresponding bar in the present scene, the microprocessor supplies a piece of image data representative of the note bar in the present scene to the display driver 21g, and the display driver 21g produces the image of the note bar Ba on the display unit 22 as by step S38. The display driver 21g changes the pixels on which the image of note bar Ba is produced to the predetermined color so that the trainee M2 feels the image of note bar Ba to be downwardly moved.

Upon completion of the job at step S38, the microprocessor deletes the MIDI music data code and associated time stamp data code from the MIDI out buffer 21d as by step S39, and proceeds to step S305.

If, on the other hand, the answer at step S36 is given negative, the microprocessor compares the stamp time with the time at which the display driver 21g started to produce the present scene as by step S301. If the answer is given negative, the image of corresponding note bar Ba is to be produced in future so that the microprocessor keeps the MIDI music data code/associated time stamp data code in the MIDI out buffer 21d as by step S304. Upon completion of the job at step S304, the microprocessor proceeds to step S305.

When the answer is given affirmative, the microprocessor determines the pixels on which the image of a note bar Ba is to be produced, and supplies a piece of image data representative of the note bar Ba to the display driver 21g. The display driver 21g changes the pixels to the predetermined color different from that of the other pixels where the background image is produced as by step S302, and deletes the MIDI music data code and associated time stamp data code from the MIDI out buffer 21d as by step S303. Upon completion of the job at step S303, the microprocessor proceeds to step S305.

The microprocessor checks the MIDI out buffer 21d to see whether or not there still remains a MIDI music data code and associated time stamp data code therein at step S305. When the microprocessor finds another MIDI music data code and associated time stamp data code in the MIDI out buffer 21d, the answer is given affirmative, and the microprocessor returns to step S34. Thus, the microprocessor reiterates the loop consisting of steps S34 to S39 and S301 to S305 so as to produce the images of new notes bar and move the images of note bars already produced on the previous scene. However, if the microprocessor does not find any MIDI music data code and associated time stamp data code in the MIDI out buffer 21d, the answer at step S305 is given negative, and the microprocessor returns to the subroutine program shown in FIGS. 7A and 7B.

While the microprocessor is cooperating with the display driver 21g, the real images of tutor's hands, which are moved as if the tutor M1 fingers on the keyboard near the trainee M2, and the images of note bars Ba are produced on the display unit 22, and the electronic tones and tutor's oral directions are heard from the display unit 22. The images around the electronic keyboard 12 are firstly reproduced from the audio-visual data codes on the display unit 22 before the lesson. The real images of the electronic keyboard 12, which includes the real images of keys 12c, and tutor's hands appear in the entire area G1+G2 as shown in FIG. 9A. The hatching lines in the area G2 stands for the real image of the cabinet of the electronic keyboard 12. In order to designate the leftmost key 12c and the rightmost key 12c to be depressed in the lesson, the tutor M1 may depress these keys 12c before the lesson so as to permit the controller 21 to determine the real images in the area G1. As described hereinafter, the images of keys 12c are enlarged in the lesson.

When the tutor M1 starts to finger on the keys 12c, the MIDI music data codes intermittently arrive at the audio-visual station 10B, and the images of note bars Ba are reproduced in the area G2 as shown in FIG. 9B. The real images of tutor's hands on the predetermined keys 12c, which are encircled in broken lines in FIG. 9A, are enlarged, and the enlarged real images are assigned to the area G1. FIG. 9B shows one of the scenes, and the scenes are changed at high speed so that the real images of tutor's fingers are moved as similar to the tutor's fingers on the keys 12c.

Since the images of note bars Ba are indicative of the keys to be depressed, the timing at which the keys are depressed and the length of the tones, the trainee M2 practices the fingering on the keyboard 24 under the guidance of the images of note bars Ba. Moreover, since the tutor M1 gives an exhibition of the fingering through the real images in the area G1, the trainee M2 easily understands how to move the fingers.

Although a time lag is ignoreable between electronic keyboards connected through MIDI cable, the time lag is serious between the electronic keyboards connected through the public communication channels without any synchronization due to the variable traffic congestion. If the audio-visual data codes are transmitted between audio-visual stations in parallel to the MIDI music data codes without any clock setting work, the images of tutor's hands are liable to be delayed from the images of note bars.

Figure 10:
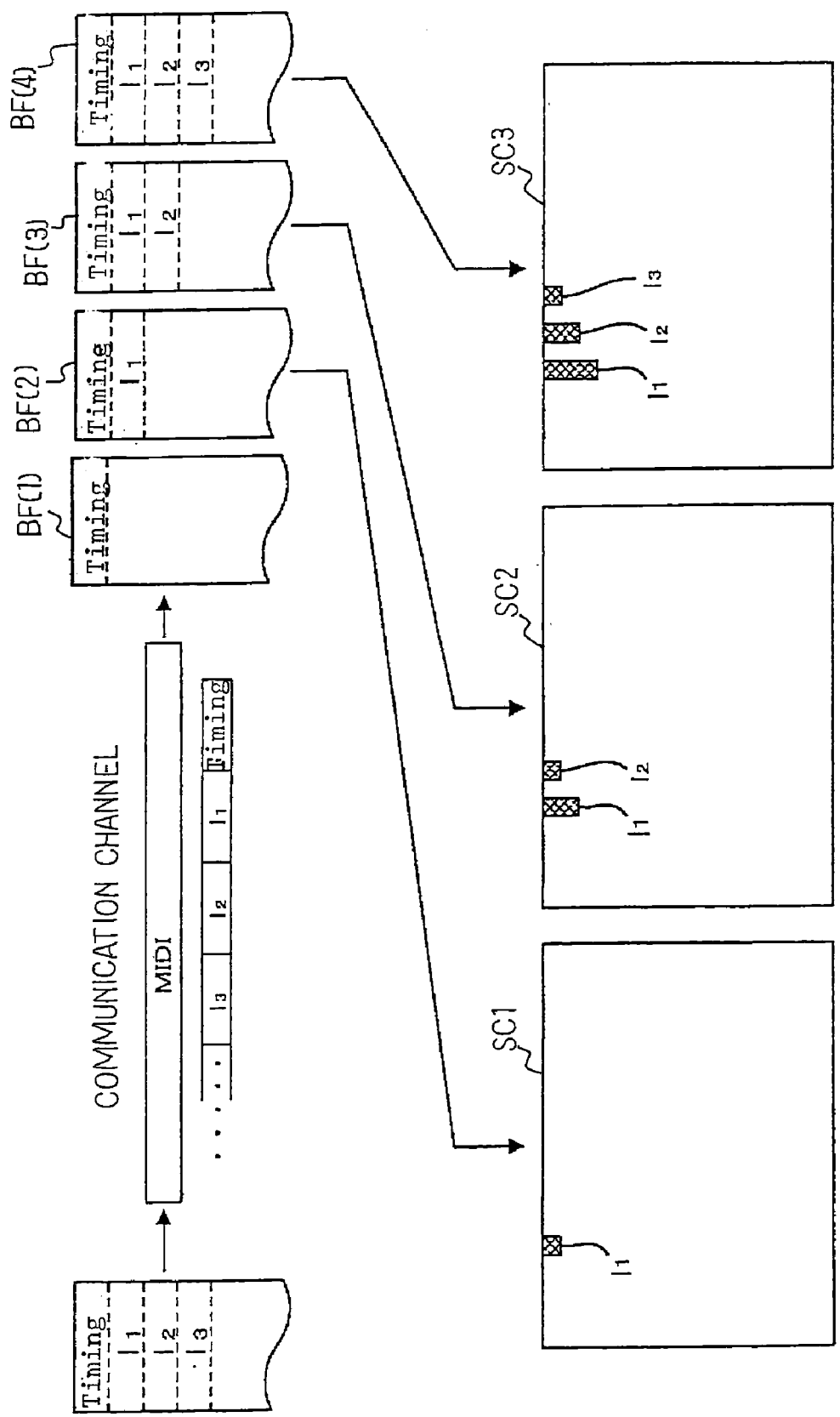
FIG. 10 is a schematic view showing a data transmission of MIDI music data codes without any time stamp.

FIG. 10 shows the serial transmission of MIDI music data codes $I_1$, $I_2$ and $I_3$ without any time stamp. Assuming now that plural events concurrently take place, the MIDI music data codes $I_1$, $I_2$ and $I_3$, which respectively represent the events, are concurrently produced, and a timing data code is added to the MIDI music data codes $I_1$, $I_2$ and $I_3$. The timing data code and MIDI music data codes $I_1$, $I_2$ and $I_3$ are serially transmitted through the communication channel. The timing data code firstly reaches the data buffer BF, and is stored therein as indicated by BF(1). Subsequently, the MIDI music data code $I_1$ reaches the data buffer BF, and is stored therein together with the timing data code as indicated by BF(2). The MIDI music data codes $I_2$ and $I_3$ intermittently reach the data buffer, and are stored therein as indicated by BF(3) and BF(4). Since the MIDI music data codes $I_1$, $I_2$ and $I_3$ are not imprinted with stamp time, the images of note bars $I_1$, $I_2$ and $I_3$ are immediately produced on the display unit. In detail, when the MIDI music data code $I_1$ is stored in the data buffer BF, the image of the corresponding note bar $I_1$ is produced on the display unit 22 as indicated by SC1. When the next MIDI music data code $I_2$ is stored in the data buffer BF, the image of the note bar $I_1$ is slightly moved down, and the image of the note bar $I_2$ is newly produced in the scene SC2 together with the image of the note bar $I_1$. When the next MIDI music data code $I_3$ is stored in the data buffer BF, the images of the note bars $I_1$ are slightly moved down, and the image of the note bar $I_3$ is newly produced in the scene SC3. Thus, although the events concurrently take place, the images of note bars $I_1$, $I_2$ and $I_3$ are sequentially produced on the display unit.

Figure 11:
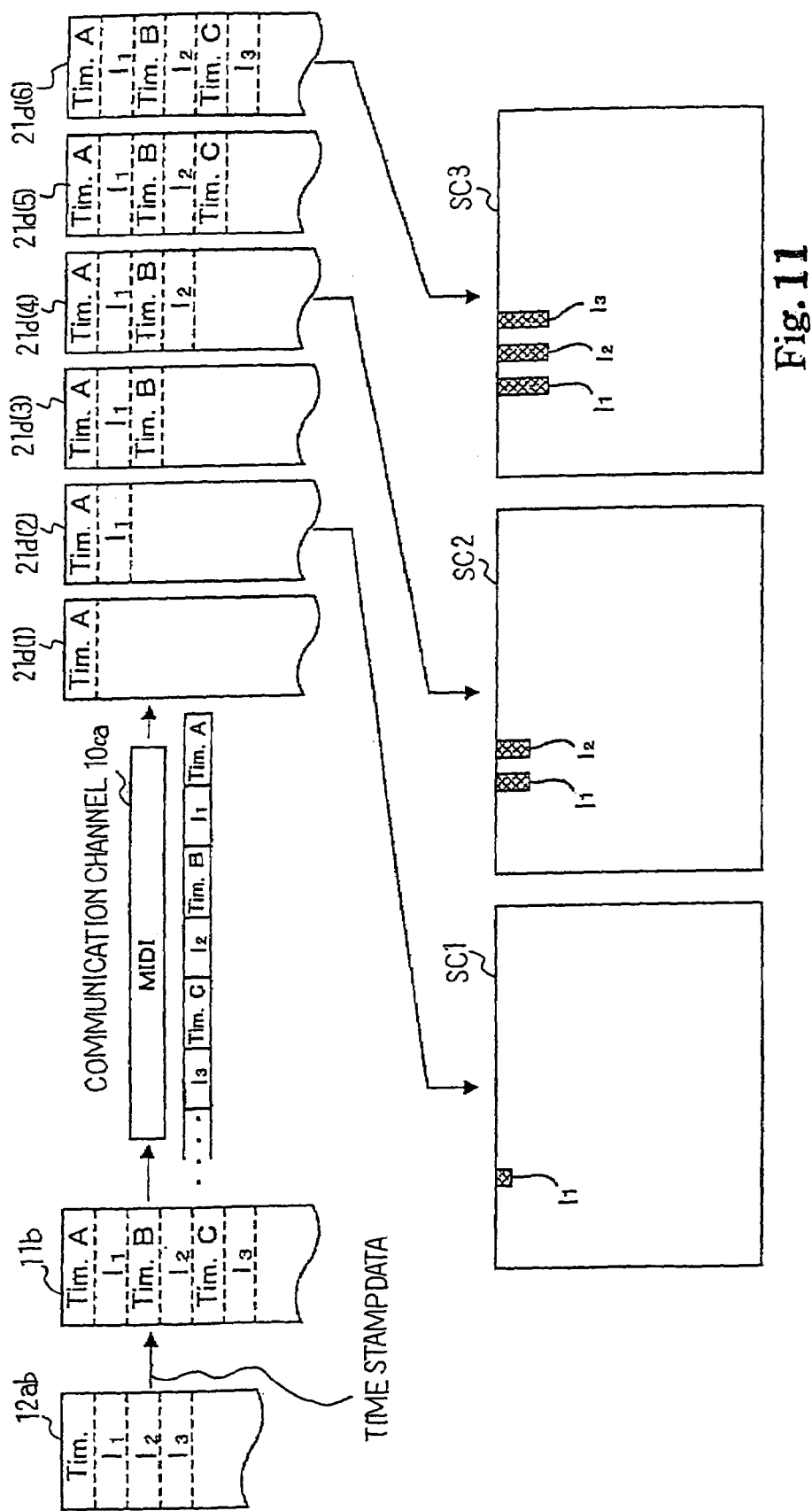
FIG. 11 is a schematic view showing a data transmission of MIDI music data codes together with time stamp data codes.

The music education support system of FIG. 11 behaves differently from the system shown in FIG. 10. Three events are assumed to concurrently take place. The electronic keyboard 12 produces the MIDI music data codes $I_1$, $I_2$ and $I_3$, and the timer stamper 12a gives the same stamp time to the MIDI music data codes $I_1$, $I_2$ and $I_3$. The MIDI music data codes $I_1$, $I_2$ and $I_3$ are paired with the time stamp data codes Tim. A, Tim. B, Tim. C, which are indicative of the same stamp time, and the MIDI music data codes and time stamp data codes are serially transmitted from the controller 11b through the communication channel 10ca to the controller 21 in the order of Tim. A, $I_1$, Tim. B, $I_2$, Tim. C, and $I_3$. The time stamp data code Tim. A firstly arrives at the controller 21, and is stored in the MIDI out buffer 21d as indicated by 21d(1). Next, the MIDI music data code $I_1$ arrives at the controller 21, and is stored in the MIDI out buffer 21d as indicated by 21d(2). Thus, the time stamp data code Tim. B, MIDI music data code $I_2$, time stamp data code Tim. C and MIDI music data code $I_3$ intermittently arrive at the controller 21, and are stored in the MIDI out buffer 21d as indicated by 21d(3), 21d(4), 21d(5) and 21d(6).

The microprocessor runs on the subroutine program shown in FIG. 8, and produces the images of note bars on the display unit 22. First, when the internal clock "B" reaches the stamp time Tim. A, the microprocessor determines the image of note $I_1$, and supplies a piece of image data representative of the image of note bar $I_1$ to the display driver 21g as by step S302. The display driver 21g produces the image of note bar $I_1$ in the scene SC1.

Subsequently, the microprocessor reads out the next time stamp data code Tim. B, and notices that the stamp time Tim. B is same as the stamp time Tim. A at step S36. Then, the microprocessor determines the length of the image of note bar $I_2$ at step S37. Since the stamp time Tim. B is same as the stamp time Tim. A, the image of note bar $I_2$ is to be equal in length to the image of note bar $I_1$ in the next scene SC2. The microprocessor supplies the pieces of image data representative of the images of note bars $I_1$ and $I_2$ to the display driver 21g so that the display driver 21g produces the images of note bars $I_1$ and $I_2$ in the scene SC2.

When the microprocessor fetches the next time stamp data code Tim. C, the microprocessor notices that the stamp time Tim. C is same as the stamp times Tim. A and Tim. B, and determines the length of the image of note bar $I_3$ at step S38. Since the stamp time Tim. C is same as the stamp times Tim. A and Tim. B, the image of note bar $I_3$ is equal in length to the images of note bars $I_1$ and $I_2$ so that the display driver 21g produces the images of note bars $I_1$, $I_2$ and $I_3$ equal in length to one another in the next scene SC3. Although the data codes are transmitted from the controller 11 to the controller 21 in serial, the images of note bars $I_1$, $I_2$ and $I_3$ are produced on the display unit 22 as if the MIDI music data codes $I_1$, $I_2$ and $I_3$ arrive in parallel at the controller 21. Thus, the controller 21 eliminates the time lag from the images of note bars $I_1$, $I_2$ and $I_3$.

In case where the images of note bars appear in the scene before the trainee is expected to depress the corresponding keys, the real images of fingers are to be delayed from the stamp times. The delay time is equal to the time consumed by the associated images of note bars which are moved across the area G2. Otherwise, the microprocessor is to supply the pieces of image data the predetermined time in advance of the real images of tutor's hands. On the other hand, in case where the images of note bars appear in the scene at the time when the trainee M2 is expected to depress the keys, the microprocessor supplies the pieces of image data to the display driver 21g without any delay from the audio-visual data codes.

As described hereinbefore, the music education support system according to the present invention makes it possible to give lessons to the trainee M2 remote from the tutor M1. Since the trainee M2 understands how to move the fingers, he or she is satisfied, and further takes the remote lessons.

Second Embodiment

Figure 12:
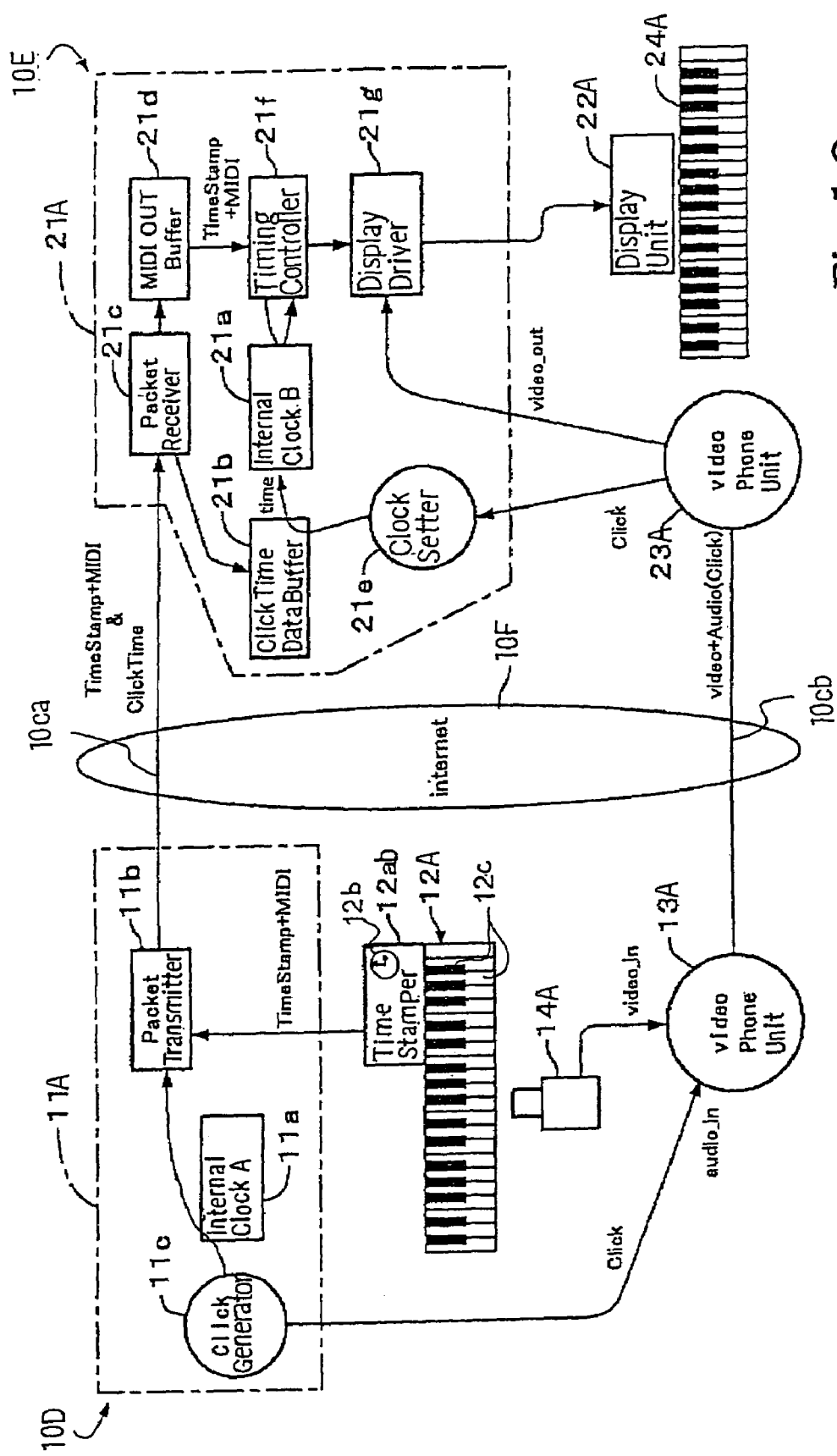
FIG. 12 is a schematic view showing the system configuration of the another music education system according to the present invention.

Turning to FIG. 12 of the drawings, another music education support system embodying the present invention largely comprises an audio-visual station 10D assigned to a tutor, another audio-visual station 10E assigned to a trainee and communication channels 10F. The audio-visual station 10D is remote from the audio-visual station 10E, and MIDI music data codes/time stamp data codes/click time data codes and digital mixed signal are selectively supplied from the audio-visual station 10D through the communication channels 10F to the other audio-visual station 10E. In this instance, the Internet offers the communication channels 10F to the audio-visual stations 10D/10E.

The audio-visual station 10D includes a controller 11A, an electronic keyboard 12A, a videophone unit 13A and a movie camera/microphone 14A. On the other hand, the audio-visual station 10E includes a controller 21A, a display unit 22A, a videophone unit 23A and an electronic keyboard 24A. The controller 11A and 21A are, by way of example, implemented by personal computer systems, respectively. For this reason, the personal computer system serving as the controller 11 is labeled with reference "11A", and the other personal computer system is labeled with reference "21A".

A suitable computer program has been installed in the personal computer 11A, and accomplishes predetermined jobs. An internal timer "A" 11a, a packet transmitter and a click generator 11c are three jobs of the predetermined jobs. Another suitable computer program has been already installed in the personal computer system 21A, and accomplishes predetermined jobs, three of which are referred to as an internal clock "B" 21a, a packet receiver module 21c and a timing controller 21f. A working memory serves as a click time data buffer 21b and a MIDI out buffer 21d, and a display driver 21g is incorporated in the personal computer system 21A.

The electronic keyboard 12A includes a timer stamper 12ab, an internal clock 12b and keys 12c. The internal clock 12b starts at initiation of a lesson. While a tutor is fingering on the keys 12c, MIDI music data codes are produced, and the time stamper 12ab checks the internal clock 12b to see when the MIDI music data codes occur, and selectively adds time stamp data codes to the MIDI music data codes. The MIDI music data codes and time stamp data codes are intermittently supplied from the time stamper 12ab to the packet transmitter 11b.

The click generator 11c also starts at the initiation of the lesson, and a click occurs in the click generator 11c at regular intervals. When the click takes place, a click signal is supplied to the videophone unit 13A, and a click time data code is supplied to the packet transmitter module 11b. The click time data code is indicative of a click time at which the click occurs.

The packet transmitter module 11b loads the MIDI music data codes/time stamp data codes and the click time data codes in packets as the payload, and delivers the packets to the communication channel 10ca. Suitable discriminative code representative of either MIDI music data code/time stamp data code or click time data code is written in the header of the packet together with the address assigned to the audio-visual station 10E.

The movie camera/microphone 14A is directed to the tutor's hands on the keys 12c, and produces an audio-visual signal representative of the images of tutor's hands on the keys 12c. The audio-visual signal is supplied to the videophone unit 13A. When the click signal arrives at the videophone unit 13A, the videophone unit 13A mixes the click signal with the audio-visual signal, and compresses and converts the mixed signal to a digital mixed signal. The videophone unit 13A delivers the digital mixed signal to the communication channel 10cb, which is independent of the communication channel 10ca.

The packets arrive at the packet receiver module 21c. The packet receiver module 21c unloads the payloads from the packets, and separates the MIDI music data codes/time stamp data code from the click time data codes. The packet receiver module 21c transfers the MIDI music data codes/ time stamp data code to the MIDI out buffer 21d and the click time data code to the click time data buffer 21b. Thus, the MIDI music data code or codes/associated time stamp data code and the click time data code are selectively stored in the MIDI out buffer 21d and the click time data buffer 21b.

On the other hand, the digital mixed signal arrives at the videophone unit 23A. The videophone unit 23A demodulates the audio visual data codes and click signal from the digital mixed signal. The audio-visual data codes are transferred to the display driver 21g for producing a moving picture, i.e., the images of tutor's hands on the keys 12c on the display unit 22A. On the other hand, when the videophone unit 23A finds the click signal, the videophone unit 23A produces a detecting signal, and supplies the detecting signal to the clock setter 21e so that the clock setter 21e starts a setting work on the internal clock "B" 21a with reference to the click time data code stored in the click time data buffer 21b.

The timing controller 21f fetches the time stamp data code from the MIDI out buffer 21d, and compares the stamp time with the time on the internal clock "B" 21a to see whether or not the display driver 21g starts to produce images of note bars on the display unit 22A. Thus, the display unit 21g produces the images of note bars together with the images of tutor's hands on the keys 12c on the display unit 22A.

Figure 13:
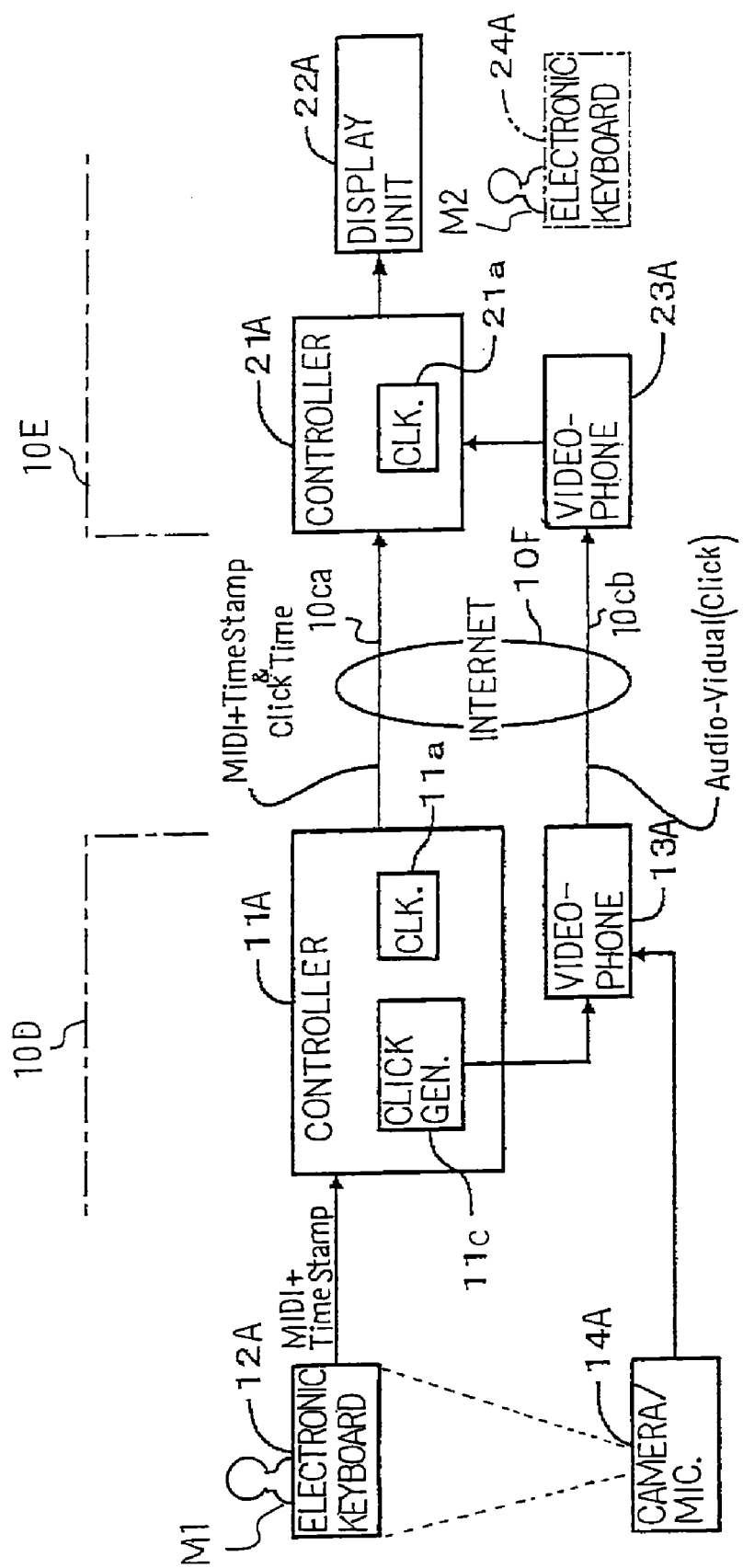
FIG. 13 is a block diagram showing audio-visual stations and communication channels incorporated in the music education support system.

FIG. 13 illustrates a remote lesson through the music education support system. The MIDI music data codes/time stamp data codes and click time data codes are transmitted from the controller 11A through a packet switching network, which forms a part of the internet, to the controller 21A as the packets. On the other hand, videophone unit 13A receives the video signal and monaural audio signal from the movie camera/microphone 14A and the click signal from the click generator 11c. The click signal is mixed into the monaural audio signal. Thus, the click signal is mixed and compressed into the audio-visual signal. The digital mixed signal is transmitted from the videophone unit 13A through the transmission channel of the teleconference system to the videophone unit 23A.

The personal computer system (controller) 11A is prepared near the electronic keyboard 12A, and the movie camera/microphone 14A is provided over the electronic keyboard 12A. The tutor M1 gives instructions to the personal computer system 11A, and fingers a music passage on the electronic keyboard 12A. The movie camera/microphone picks up the images of tutor's hands on the keys 12c, and gathers the tutor's voice such as, oral directions.

The personal computer system 21A is also prepared beside the electronic keyboard 24A, and the display unit 22A is opposed to the trainee M2 on the stool. As described hereinbefore, the images of note bars and images of tutor's hands on the keys 12c are produced on the display unit 22A so that the trainee practices the fingering on the electronic keyboard 24A under the guidance of the images on the display unit 22A.

Figure 14:
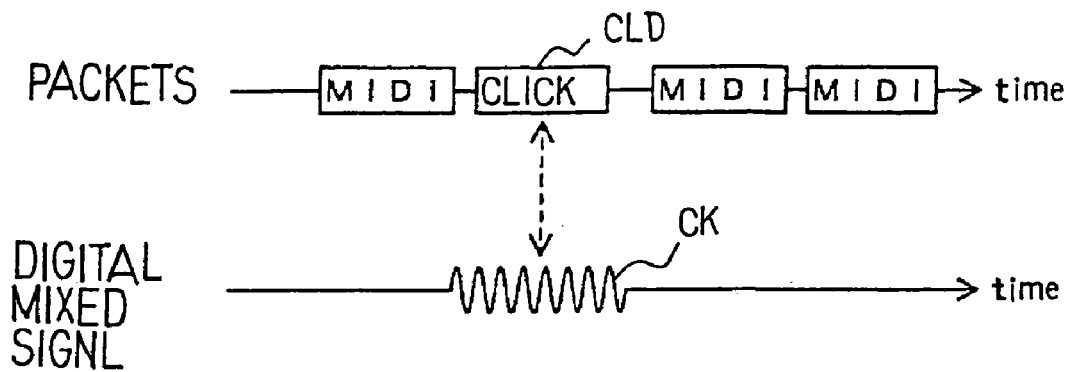
FIG. 14 is a waveform diagram showing a click signal concurrently produced with a click time data code.

FIG. 14 shows the synchronization between the click time data code CLD and the associated click signal CK. The click signal CK is a periodical signal, and, for this reason, is easily discriminated in the digital mixed signal. When the click occurs, the click generator 11c (FIG. 13) checks the internal clock "A" to see what time the internal clock signal "A" 11a points to, and produces the click time data code. The click generator 11c concurrently outputs the click time data code CLD and click signal CK, and the packet, the payload of which is the click time data code, and the click signal are almost concurrently delivered to the respective communication channels 10ca and 10cb. Thus, each click time data code CLD is paired with the click signal CK. However, the there is not any guarantee that the click time data code CLD and click signal CK concurrently arrive at the controller 21A and videophone unit 23A. As will be described hereinbefore, the controller 21A makes the click time data code CLD paired with the click signal CK in so far as the time lag is within a certain time period.

Figure 15A:
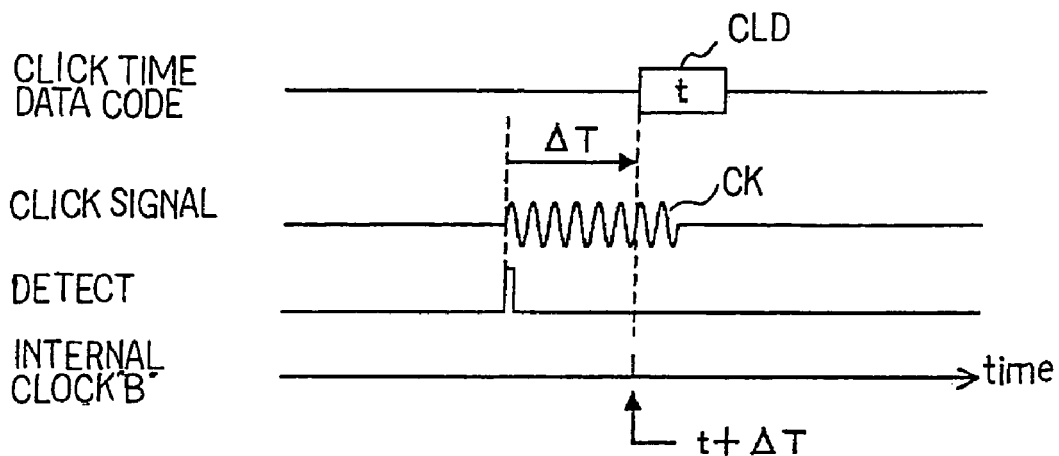
FIGS. 15A and 15B are waveform diagrams showing time lags between the click signal and the associated click time data code.

In detail, the click signal CK is assumed to arrive at the videophone unit 23A earlier than the associated click time data code CLD arrives at the packet receiver module 21c as shown in FIG. 15A. When the click signal CK arrives at the videophone unit 23A, the videophone unit 23A raises a detecting signal, and supplies the detecting signal to the clock setter 21e. Then, the clock setter 21e starts an internal timer, and gets ready to carry out a setting work on the internal clock "B" 21a. The click time data code CLD is assumed to reach the click time data buffer 21b delta-T later than the arrival time of the click signal CK. The click time is "t". If the delta-T is shorter than the certain time period, the clock setter 21e sets the internal clock "B" 21a with the sum of the click time and time lag, i.e., (t+delta-T). Thus, the clock setter 21e makes the internal clock "B" 21a synchronized with the internal clock "A" 11a. The certain time period is predetermined, and the regular intervals of the click signal CK is taken into account. If, on the other hand, any click time data code is not found in the click time data buffer 21b within the certain time period, the clock setter 21e abandons the setting work.

Figure 15B:
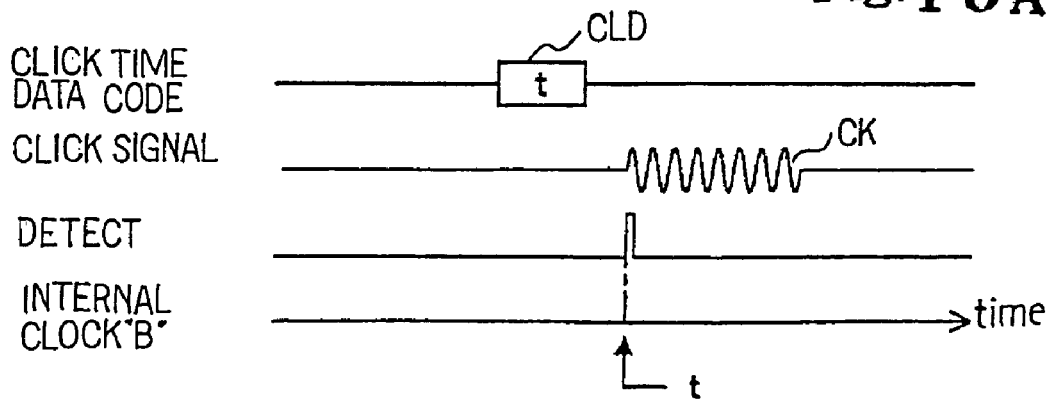

The click time data code CLD is assumed to arrive at the packet receiver module 21c earlier than the click signal CK reaches the videophone unit 23A as shown in FIG. 15B. The click time data code CLD is stored in the click time data buffer 21b, and starts an internal timer. The click time is "t". If the click signal arrives at the videophone unit 23A within a certain time period, the videophone unit 23A supplies the detecting signal to the clock setter 21e, and the clock setter 21e sets the internal timer "B" 21a with the click time "t". If, on the other hand, any click signal does not arrive at the videophone unit 23A within the certain time period, the clock setter 21e abandons the setting work, and eliminates the click time data code CLD from the click time data buffer 21b.

The certain time period is different between the teleconference system and a streaming system. Although the time lag on the communication channel 10ca is varied in dependence on the congestion, the time lag is fallen within the range between 10 milliseconds and 100 milliseconds.

In case where the teleconference system is employed in the music education support system, the digital mixed signal is delayed by 200-300 milliseconds. If the click time data code CLD reaches the controller 21A earlier than the click signal CK arrives at the videophone unit 23A as shown in FIG. 15B, the certain time period is estimated at the difference between the minimum time lag on the communication channel 10ca, i.e., 10 milliseconds and the maximum time lag on the other communication channel 10cb, i.e., 300 milliseconds. Thus, the certain time period is about (300+ alpha) milliseconds where alpha ranges from tens milliseconds to 200 milliseconds. Alpha is a margin against abnormal state. On the other hand, if the click time data code CLD reaches the controller 21A later than the click signal CK arrives at the videophone unit 23A as shown in FIG. 15A, the delay on the communication channel 10ca is unusual. The allowable time delay is assumed to be 300 milliseconds, and the certain time period is estimated at the difference between the allowable time delay and the minimum time lag on the communication channel 10*cb*, i.e., 200 milliseconds. Thus, the certain time period is about (300-200) milliseconds, i.e., 100 milliseconds. However, the delay of the click time data code is unusual. The audio-visual station 10E may recommend the tutor M1 to stop the lesson.

In case where the streaming system is employed in the music education support system, the time lag on the communication channel 10*cb* ranges from 15 seconds to 30 seconds. Thus, the time lag through the streaming system is much longer than that through the teleconference system. For this reason, it is rare that the click time data code CLD is delayed from the click signal CK, and the MIDI music data codes are not processed in the controller 21A. The certain time period may be zero. When the click time data code CLD reaches the controller 21A earlier than the click signal CK arrives at the videophone unit 23A, the clock setter 21*e* carries out the setting work on the internal clock "B" 21*a*. Since the time lag on the communication channel 10*cb* is much longer than the time lag on the other communication channel 10*ca* is, the certain time period is abound (30+beta) seconds where beta is of the order of several seconds. Beta is also a margin against abnormal state.

As described hereinbefore, when the certain time period is designed, the regular intervals of the click signal CK is taken into account of. In case where the teleconference system is employed in the music education support system, the time lag on the communication channel 10*cb* ranges between 200 milliseconds and 300 milliseconds so that the regular intervals are designed to be of the order of 2 seconds. The certain time period on the condition shown in FIG. 15B is referred to as "certain time period B", and the certain time period on the condition shown in FIG. 15A is referred to as "certain time period A". When the regular intervals are of the order of 2 seconds, the certain time period B may be of the order of 0.5 second, and the certain time period A may be of the order of 0.1 second. In case where the streaming system is employed in the music education support system, the time lag on the communication channel 10*cb* is estimated at 5-20 seconds, and the regular intervals of the click signal CK may be designed to be of the order of 30 seconds. The certain time period B may be of the order of 25 seconds, and the certain time period A may be zero.

Figure 16:
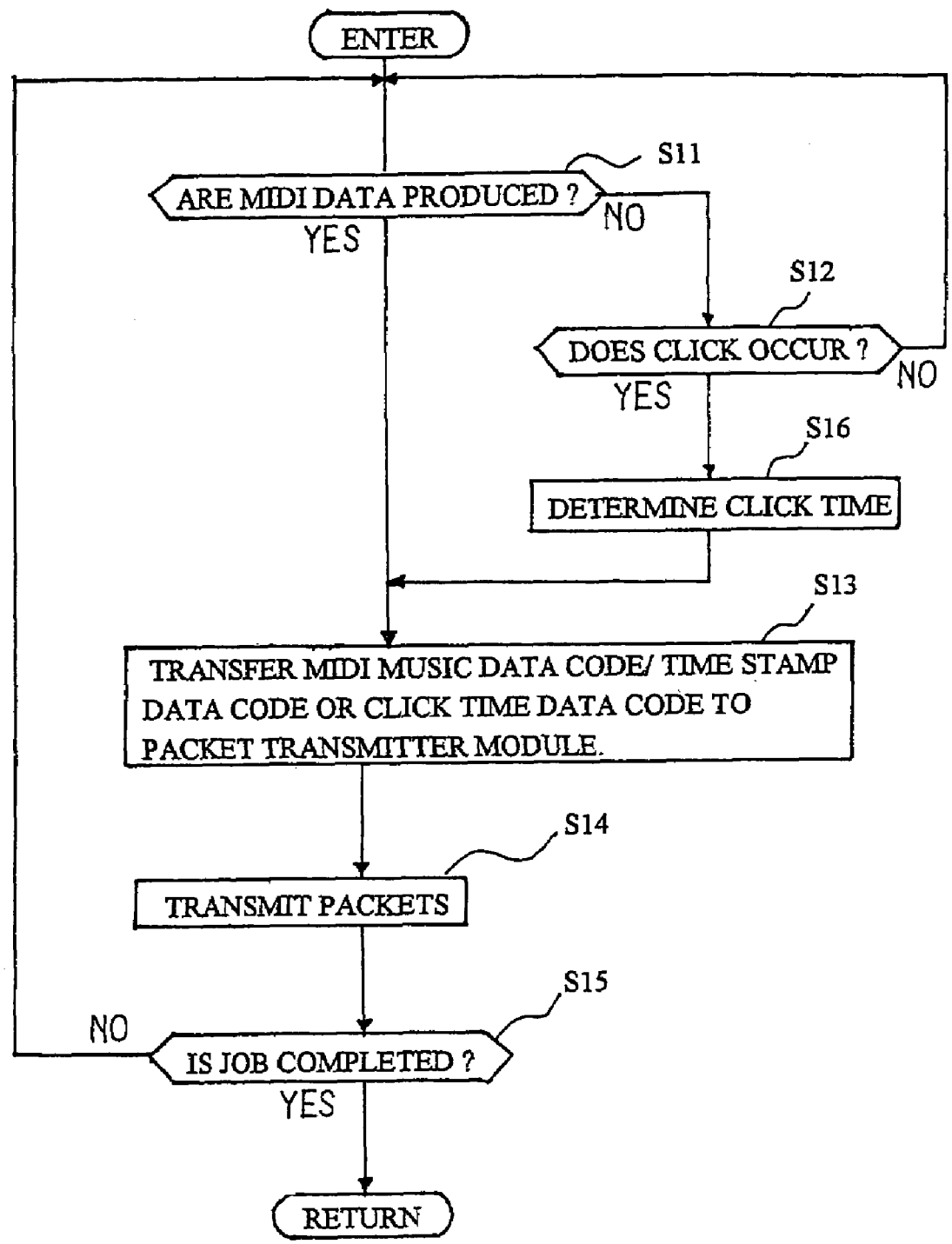
FIG. 16 is a flowchart showing a computer program on which a controller of the audio-visual station runs.

Description is hereinafter made on the computer programs executed by the personal computer systems 11A and 21A. The microprocessor, which forms a part of the personal computer system 11A, periodically enters a subroutine program shown in FIG. 16, and reiterates the loop consisting of steps S11 to S16.

The microprocessor firstly checks the interface between the personal computer system 11A and the electronic keyboard 12A to see whether or not a MIDI music data code or codes/associated time stamp data code arrives thereat as by step S11. Whenever the tutor M1 depresses the key or keys 12*c*, the time stamper 12*ab* imprints each MIDI music data code with the stamp time so that the MIDI music data codes are respectively accompanied with the time stamp data codes. When the answer at step S11 is given affirmative, the microprocessor transfers the MIDI music data code or codes/associated time stamp data code to the packet transmitter module 11*b* as by step S13 so that the packet transmitter module 11*b* transmits the MIDI music data code or codes/associated time stamp data code through the communication channel 10*ca* to the controller 21A as the payload of the packet or packets as by step S14.

On the other hand, if the tutor M1 does not change the key state, the answer at step S11 is given negative, and the microprocessor checks the working memory to see whether or not the click generator 11*c* has stored the click time data code therein as by step S12. When the click occurs, the click generator 11*c* checks the internal clock "A" 11*a* to see what time the internal clock "A" 11*a* points to, and produces the click time data code as by step S16. The click time data code is stored in the working memory. In this situation, the answer at step S12 is given affirmative. Then, the microprocessor transfers the click time data code to the packet transmitter module 11*b* at step S13, and the packet transmitter module 11*b* transmits the click time data code to the controller 21A as the payload of a packet at step S14.

If, on the other hand, the microprocessor does not find any click time data code, the answer at step S12 is given negative, and the microprocessor returns to step S11. Thus, the microprocessor reiterates the loop consisting of steps S11 and S12 until the answer at step S11 or S12 is changed to affirmative.

When the microprocessor completes the job at step S14, the microprocessor checks a flag assigned the tutor's instruction to see whether or not the tutor M1 completes the lesson as by step S15. While the tutor M1 is giving the lesson to the trainee M2, the answer at step S15 is given negative, and the microprocessor returns to step S11. Thus, the microprocessor reiterates the loop consisting of steps S11 to S16 until the tutor M1 completes the lesson. The videophone unit 13A transmits the digital mixed signal to the videophone unit 23A independently of the controller 11A.

When the tutor M1 completes the lesson, the answer at step S15 is given affirmative, and the microprocessor immediately returns to the main routine program.

Figure 17A:
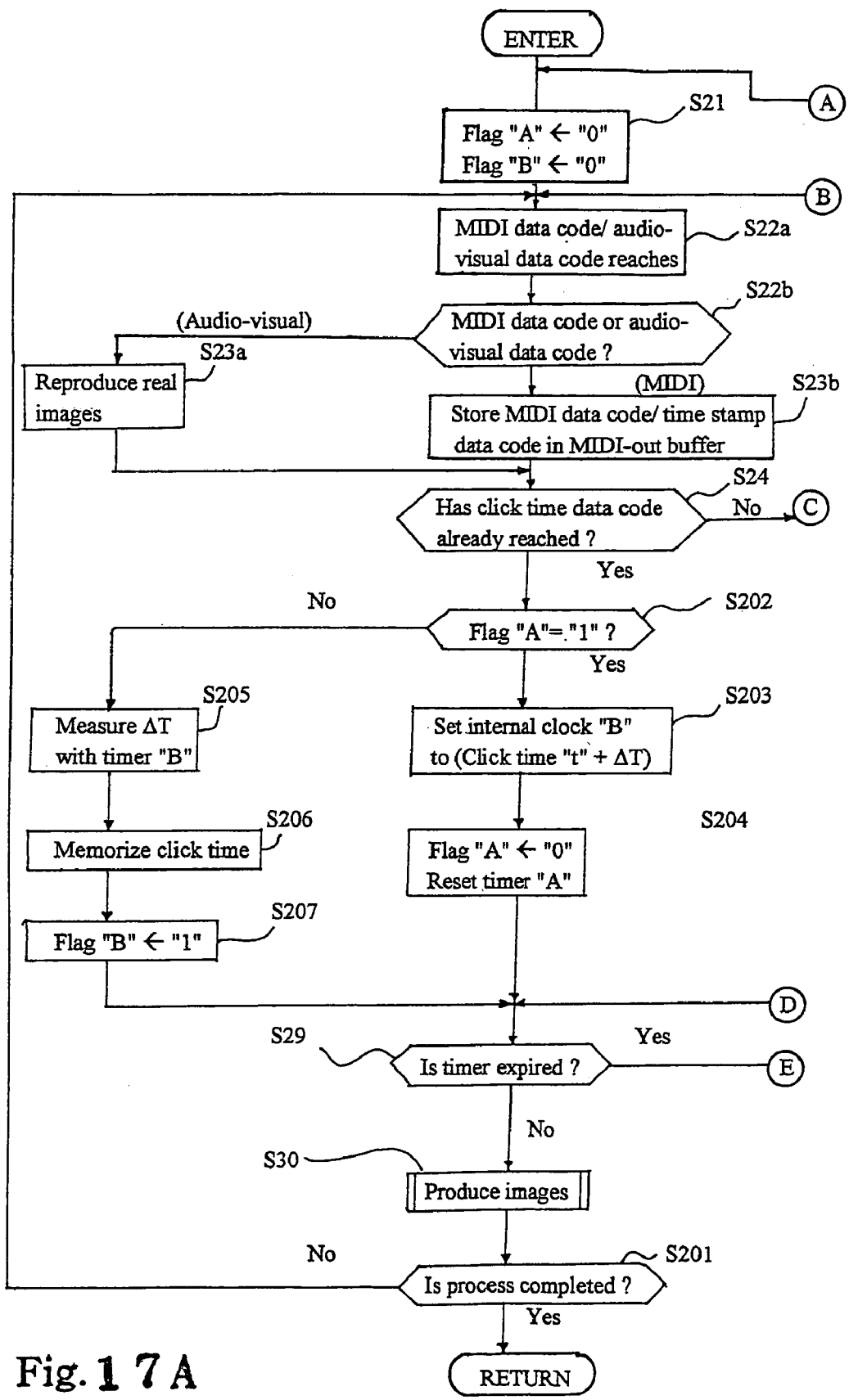
FIGS. 17A and 17B are flowcharts showing a computer program on which a controller of the other audio-visual station runs.
Figure 17:
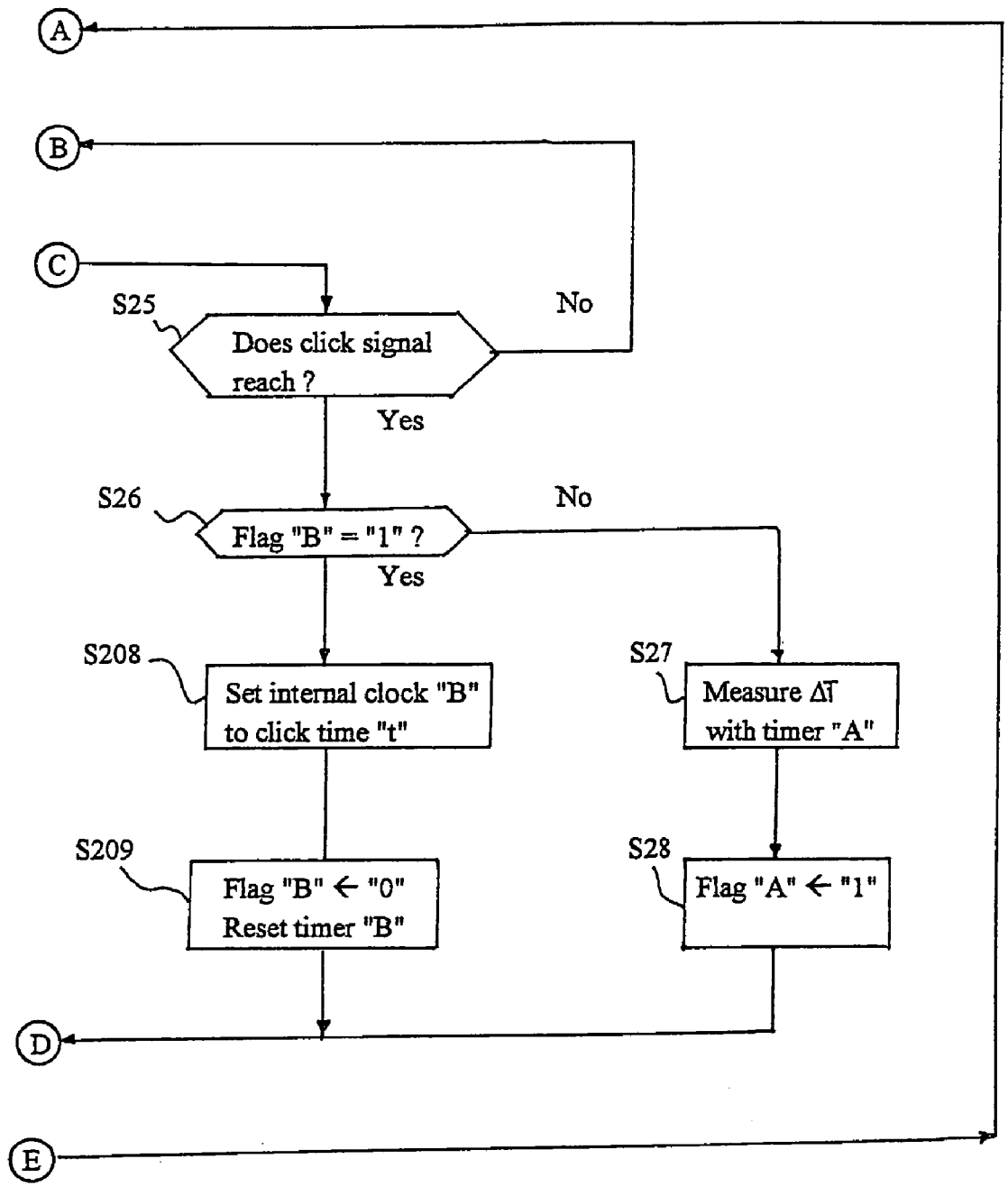

The microprocessor, which is incorporated in the controller 21A, runs on a subroutine program shown in FIGS. 17A and 17B so as to accomplish the jobs represented by the boxes 21*a*, 21*c*, 21*e* and 21*f*. The certain time period "A" is measured with a timer "A", and another timer "B" is used for the certain time period "B".

The microprocessor periodically enters the subroutine program, and reiterates the loop consisting of steps S21 to S30 and S201 to S209. The microprocessor firstly sets flags "A" and "B" to zero as by step S21. The microprocessor receives the packets through another subroutine program as the packet receiver module 21*c*, and fetches the audio-visual-data codes from the interface between the controller 21A and the videophone 23A through yet another subroutine program. Step S22*a* stands for the reception and data fetch.

The microprocessor checks the received data codes to see whether the data code expresses a piece of MIDI music data and associated time stamp or a piece of audio-visual data as by step S22*b*. When the microprocessor finds a piece of audio-visual data, the microprocessor produces an audio-visual signal from the piece of audio-visual data, and transfers the audio-visual signal to the display driver 21*g* so as to reproduce the real images of tutor's hands on the display unit 22A as by step S23*a*. On the other hand, when the MIDI music data code and associated time stamp data code reach the controller 21A, the microprocessor transfers the MIDI music data code and associated time stamp data code to the MIDI out buffer 21*d* so as to store them in the MIDI out buffer 21*d* as by step S23*b*.

Upon completion of the jobs at step S23*a* or S23*b*, the microprocessor checks the click time data buffer 21*b* to see whether or not the click time data code has already reached as by step S24.

When the microprocessor does not find the click time data code in the click time data buffer 21*b*, the answer at step S24 is given negative, and the microprocessor checks the working memory to see whether or not the videophone 23 has already notified the microprocessor of the arrival of the click signal as by step S25. If the click signal has not reached the videophone, the answer at step S25 is given negative, and the microprocessor returns to step S22a. Thus, while the audio-visual station 10E is receiving the MIDI music data codes/associated time stamp data codes and audio-visual data codes in the absence of the click time data code and the click signal, the microprocessor reiterates the loop consisting of steps S22a, S22b, S23a, S23b, S24 and S25, and accumulates the MIDI music data codes/associated time stamp data codes in the MIDI out buffer 21d or transfers the audio-visual data codes to the display driver 21g for reproducing the real images of tutor's hands.

When the videophone 23 notifies the microprocessor of the arrival of the click signal, the answer at step S25 is given affirmative, and the microprocessor checks the flag "B" to see whether or not the click signal is delayed as by step S26. When the microprocessor finds the flag "B" to have been already changed to "1", the microprocessor determines that the click signal is delayed from the associated click time data code, and sets the internal clock "B" with the click time data code as by step S208. Thus, the microprocessor, which serves as the clock setter 21e, adjusts the internal clock "B" to time "t". Subsequently, the microprocessor changes the flag "B" to zero, and resets the timer "B" to zero as by step S209. Upon completion of the jobs at step S209, the microprocessor proceeds to step S29.

If the microprocessor finds the flag "B" to be till zero at step S26, the answer at step S24 is given negative, and the microprocessor determines that the click time data code is delayed from the click signal. Then, the microprocessor starts the timer "A" as by step S27, and changes the flag "A" to 1 as by step S28. Upon completion of the job at step S28, the microprocessor proceeds to step S29.

When the microprocessor finds a click time data code in the click time data buffer 21b at step S24, the answer at step S24 is given affirmative, and the microprocessor checks the working memory to see whether or not the flag "A" is indicative of "1" as by step S202. When the flag "A" is indicative of zero, the microprocessor determines that the click time data code is delayed from the associated click signal, and adjusts the internal clock "B" 21a to (t+ÄT) as by step S203. Subsequently, the microprocessor changes the flag "A" to zero, and resets the timer "A" to zero as by step S204. Upon completion of the jobs at step S204, the microprocessor proceeds to step S29.

If the flag "A" is indicative of zero, the answer at step S202 is given negative, and the microprocessor determines that the click signal is delayed from the associated click time data code. Then, the microprocessor starts the timer "B" as by step S205, stores the click time data code in the click time data buffer 21b as by step S206, and changes the flag "B" to 1 as by step S207. Upon completion of the job at step S207, the microprocessor proceeds to step S29.

Although the timer "A" or timer "B" started to measure the lapse of time at step S27 or S205, there is not any guarantee that the associated click time data code or associated click signal reaches the audio-visual station 10E. The microprocessor checks the timer "A" or timer "B" to see whether or not the certain time period is expired as by step S29. If the associated click time data code or associated click signal has not reached the audio-visual station 10E before expiry of the certain time period, the answer at step S29 is given affirmative, and the microprocessor returns to step S21, and resets both flags "A" and "B" to zero. This means that the microprocessor ignores the click signal or click time data code already reached. The microprocessor restarts the setting work after the next click time data code and associated click signal reaches the audio-visual station 10E. Even though the microprocessor once skips the setting work, the time lag between the images of note bars and the rear images of tutor's hands is ignoreable.

On the other hand, if the timer "A" or "B" is indicative of a lapse of time shorter than the certain time period, the answer at step S29 is given negative, and the microprocessor proceeds to a subroutine program S30 for producing the images of note bars. The microprocessor serves as the timing controller 21f, and determines the timing at which the electronic tone is to be produced or decayed. When predetermined time comes, the microprocessor supplies a piece of image data representative of the note bar to the display driver 21g. Then, the display driver 21g produces the audio-visual signal from the piece of image data, and supplies the audio-visual signal to the display unit 22A so as to produce the image of note bar. Thus, the images of note bars are reproduced synchronously with the fingering on the keys 12c. The subroutine program will be hereinafter described with reference to FIG. 18.

When the microprocessor returns from step S30, the microprocessor checks the working memory to see whether or not the tutor M1 has finished the lesson as by step S201. While the tutor M1 is continuing the lesson, the answer at step S201 is given negative, and the microprocessor returns to step S22a. Thus, the microprocessor reiterates the loop consisting of steps S22a to S30 and S201 to S209 during the lesson.

When the tutor M1 finishes the lesson, he or she instructs the controller 21A to terminate the data processing through the controller 11A so that the answer at step S201 is given affirmative. Then, the microprocessor immediately returns to the main routine program.

When the microprocessor returns from step S30, the microprocessor checks the working memory to see whether or not the tutor M1 has finished the lesson as by step S201. While the tutor M1 is continuing the lesson, the answer at step S201 is given negative, and the microprocessor returns to step S22a. Thus, the microprocessor reiterates the loop consisting of steps S22a to S30 and S201 to S209 during the lesson.

When the tutor M1 finishes the lesson, he or she instructs the controller 21 to terminate the data processing through the controller 11 so that the answer at step S201 is given affirmative. Then, the microprocessor immediately returns to the main routine program.

Description is hereinafter made on the subroutine program for producing the images of note bars with reference to FIG. 18. The trainee M2 sits on the stool in front of the electronic keyboard 24A, and is opposed to the screen of the display unit 22A. As shown in FIGS. 19A and 19B, the screen of the display unit 22A is split into two areas G1 and G2. The moving images of tutor's hands on the keys 12c are reproduced in the upper area G1 from the pieces of audio-visual data in a single frame, and the images of note bars Ba are produced in the other lower area G2. The images of note bars Ba are respectively located over the images of associated black/white keys 12c.

A piano roll system is employed. The piano scroll technique is disclosed in Japanese Patent No. 3058051. The scenes are duplicated at high speed. Parts of the scene are deleted from the previous scene, and new images are added to the previous scene. Thus, the images are moved as if the scene is scrolled.

The images of note bars Ba are moved down toward the images of associated keys 12c as if the scene is scrolled. For example, the note bar Ba1 is indicative of the timing at which the key 12c1 is to be depressed and the time period over which the trainee M2 is to depress the key 12c1. When the images of note bars Ba reach the images of associated keys 12c, the trainee is expected to start to depress the corresponding keys of the electronic keyboard 24A. The length of the images of note bars Ba is corresponding to the notes or the length of electronic tones to be produced so that the trainee M2 is to continuously depress the keys until the associated note bars go down under the boundary between the area G1 and the area G2. Although the scene is intermittently moved down, the trainee M2 feels the scene to be continuously scrolled. Term "scroll time interval" means a lapse of time between the presently produced scene and the previous scene.

Figure 18:
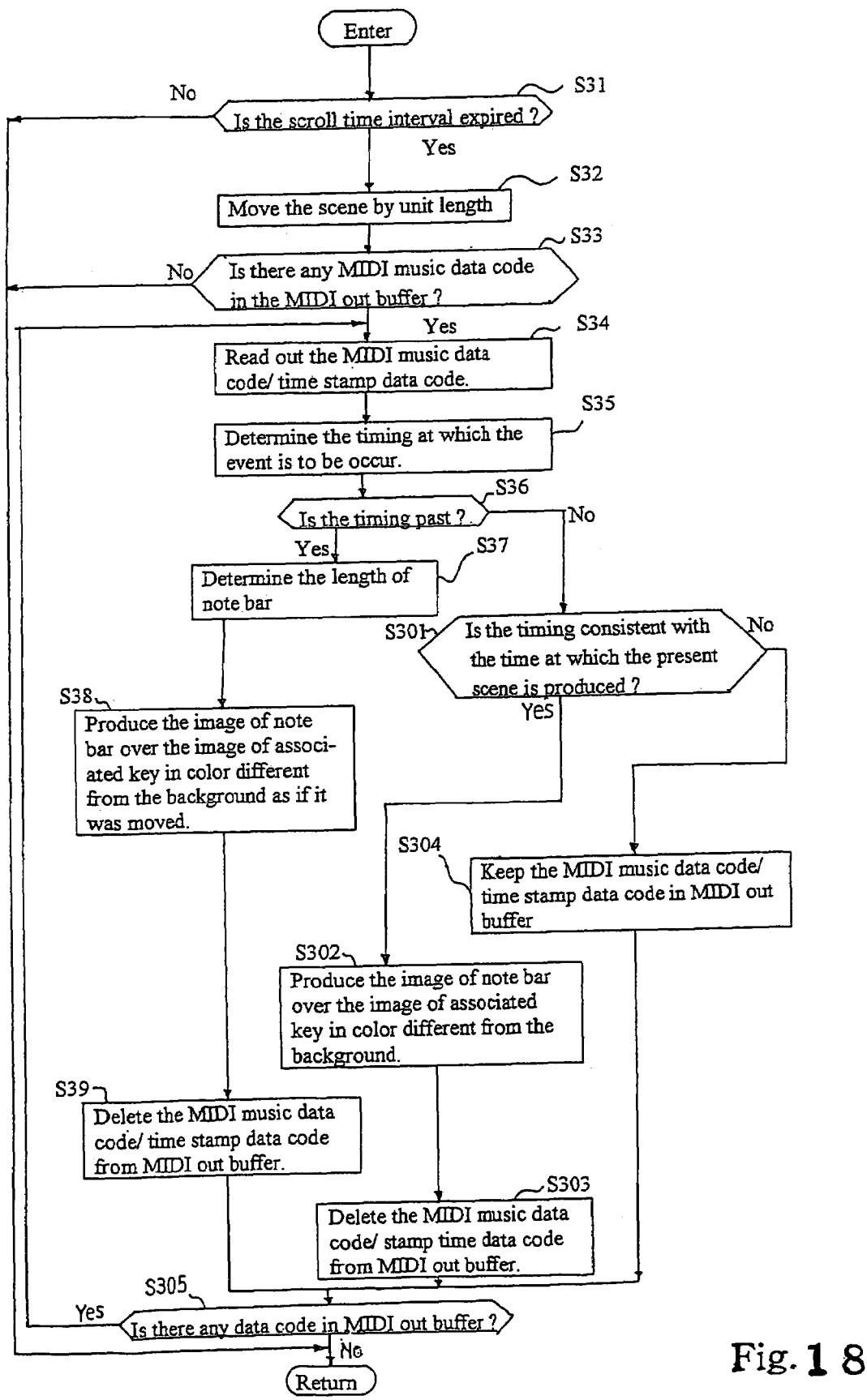
FIG. 18 is a flowchart showing a computer program for producing images of note bars on a display unit.
Figure 19:
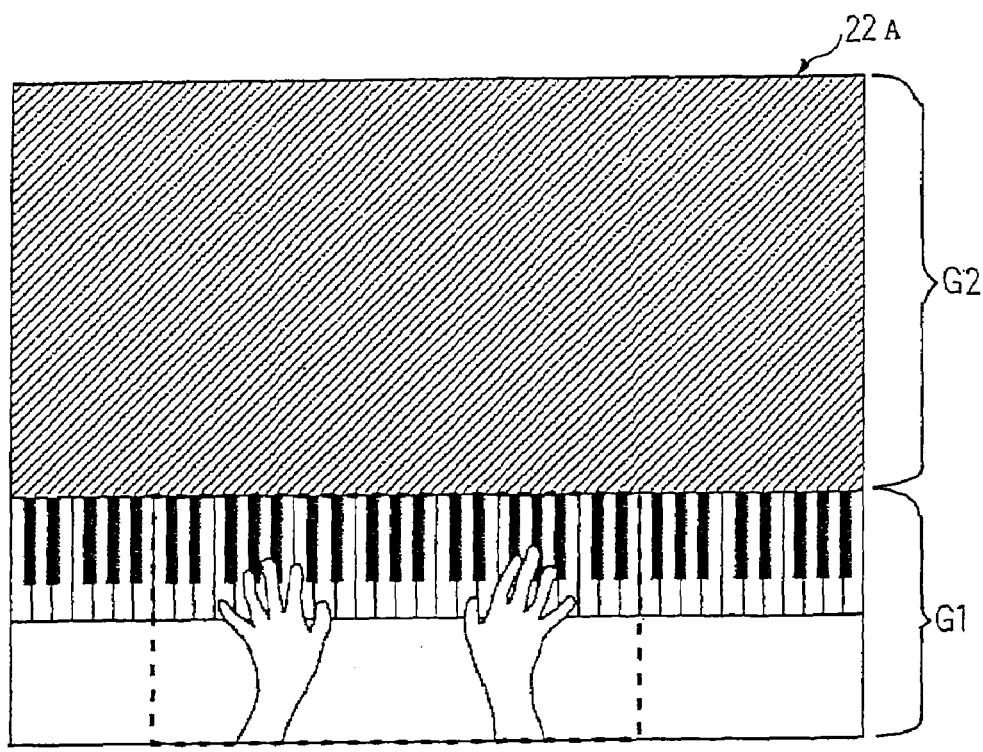
FIGS. 19A and 19B are views showing a scene before a lesson and a scene in the lesson.
Figure 19:
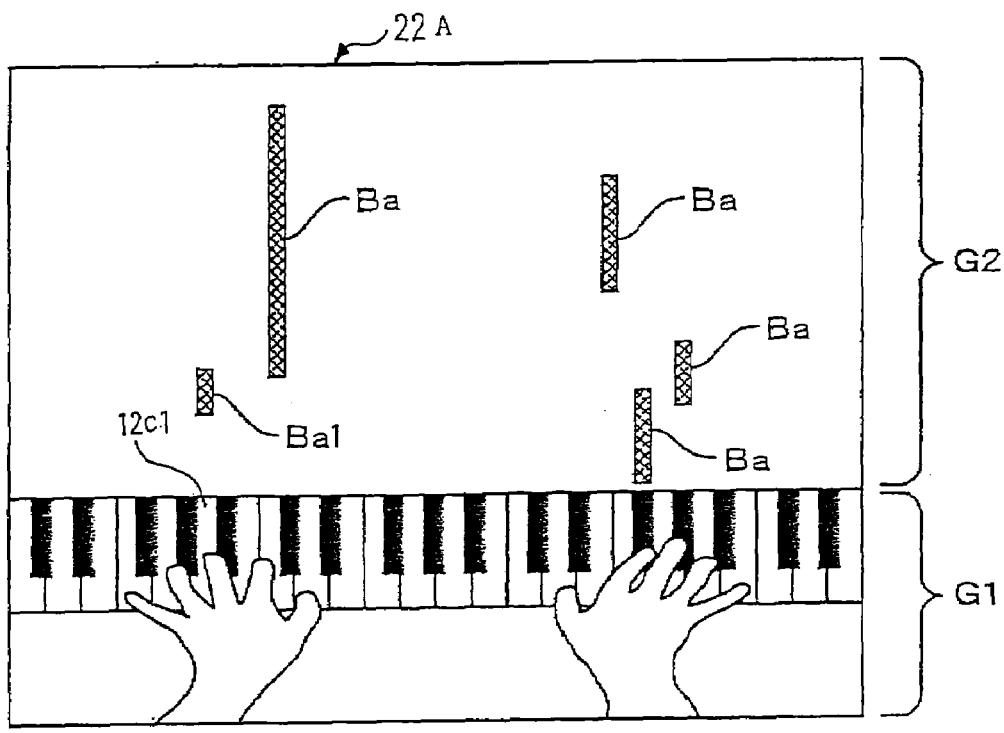

When the microprocessor enters the subroutine program shown in FIG. 18, the microprocessor firstly checks a timer to see whether or not the scroll time interval is expired as by step S31. If the lapse of time from the previous scroll is shorter than the scroll time interval, the answer is given negative, and the microprocessor immediately returns to the subroutine program shown in FIGS. 17A and 17B. On the other hand, when the microprocessor confirms that the scroll time interval is expired, the answer at step S31 is given affirmative, and the microprocessor scrolls the scene by unit length as by step S32.

Subsequently, the microprocessor checks the MIDI out buffer 21d to see whether or not a MIDI music data code/associated time stamp data code has been already stored therein as by step S33. When the microprocessor does not find any MIDI music data code, the answer at step S33 is given negative, and the microprocessor immediately returns to the subroutine program shown in FIGS. 17A and 17B.

On the other hand, if at least one MIDI music data code/associated time stamp data code have been already stored in the MIDI out buffer 21d, the answer at step S33 is given affirmative, and the microprocessor reads out the MIDI music data code or codes expressing a single event and associated time stamp data code from the MIDI out buffer 21d as by step S34. The microprocessor determines the time at which the event is to be occur as by step S35. The microprocessor reads the time on the internal clock "B" 21a, and compares the stamp time, which is represented by the time stamp data code, with the time on the internal clock "B" 21a to see whether or not the time at which the event occur is past as by step S36.

If the answer at step S36 is given affirmative, the corresponding image of note bar Ba is to be produced as if it was produced at the proper timing, and the microprocessor determines the length of the image of corresponding note bar Ba on the present scene as by step S37.

When the microprocessor determines the length of the corresponding bar in the present scene, the microprocessor supplies a piece of image data representative of the note bar in the present scene to the display driver 21g, and the display driver 21g produces the image of the note bar Ba on the display unit 22A as by step S38. The display driver 21g changes the pixels on which the image of note bar Ba is produced to the predetermined color so that the trainee M2 feels the image of note bar Ba to be downwardly moved.

Upon completion of the job at step S38, the microprocessor deletes the MIDI music data code and associated time stamp data code from the MIDI out buffer 21d as by step S39, and proceeds to step S305.

If, on the other hand, the answer at step S36 is given negative, the microprocessor compares the stamp time with the time at which the display driver 21g started to produce the present scene as by step S301. If the answer is given negative, the image of corresponding note bar Ba is to be produced in future so that the microprocessor keeps the MIDI music data code/associated time stamp data code in the MIDI out buffer 21d as by step S304. Upon completion of the job at step S304, the microprocessor proceeds to step S305.

When the answer is given affirmative, the microprocessor determines the pixels on which the image of a note bar Ba is to be produced, and supplies a piece of image data representative of the note bar Ba to the display driver 21g. The display driver 21g changes the pixels to the predetermined color different from that of the other pixels where the background image is produced as by step S302, and deletes the MIDI music data code and associated time stamp data code from the MIDI out buffer 21d as by step S303. Upon completion of the job at step S303, the microprocessor proceeds to step S305.

The microprocessor checks the MIDI out buffer 21d to see whether or not there still remains a MIDI music data code and associated time stamp data code therein at step S305. When the microprocessor finds another MIDI music data code and associated time stamp data code in the MIDI out buffer 21d, the answer is given affirmative, and the microprocessor returns to step S34. Thus, the microprocessor reiterates the loop consisting of steps S34 to S39 and S301 to S305 so as to produce the images of new notes bar and move the images of note bars already produced on the previous scene. However, if the microprocessor does not find any MIDI music data code and associated time stamp data code in the MIDI out buffer 21d, the answer at step S305 is given negative, and the microprocessor returns to the subroutine program shown in FIGS. 17A and 17B.

While the microprocessor is cooperating with the display driver 21g, the real images of tutor's hands, which are moved as if the tutor M1 fingers on the keyboard near the trainee M2, and the images of note bars Ba are produced on the display unit 22A, and the electronic tones and tutor's oral directions are heard from the display unit 22A. The images around the electronic keyboard 12A are firstly reproduced from the audio-visual data codes on the display unit 22A before the lesson. The real images of the electronic keyboard 12A, which includes the real images of keys 12c, and tutor's hands appear in the entire area G1+G2 as shown in FIG. 19A. The hatching lines in the upper area G2 stands for the real image of the cabinet of the electronic keyboard 12A. In order to designate the leftmost key 12c and the rightmost key 12c to be depressed in the lesson, the tutor M1 may depress these keys 12c before the lesson so as to permit the controller 21A to determine the real images in the area G1. As described hereinafter, the images of keys 12c are enlarged in the lesson.

When the tutor M1 starts to finger on the keys 12c, the MIDI music data codes intermittently arrive at the audio-visual station 10E, and the images of note bars Ba are reproduced in the area G2 as shown in FIG. 19B. The real images of tutor's hands on the predetermined keys 12c, which are encircled in broken lines in FIG. 19A, are enlarged, and the enlarged real images are assigned to the lower area G1. FIG. 19B shows one of the scenes, and the scenes are changed at high speed so that the real images of tutor's fingers are moved as similar to the tutor's fingers on the keys 12c.

Since the images of note bars Ba are indicative of the keys to be depressed, the timing at which the keys are depressed and the length of the tones, the trainee M2 practices the fingering on the keyboard 24A under the guidance of the images of note bars Ba. Moreover, since the tutor M1 gives an exhibition of the fingering through the real images in the area G1, the trainee M2 easily understands how to move the fingers.

A time lag is ignoreable between electronic keyboards connected through MIDI cable. The time lag is serious between the electronic keyboards connected through the public communication channels without any synchronization due to the variable traffic congestion. If the audio-visual data codes are transmitted between audio-visual stations in parallel to the MIDI music data codes without any clock setting work, the images of tutor's hands are liable to be delayed from the images of note bars.

Figure 20:
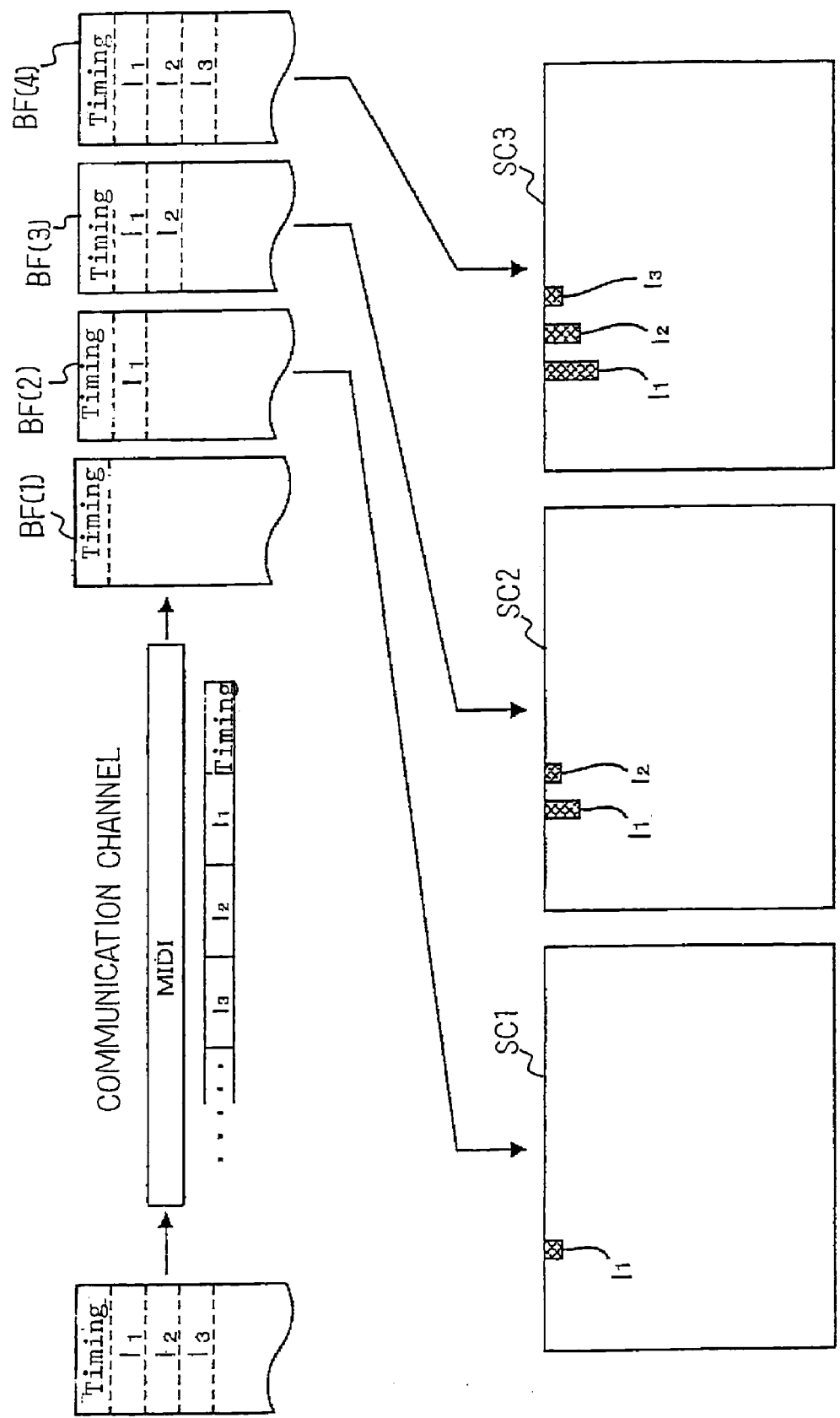
FIG. 20 is a schematic view showing a data transmission of MIDI music data codes without any time stamp.

FIG. 20 shows the serial transmission of MIDI music data codes $I_1$, $I_2$ and $I_3$ without any time stamp. Assuming now that plural events concurrently take place, the MIDI music data codes $I_1$, $I_2$ and $I_3$, which respectively represent the events, are concurrently produced, and a timing data code is added to the MIDI music data codes $I_1$, $I_2$ and $I_3$. The timing data code and MIDI music data codes $I_1$, $I_2$ and $I_3$ are serially transmitted through the communication channel. The timing data code firstly reaches the data buffer BF, and is stored therein as indicated by BF(1). Subsequently, the MIDI music data code $I_1$ reaches the data buffer BF, and is stored therein together with the timing data code as indicated by BF(2). The MIDI music data codes $I_2$ and $I_3$ intermittently reach the data buffer, and are stored therein as indicated by BF(3) and BF(4). Since the MIDI music data codes $I_1$, $I_2$ and $I_3$ are not imprinted with time, the images of note bars $I_1$, $I_2$ and $I_3$ are immediately produced on the display unit. In detail, when the MIDI music data code $I_1$ is stored in the data buffer BF, the image of the corresponding note bar $I_1$ is produced on the display unit 22 as indicated by SC1. When the next MIDI music data code $I_2$ is stored in the data buffer BF, the image of the note bar $I_1$ is slightly moved down, and the image of the note bar $I_2$ is newly produced in the scene SC2 together with the image of the note bar $I_1$. When the next MIDI music data code $I_3$ is stored in the data buffer BF, the images of the note bars $I_1$ are slightly moved down, and the image of the note bar $I_3$ is newly produced in the scene SC3. Thus, although the events concurrently take place, the images of note bars $I_1$, $I_2$ and $I_3$ are sequentially produced on the display unit.

Figure 21:
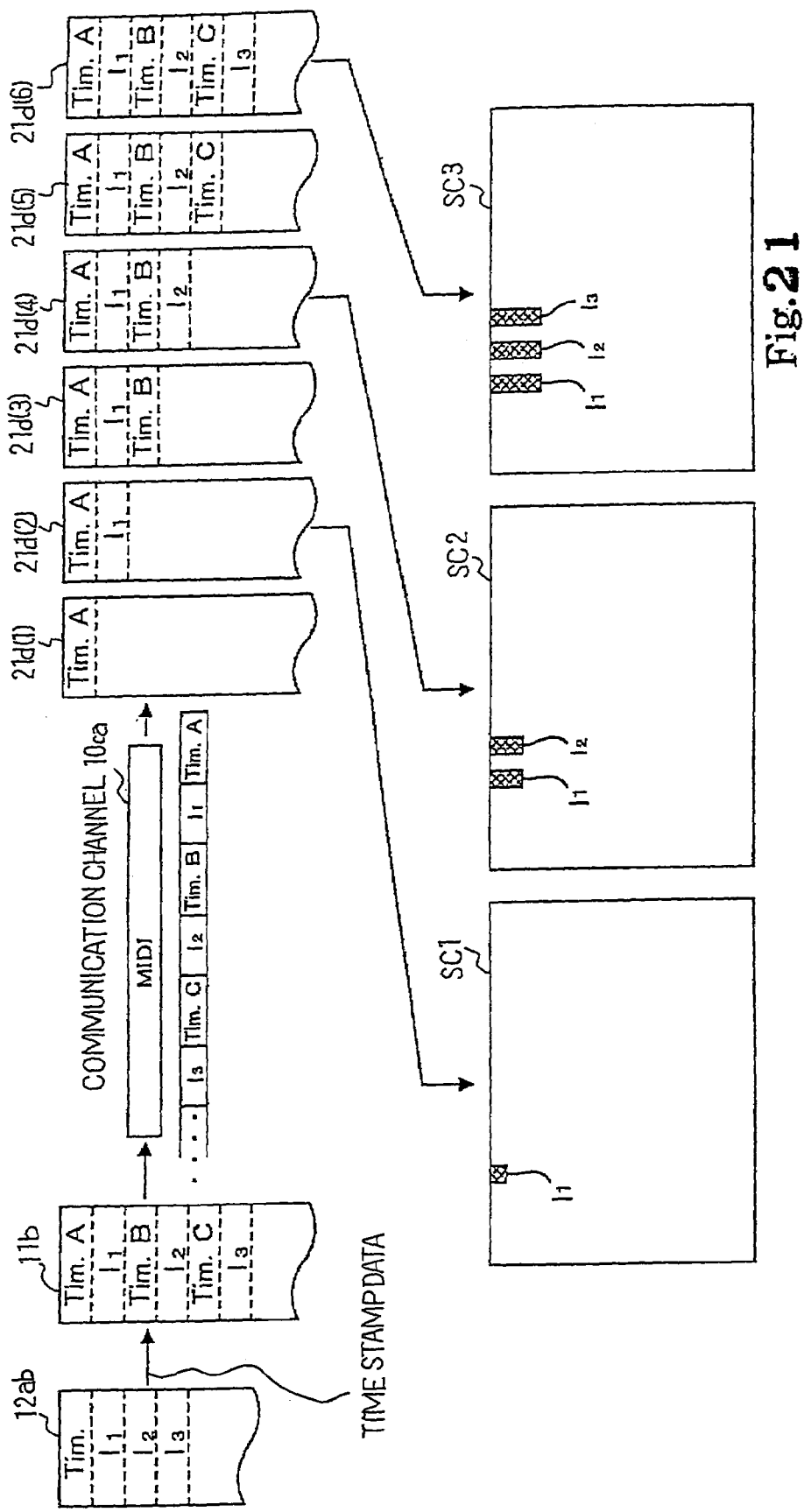
FIG. 21 is a schematic view showing a data transmission of MIDI music data codes together with time stamp data codes.

The music education support system of FIG. 21 behaves differently from the system shown in FIG. 20. Three events are assumed to concurrently take place. The electronic keyboard 12A produces the MIDI music data codes $I_1$, $I_2$ and $I_3$, and the timer stamper 12ab gives the same stamp time to the MIDI music data codes $I_1$, $I_2$ and $I_3$. The MIDI music data codes $I_1$, $I_2$ and $I_3$ are paired with the time stamp data codes Tim. A, Tim. B, Tim. C, which are indicative of the same stamp time, and the MIDI music data codes and time stamp data codes are serially transmitted from the packet transmitter module 11b through the communication channel 10ca to the controller 21A in the order of Tim. A, $I_1$,Tim. B, $I_2$, Tim. C, and $I_3$. The time stamp data code Tim. A firstly arrives at the controller 21A, and is stored in the MIDI out buffer 21d as indicated by 21d(1). Next, the MIDI music data code $I_1$ arrives at the controller 21, and is stored in the MIDI out buffer 21d as indicated by 21d(2). Thus, the time stamp data code Tim. B, MIDI music data code $I_2$, time stamp data code Tim. C and MIDI music data code $I_3$ intermittently arrive at the controller 21, and are stored in the MIDI out buffer 21d as indicated by 21d(3), 21d(4), 21d(5) and 21d(6).

The microprocessor runs on the subroutine program shown in FIG. 18, and produces the images of note bars on the display unit 22A. First, when the internal clock "B" reaches the stamp time Tim. A, the microprocessor determines the image of note $I_1$, and supplies a piece of image data representative of the image of note bar $I_1$ to the display driver 21g as by step S302. The display driver 21g produces the image of note bar $I_1$ in the scene SC1.

Subsequently, the microprocessor reads out the next time stamp data code Tim. B, and notices that the stamp time Tim. B is same as the stamp time Tim. A at step S36. Then, the microprocessor determines the length of the image of note bar $I_2$ at step S37. Since the stamp time Tim. B is same as the stamp time Tim. A, the image of note bar $I_2$ is to be equal in length to the image of note bar $I_1$ in the next scene SC2. The microprocessor supplies the pieces of image data representative of the images of note bars $I_1$ and $I_2$ to the display driver 21g so that the display driver 21g produces the images of note bars $I_1$ and $I_2$ in the scene SC2.

When the microprocessor fetches the next time stamp data code Tim. C, the microprocessor notices that the stamp time Tim. C is same as the stamp times Tim. A and Tim. B, and determines the length of the image of note bar $I_3$ at step S38. Since the stamp time Tim. C is same as the stamp times Tim. A and Tim. B, the image of note bar $I_3$ is equal in length to the images of note bars $I_1$ and $I_2$ so that the display driver 21g produces the images of note bars $I_1$, $I_2$ and $I_3$ equal in length to one another in the next scene SC3. Although the data codes are transmitted from the controller 11 to the controller 21A in serial, the images of note bars $I_1$, $I_2$ and $I_3$ are produced on the display unit 22A as if the MIDI music data codes $I_1$, $I_2$ and $I_3$ arrive in parallel at the controller 21A. Thus, the controller 21A eliminates the time lag from the images of note bars $I_1$, $I_2$ and $I_3$.

In case where the images of note bars appear in the scene before the trainee is expected to depress the corresponding keys, the real images of fingers are to be delayed from the stamp times. The delay time is equal to the time consumed by the associated images of note bars which are moved across the area G2. Otherwise, the microprocessor is to supply the pieces of image data the predetermined time in advance of the real images of tutor's hands. On the other hand, in case where the images of note bars appear in the scene at the time when the trainee M2 is expected to depress the keys, the microprocessor supplies the pieces of image data to the display driver 21g without any delay from the audio-visual data codes. Thus, the images of note bars are timely produced on the display unit 22A by virtue of the time stamp.

Although the time stamper 12ab produces the time stamp data code for each of the MIDI music data code in the second embodiment, the time stamper of another embodiment may imprint the MIDI music data codes produced concurrently with the other MIDI music data codes with a single stamp time. In this instance, the microprocessor runs on a subroutine program shown in FIGS. 22A and 22B, which is different from the subroutine program shown in FIG. 18. The system configuration and other computer programs are similar to those of the second embodiment so that the other system components are labeled with references same as those designating the corresponding system components shown in FIGS. 12 and 13.

Description is hereinafter focused on the subroutine program and images of note bars with reference to FIGS. 22A, 22B and 23. While the tutor M1 is fingering on the keyboard 12A, the time stamper 12ac selectively imprints the MIDI music data codes with the stamp time. When the tutor M1 concurrently depresses the keys 12c, plural MIDI music data codes, which express the note-on events, are produced. However, the time stamper 12ac imprints the first MIDI music data code with the stamp time. This means that the other MIDI music data codes are transferred to the packet transmitter module 11b without any time stamp data code. Of course, when the tutor M1 depresses another key 12c after the plural keys, the time stamper 12ac imprints the MIDI music data code with the stamp time for the newly depressed key 12c.

Figure 23:
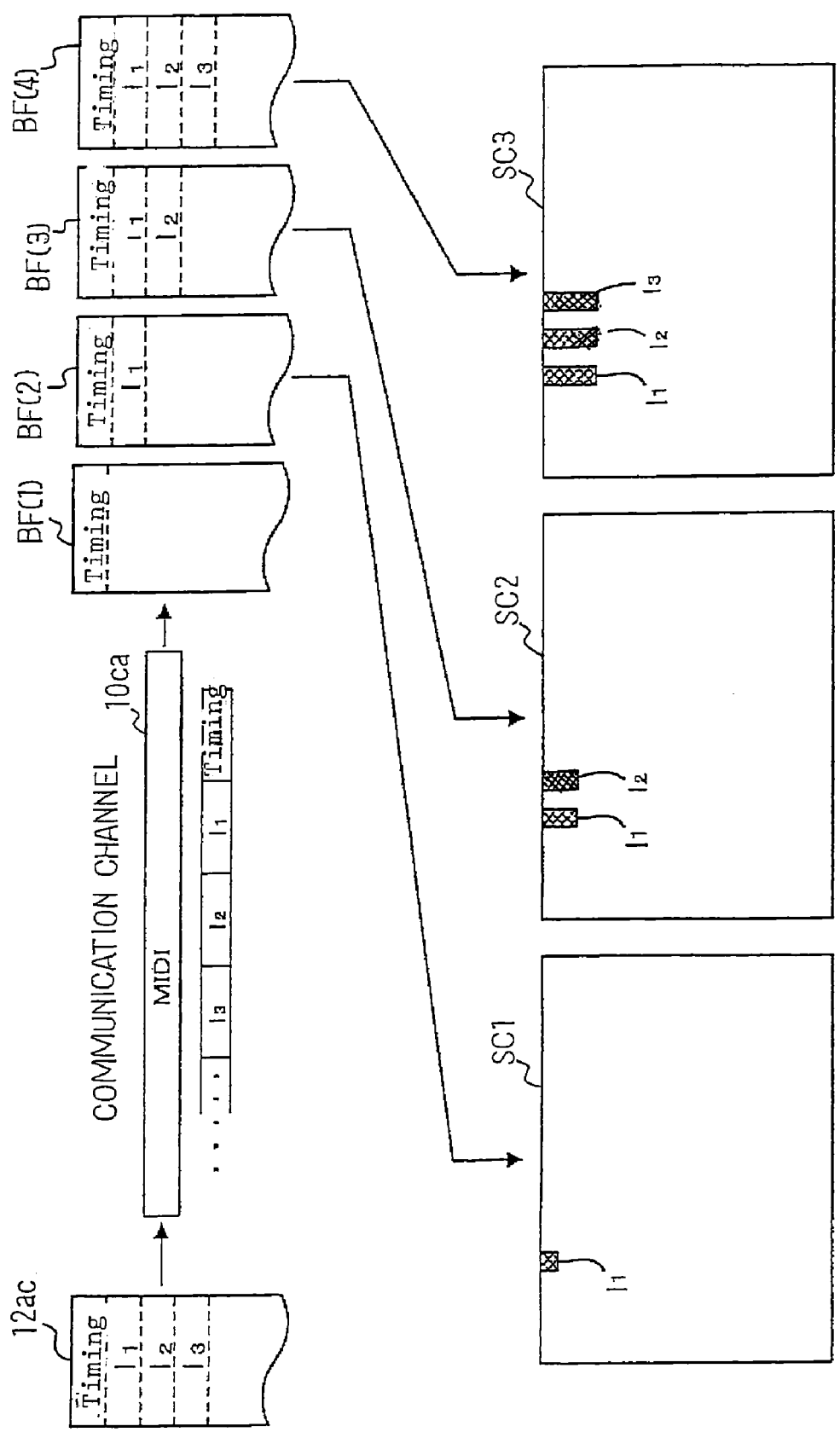
FIG. 23 is a schematic view showing a data transmission of MIDI music data codes and a time stamp data code for the plural MIDI music data codes.

The packet transmitter module 11b loads the time stamp data code and MIDI music data codes concurrently produced at the stamp time into the packets, and delivers the packets to the communication channel 10ca as shown in FIG. 23. The packets arrives at the controller 21A, and the time stamp data code is firstly stored in the MIDI out buffer 21d as indicated by BF(1). The MIDI music data codes $I_1$, $I_2$ and $I_3$ are successively stored in the MIDI out buffer 21d as indicated by BF(2), BF(3) and BF(4).

Figure 22:
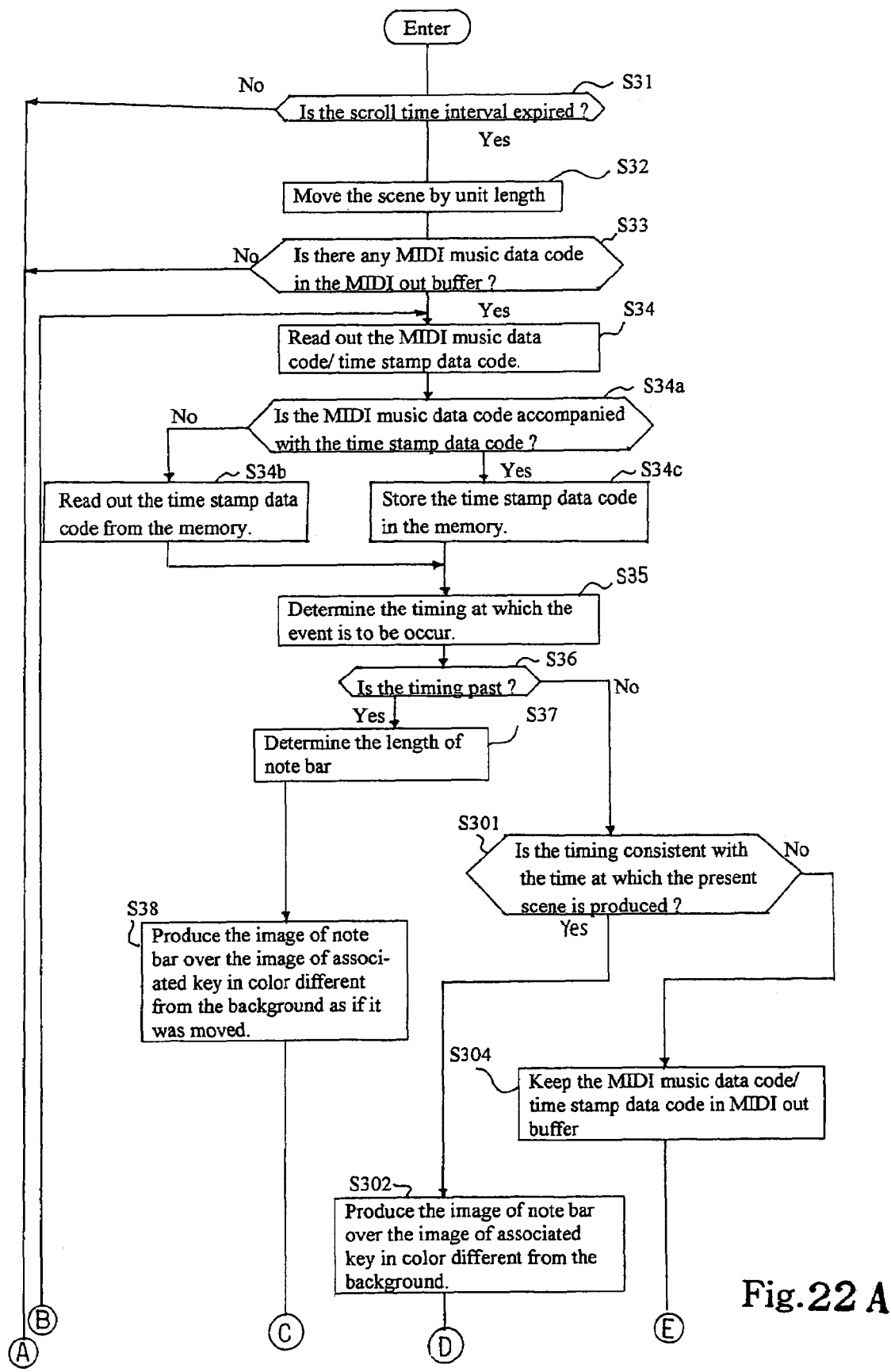
FIGS. 22A and 22B are views showing a subroutine program for another audio-visual station for producing images of note bars.
Figure 22:
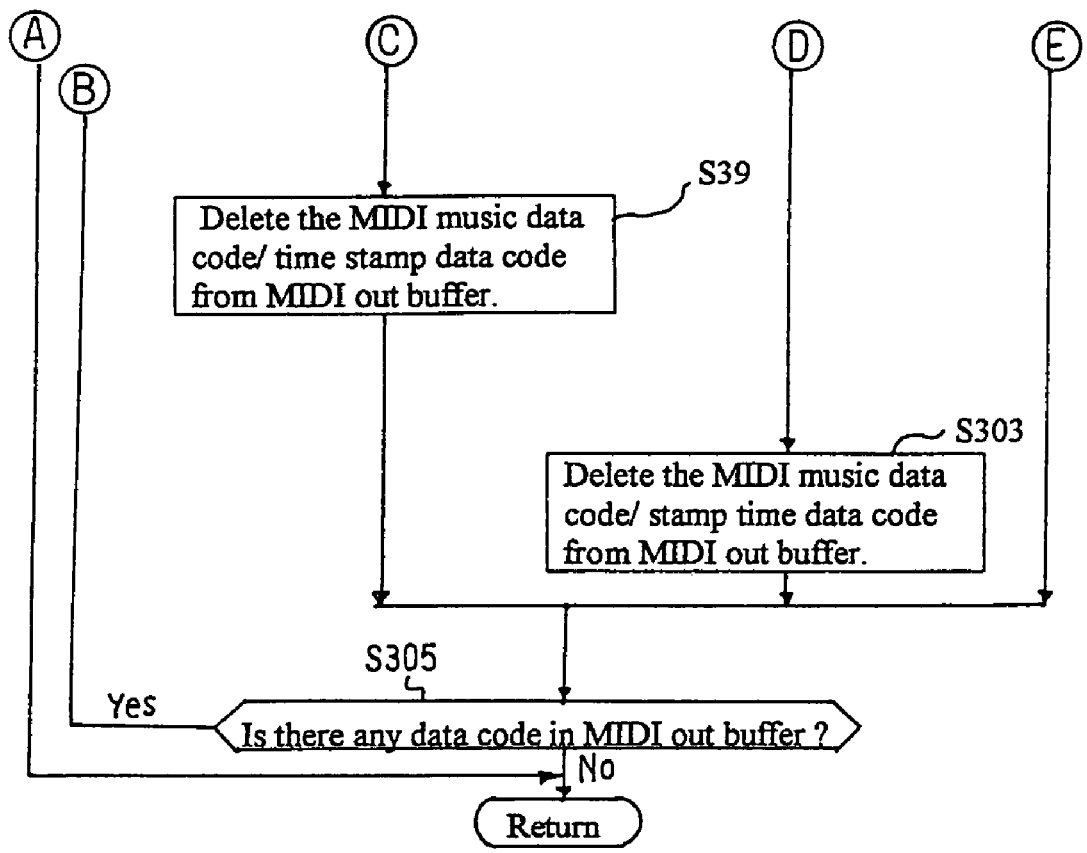

The microprocessor, which is incorporated in the controller 21A, periodically enters the subroutine program shown in FIGS. 22A and 22B, and timely supplies the pieces of image data representative of note bars $I_1$, $I_2$ and $I_3$ to the display driver 21g for producing the images of note bars $I_1$, $I_2$ and $I_3$. In the subroutine program shown in FIGS. 22A and 22B, steps S31 to S34, S35 to S39 and S301 to S305 are same as those in FIG. 18, and steps 34a, 34b and 34c are added to the subroutine program. For this reason, description on the same steps is omitted for the sake of simplicity.

The time stamp data code and MIDI music data codes $I_1$, $I_2$ and $I_3$ are assumed to accumulate in the MIDI out buffer 21d. The microprocessor accesses the MIDI out buffer 21d at step S34, and checks the MIDI out buffer 21d to see whether or not the first MIDI music data code $I_1$ is accompanied with the time stamp data code as by step S34a. The first MIDI music data code $I_1$ is accompanied with the time stamp data code, and the answer at step S34a is given affirmative. Then, the microprocessor stores the time stamp data code in the working memory as by step S34c, and proceeds to step S35. The microprocessor passes steps S36, S301 and S302, and produces the image of note bar $I_1$ through the steps S36. Thus, the image of note bar $I_1$ is produced in the scene SC1 as shown in FIG. 23. Since the MIDI music data codes $I_2$ and $I_3$ are still left in the MIDI output buffer 21d, the answer at step S305 is given affirmative, and the microprocessor returns to step S34, and reads out the next MIDI music data code $I_2$ at step S34.

As described hereinbefore, the MIDI music data codes $I_1$, $I_2$ and $I_3$ were concurrently produced so that the second MIDI music data code $I_2$ is not accompanied with any time stamp data code. For this reason, the answer at step S34a is given negative, and the microprocessor reads out the time stamp data code from the working memory as by step S34b, and determines the length of the image of note bar $I_2$ at step S37. The length of the image of note bar $I_2$ is determined as if the image of note bar $I_2$ was produced concurrently with the image of note bar $I_1$. The microprocessor supplies the piece of image data representative of the note bar $I_2$ to the display driver 21g, and the display driver 21g produces the image of note bar $I_2$ in the next scene SC2 together with the image of note bar $I_1$.

The microprocessor returns to step S34, again, and reads out the next MIDI music data code $I_3$ at step S34. The MIDI music data code $I_3$ is not accompanied with any time stamp data code, and the answer at step S34a is given negative. The microprocessor reads out the time stamp data code from the working memory at step S34b, and determines the length of the image of note bar $I_3$ at step S37. The image of note bar $I_3$ is produced in the next scene SC3 together with the images of note bars $I_1$ and $I_2$ as if the image of note bar $I_3$ was produced concurrently with the other images of note bars $I_1$ and $I_2$.

Thus, although the time stamper 12ac imprints only the first MIDI music data code with the stamp time, the images of note bars $I_1$, $I_2$ and $I_3$ are produced on the display unit 22A as if the same stamp time is imprinted on all the MIDI music data codes.

As will be understood, the click time data code is shared among the MIDI music data codes concurrently produced, and the images of note bars are produced as if the MIDI music data codes are respectively accompanied with the same click time data codes. The payload of packets is lighter than that of the second embodiment, and the setting work is carried out at intervals longer than those of the second embodiment. Thus, the click time data code shared among the concurrently produced MIDI music data codes is conducive to the high-speed data processing in the music education support system.

Third Embodiment

Figure 24:
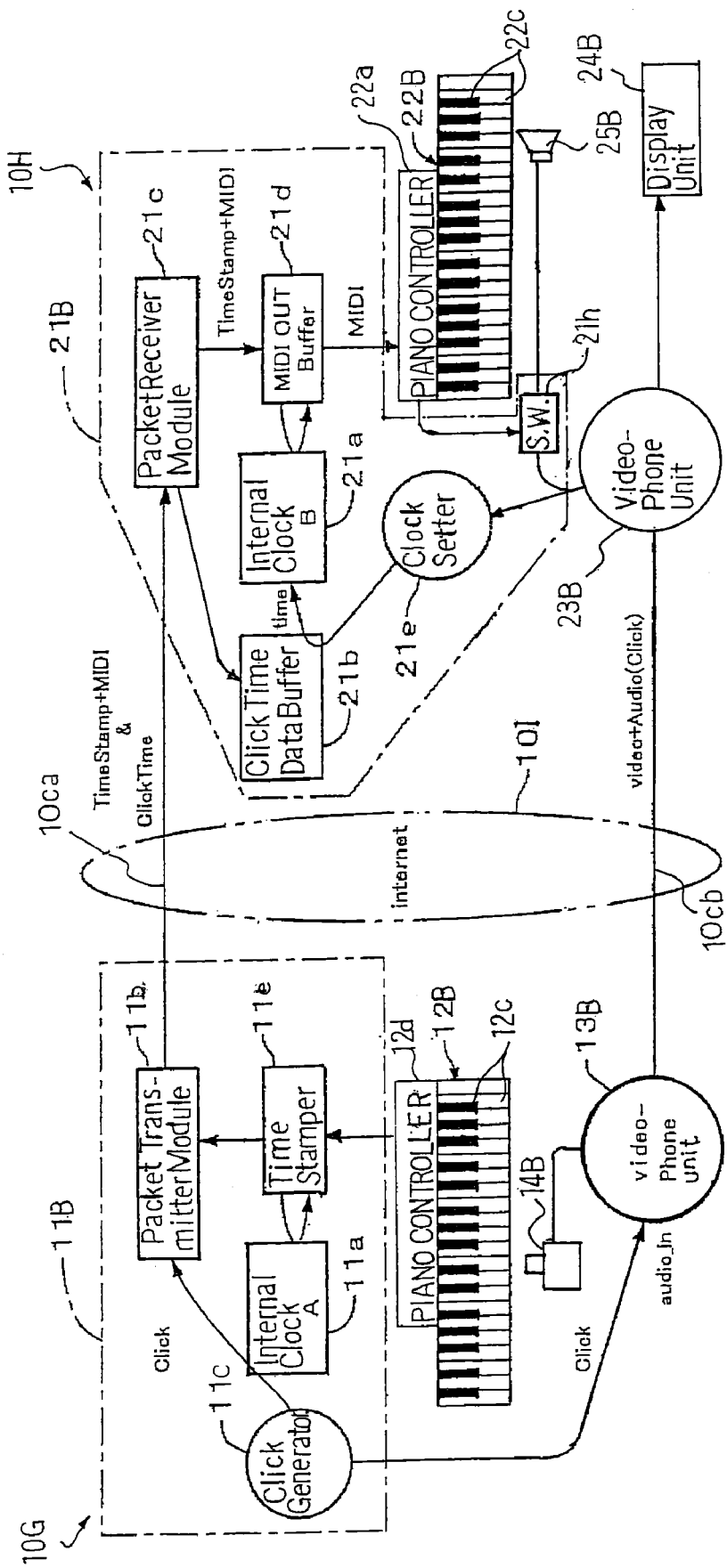
FIG. 24 is a schematic view showing the system configuration of yet another music education support system according to the present invention.

Turning to FIG. 24 of the drawings, yet another music education support system embodying the present invention largely comprises an audio-visual station 10G, another audio-visual station 10H and communication channels 10I. The music education support system is available for remote lessons. The audio-visual stations 10G and 10H are respectively assigned to a tutor and a trainee. Of course, more than one audio-visual stations may be assigned to plural trainees.

The audio-visual station 10G includes a controller 11B, an automatic player piano 12B, a videophone 13B and a movie camera/microphone 14B. Similarly, the other audio-visual station 10H includes a controller 21B, an automatic player piano 22B, a videophone 23B, a display unit 24B and a sound system 25B. Loudspeakers are incorporated in the sound system 25B. The controller 11B is connected through the communication channels 10I to the controller 21B, and MIDI music data codes/time stamp data codes/click time data codes and a digital mixed signal are separately supplied from the controller/videophone 11B/13B through the communication channels 10I to the controller 21B/videophone 23B. In this instance, the Internet offers the communication channels 10I to the music education support system.

The tutor sits on a stool in front of the automatic player piano 12B for fingering a music passage on the keys 12c, and the movie camera/microphone 14B/13B is directed to the tutor's hands on the keys 12c. While the tutor is fingering a music passage on the keys 12c, the automatic player piano 12B produces MIDI music data codes, and the tutor's hands on the keys 12c and tutor's oral directions are picked up through the movie camera/microphone. The controller 11B imprints the MIDI music data codes with time stamps, and timing data codes are added to the MIDI music data codes/ time stamp data codes. On the other hand, a timing signal is mixed with the audio-visual signal, and are converted to the digital mixed signal. The timing data codes are produced concurrently with the timing signal, and the MIDI music data codes/time stamp data codes/timing data codes and digital mixed signal are transmitted through the communication channels to the controller 21B/videophone unit 23B, respectively. The controller 21B makes the MIDI music data codes synchronized with the audio-visual data codes by using the timing signal/timing data codes, and supplies the MIDI music data codes to the automatic player piano 22B at proper timing synchronously with the audio visual data codes supplied to the display unit 24B and sound system 25B. The automatic player piano 22B gives the exhibition to the trainee. The trainee sees real images of tutor's hands reproduced on the display unit 24B, and hears the oral directions through the sound system 25B.

Figure 25:
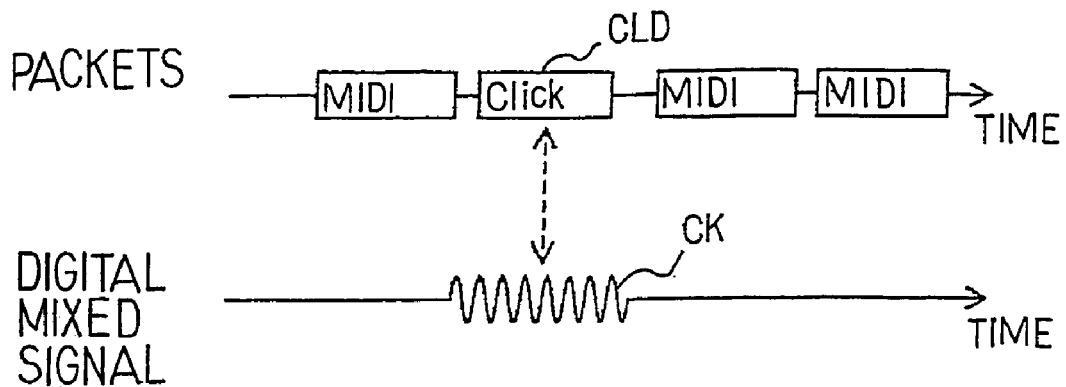
FIG. 25 is a waveform diagram showing a click signal concurrently produced with a click time data code.

In this instance, click time data codes CLD serve as the timing data codes, and a click signal CK, which is a periodical signal, serves as the timing signal as shown in FIG. 25. The controllers 11B/21B are implemented by personal computer systems, respectively. The controller 11B runs on a computer program so as to accomplish functions of an internal clock "A" 11a, a time stamper 11e, a packet transmitter module 11b and a click generator 11c. Similarly, the controller 21B runs on a computer program so as to accomplish functions of an internal clock "B" 21a, a packet receiver module 21c, a clock setter 21e and a switching module 21h. A click time data buffer 21b and a MIDI out buffer 21d are defined in a working memory incorporated in the personal computer system 21B.

The automatic player piano 12B includes a piano controller 12d, and the other automatic player piano 22B also includes a piano controller 22a. An array of key sensors, a data processor and key actuators are incorporated in the piano controller 12d, and corresponding components and a tone generator are incorporated in the other piano controller 22a.

While the tutor is fingering a music passage on the keys 12c, the key sensors reports the key motion to the data processor, and the data processor produces the MIDI music data codes representative of the note-on events and the MIDI music data codes representative of the note-off events. The piano controller 12d transfers the MIDI music data codes to the controller 11B, and the controller 11B transmits the MIDI music data codes imprinted with the stamp time through the communication channel 10ca to the controller 21B. The time stamper 11e reads the time from the internal clock "A" 11a, and imprints the MIDI music data codes with the time. The MIDI music data codes and associated time stamp data codes are intermittently supplied to the automatic player piano 22B, and the data processor reproduces the key motion through the key actuators. Otherwise, the data processor supplies the MIDI music data codes to the tone generator. A waveform memory is incorporated in the tone generator, and the tone generator produces an audio signal from the pieces of waveform data. A MIDI music data code expresses a program change, and the tone generator gives the timbre of piano to the electronic tones. The digital audio signal is transferred through the switching module 21h to the sound system, and is converted to electronic tones. The switching module 21h monitors the digital audio signal so as to detect the loudness of the electronic tones.

When the tutor starts the lesson, the internal clock "A" 11a starts to measure the lapse of time, and the click generator 11c starts to cause the click to occur at regular intervals. The click generator 11c supplies the click signal CK to the videophone unit 13B at every click, and checks the internal clock "A" 11a for the time read on the internal clock "A" 11a so that the click time data code CLD indicative of the read time is supplied to the packet transmitter module 11b concurrently with the transfer of the click signal CK. Thus, every click signal CK is paired with the click time data code CLD as shown in FIG. 25.

The MIDI music data codes/associated time stamp data codes and click time data codes are loaded in the packets through the packet transmitter module 11b. Since the different control codes are assigned to the MIDI music data codes/associated time stamp data codes and click time data codes, the packet receiver module 21c easily discriminates the click time data codes from the MIDI music data codes/associated time stamp data codes.

On the other hand, whenever the videophone unit 13B receives the click signal CK, the videophone unit 13B mixes the click signal CK with the audio signal. The audio signal is a monaural signal, and a frequency, which seldom takes place in the monaural voice signal, is assigned to the click signal CK. The frequency assigned to the click signal CK may be of the order of 40 Hz. The video signal is also supplied to the videophone unit 13B. The videophone unit 13B compresses them to the digital mixed signal, and transmits it to the videophone unit 23B through the communication channel 10cb of the teleconference system. The click signal may be separated from the digital mixed signal through a suitable filter.

The packets intermittently arrive at the controller 21B. When the packet or packets arrive at the controller 21B, the packet receiver module 21c checks the payload to see what sort of data codes is unloaded. When the MIDI music data codes/time stamp data code are found, the packet receiver module 21c transfers the MIDI music data codes/time stamp data code to the MIDI out buffer 21d, and stores them therein. On the other hand, when the packet receiver module 21c finds the click time data code, the packet receiver module 21c transfers the click time data code to the click time data buffer 21b, and stores it therein.

On the other hand, the videophone unit 23B receives the digital mixed signal. The click signal CK is separated from the digital mixed signal, and supplies a detecting signal to the clock setter 21e. Then, the clock setter 21e carries out a setting work on the internal clock "B" 21a. Although the click signal CK is produced concurrently with the associated click time data code CLD, the communication channels 10ca/10cb introduce different time lags into the propagation of the packets and digital mixed signal. In other words, there is not any guarantee that the pair of click signal and click time data code concurrently arrive at the audio-visual station 10H. For this reason, the clock setting work is required.

Figure 26:
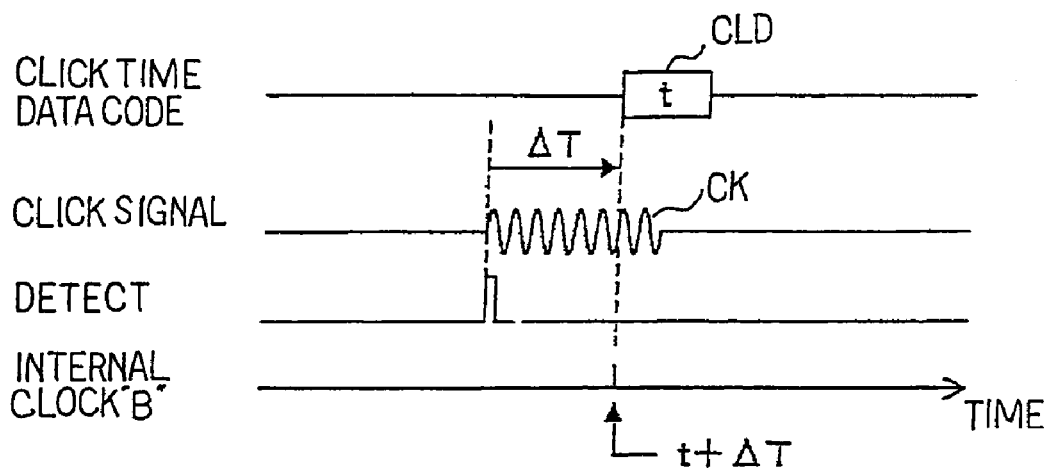
FIGS. 26A and 26B are waveform diagrams showing time lags between the click signal and the associated click time data code.
Figure 26:
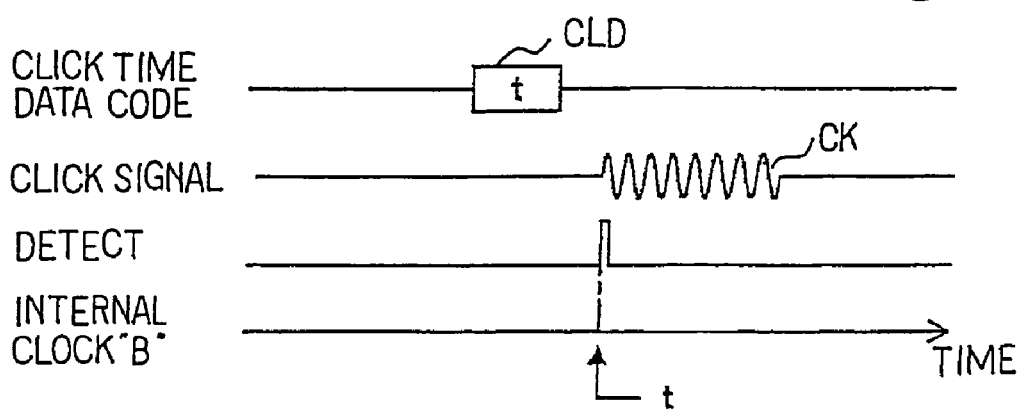

In detail, the click signal CK is assumed to arrive at the videophone unit 23B earlier than the associated click time data code CLD arrives at the packet receiver module 21c as shown in FIG. 26A. When the click signal CK arrives at the videophone unit 23B, the videophone unit 23B raises the detecting signal, and supplies the detecting signal to the clock setter 21e. Then, the clock setter 21e starts an internal timer, and gets ready to carry out the setting work on the internal clock "B" 21a. The click time data code CLD is assumed to reach the click time data buffer 21b delta-T later than the arrival time of the click signal CK. The click time, which is written in the click time data code CLD, is "t". If the delta-T is shorter than the certain time period, the clock setter 21e sets the internal clock "B" 21a with the sum of the click time and time lag, i.e., (t+delta-T). Thus, the clock setter 21e makes the internal clock "B" 21a synchronized with the internal clock "A" 11a. The certain time period is predetermined, and the regular intervals of the click signal CK is taken into account. If, on the other hand, any click time data code is not found in the click time data buffer 21b within the certain time period, the clock setter 21e abandons the setting work.

The click time data code CLD is assumed to arrive at the packet receiver module 21c earlier than the click signal CK reaches the videophone unit 23B as shown in FIG. 26B. The click time data code CLD is stored in the click time data buffer 21b, and starts an internal timer. The click time is "t". If the click signal arrives at the videophone unit 23B within a certain time period, the videophone unit 23B supplies the detecting signal to the clock setter 21e, and the clock setter 21e sets the internal timer "B" 21a with the click time "t". If, on the other hand, any click signal does not arrive at the videophone unit 23B within the certain time period, the clock setter 21e abandons the setting work, and eliminates the click time data code CLD from the click time data buffer 21b.

The certain time period is different between the teleconference system and a streaming system. Although the time lag on the communication channel 10ca is varied in dependence on the congestion, the time lag is fallen within the range between 10 milliseconds and 100 milliseconds.

In case where the teleconference system is employed in the music education support system, the digital mixed signal is delayed by 200-300 milliseconds. If the click time data code CLD reaches the controller 21B earlier than the click signal CK arrives at the videophone unit 23B as shown in FIG. 26B, the certain time period is estimated at the difference between the minimum time lag on the communication channel 10ca, i.e., 10 milliseconds and the maximum time lag on the other communication channel 10cb, i.e., 300 milliseconds. Thus, the certain time period is about (300+alpha) milliseconds where alpha ranges from tens milliseconds to 200 milliseconds. Alpha is a margin against abnormal state. On the other hand, if the click time data code CLD reaches the controller 21B later than the click signal CK arrives at the videophone unit 23B as shown in FIG. 26A, the delay on the communication channel 10ca is unusual. The allowable time delay on the communication channel 10ca is assumed to be 300 milliseconds, and the certain time period is estimated at the difference between the allowable time delay and the minimum time lag on the communication channel 10cb, i.e., 200 milliseconds. Thus, the certain time period is about (300-200) milliseconds, i.e., 100 milliseconds. However, the delay of the click time data code is unusual. The audio-visual station 10H may recommend the tutor M1 to stop the lesson.

In case where the streaming system is employed in the music education support system, the time lag on the communication channel 10cb ranges from 15 seconds to 30 seconds. Thus, the time lag through the streaming system is much longer than that through the teleconference system. For this reason, it is rare that the click time data code CLD is delayed from the click signal CK, and the MIDI music data codes would not be processed in the controller 21B. The certain time period may be zero. When the click time data code CLD reaches the controller 21B earlier than the click signal CK arrives at the videophone unit 23B, the clock setter 21e carries out the setting work on the internal clock "B" 21a. Since the time lag on the communication channel 10cb is much longer than the time lag on the other communication channel 10ca is, the certain time period is abound (30+beta) seconds where beta is of the order of several seconds. Beta is also a margin against abnormal state.

As described hereinbefore, when the certain time period is designed, the regular intervals of the click signal CK is taken into account of. In case where the teleconference system is employed in the music education support system, the time lag on the communication channel 10cb ranges between 200 milliseconds and 300 milliseconds so that the regular intervals are designed to be of the order of 2 seconds. The certain time period on the condition shown in FIG. 26B is referred to as "certain time period B", and the certain time period on the condition shown in FIG. 26A is referred to as "certain time period A". When the regular intervals are of the order of 2 seconds, the certain time period B may be of the order of 0.5 second, and the certain time period A may be of the order of 0.1 second. In case where the streaming system is employed in the music education support system, the time lag on the communication channel 10cb is estimated at 5-20 seconds, and the regular intervals of the click signal CK may be designed to be of the order of 30 seconds. The certain time period B may be of the order of 25 seconds, and the certain time period A may be zero.

Figure 27:
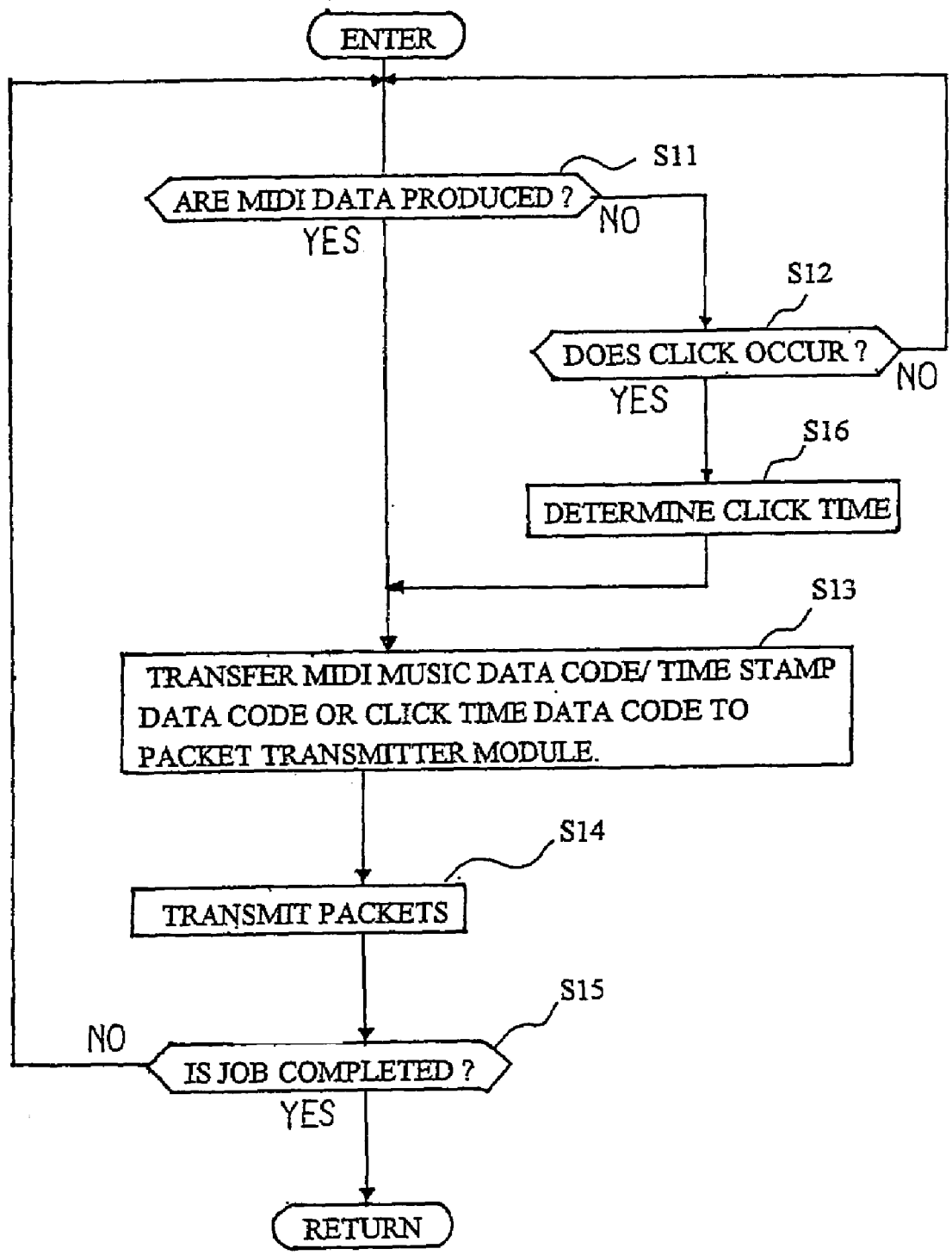
FIG. 27 is a flowchart showing a computer program on which a controller of the audio-visual station runs.

Description is hereinafter made on the computer programs executed by the personal computer systems 11B and 21B. The microprocessor, which forms a part of the personal computer system 11B, periodically enters a subroutine program shown in FIG. 27, and reiterates the loop consisting of steps S11 to S16.

The microprocessor firstly checks the interface between the personal computer system 11B and the automatic player piano 12B to see whether or not a MIDI music data code or codes arrive there at as by step S11. Whenever the tutor M1 depresses or releases the key or keys 12c, the piano controller 12a produces the MIDI music data code or codes, and supplies the MIDI music data codes to the controller 21B. The time stamper 11e imprints the MIDI music data code or codes with the stamp time, and the answer at step S11 is given affirmative. With the positive answer at step S11, the microprocessor proceeds to step S13, and transfers the MIDI music data code or codes/associated time stamp data codes to the packet transmitter module 11b. The packet transmitter module 11b transmits the MIDI music data code or codes/associated time stamp data code through the communication channel 10ca to the controller 21B as the payload of the packet or packets as by step S14.

On the other hand, if the tutor M1 does not change the key state, the answer at step S11 is given negative, and the microprocessor checks the working memory to see whether or not the click generator 11c has stored the click time data code therein as by step S12. When the click occurs, the click generator 11c checks the internal clock "A" 11a to see what time the internal clock "A" 11a points to, and produces the click time data code as by Step S16. The click time data code is stored in the working memory. In this situation, the answer at step S12 is given affirmative. Then, the microprocessor transfers the click time data code to the packet transmitter module 11b at step S13, and the packet transmitter module 11b transmits the click time data code to the controller 21B as the payload of a packet at step S14.

If, on the other hand, the microprocessor does not find any click time data code, the answer at step S12 is given negative, and the microprocessor returns to step S11. Thus, the microprocessor reiterates the loop consisting of steps S11 and S12 until the answer at step S11 or S12 is changed to affirmative.

When the microprocessor completes the job at step S14, the microprocessor checks a flag assigned the tutor's instruction to see whether or not the tutor M1 completes the lesson as by step S15. While the tutor M1 is giving the lesson to the trainee M2, the answer at step S15 is given negative, and the microprocessor returns to step S11. Thus, the microprocessor reiterates the loop consisting of steps S11 to S16 until the tutor M1 completes the lesson. The videophone unit 13B transmits the digital mixed signal to the videophone unit 23B independently of the controller 11B.

When the tutor M1 completes the lesson, the answer at step S15 is given affirmative, and the microprocessor immediately returns to the main routine program.

Figure 28A:
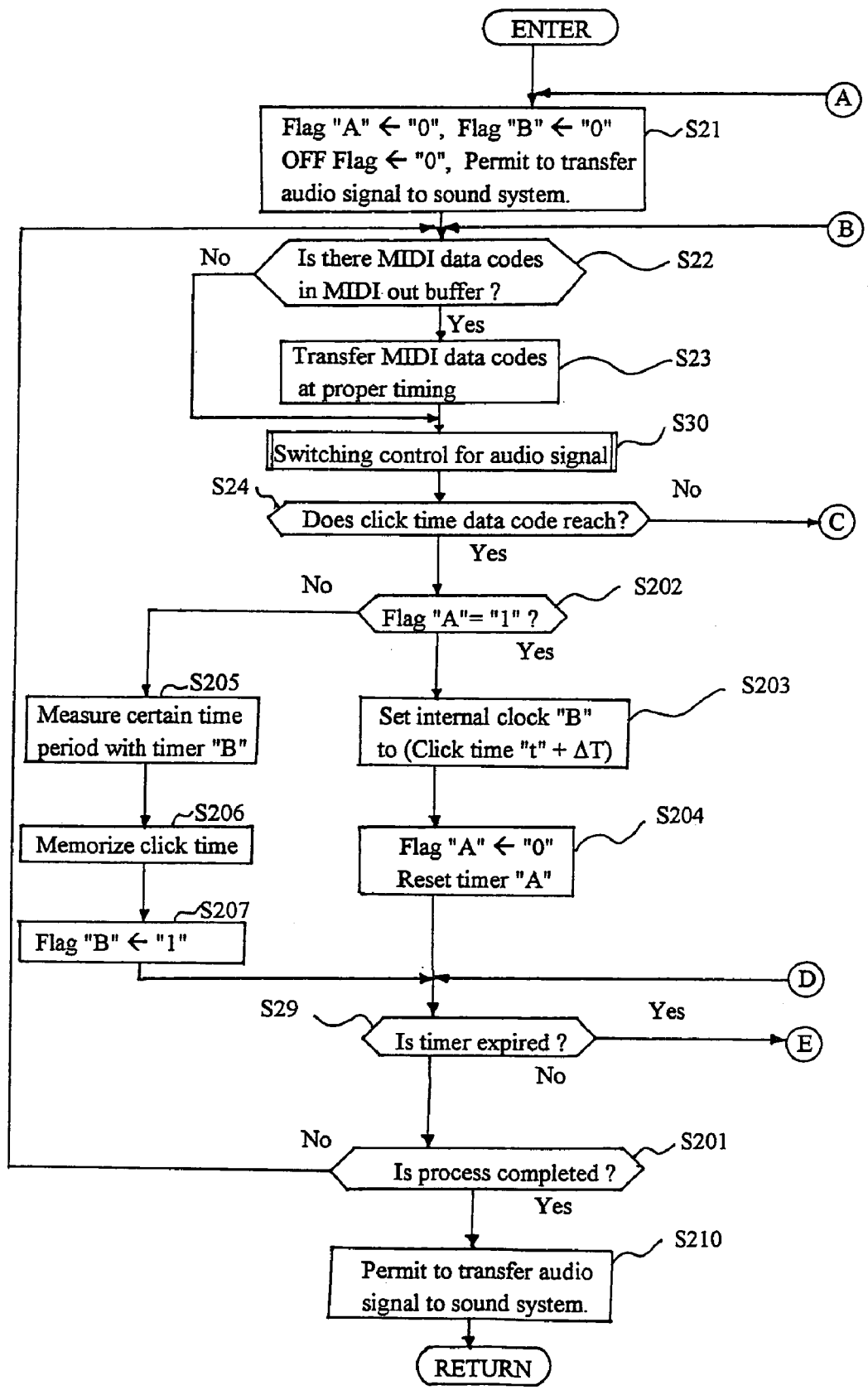
FIGS. 28A and 28B are flowcharts showing a computer program on which a controller of the other audio-visual station runs.
Figure 28:
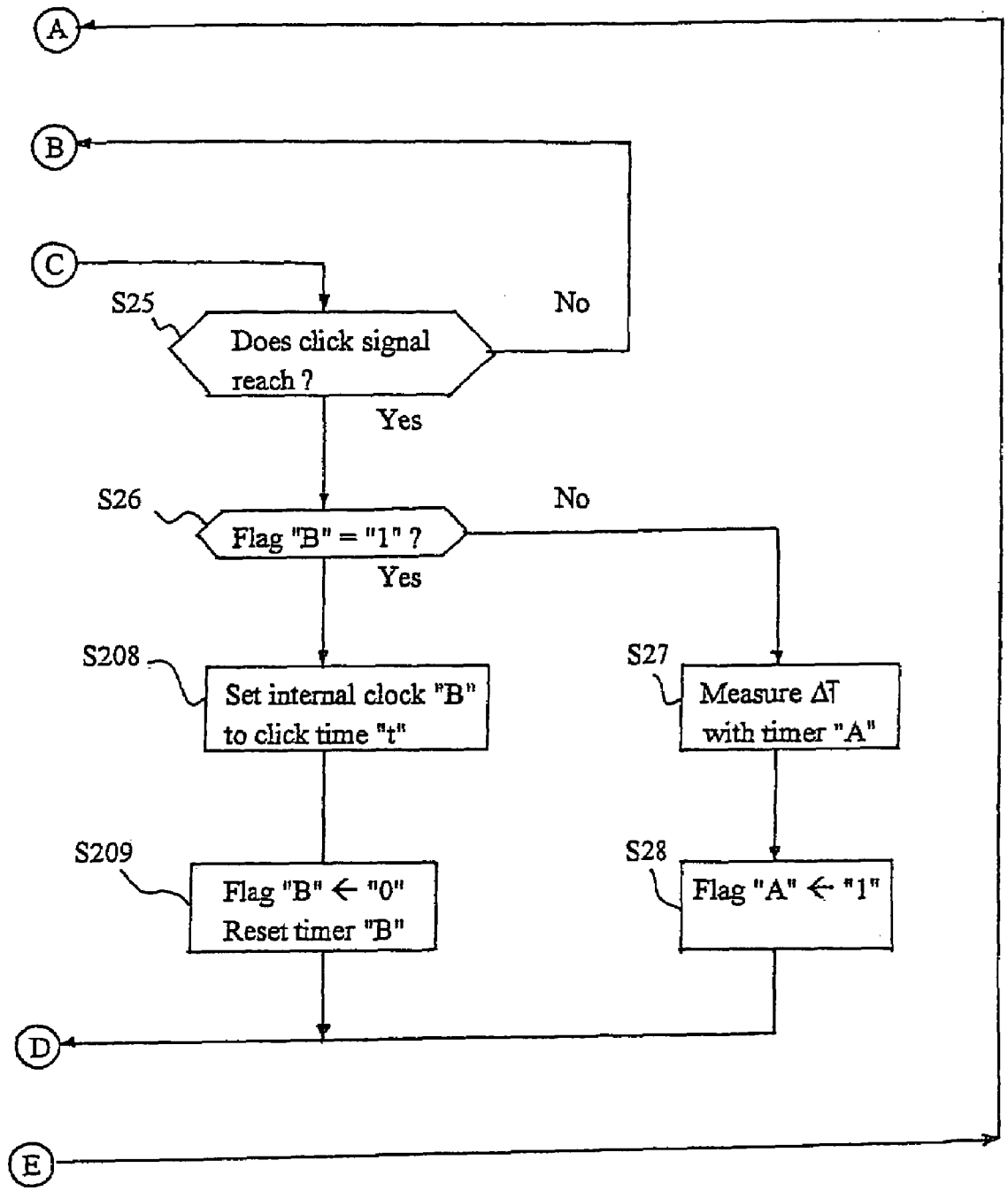

The microprocessor, which is incorporated in the controller 21B, runs on a subroutine program shown in FIGS. 28A and 28B so as to accomplish the jobs represented by the boxes 21a, 21c, 21e and 21h. The certain time period "A" is measured with a timer "A", and another timer "B" is used for the certain time period "B".

The microprocessor periodically enters the subroutine program, and reiterates the loop consisting of steps S21 to S30 and S201 to S210. The microprocessor firstly sets flags "A" and "B" and an OFF flag to zero, and permits the switching module 21h to transfer the audio signal to the sound system 25B as by step S21.

Subsequently, the microprocessor checks the MIDI out buffer 21d to see whether or not the MIDI music data code has been stored therein as by step S22. The microprocessor periodically enters another subroutine program for selectively storing the MIDI music data codes/time stamp data code and click time data code in the MIDI out buffer 21d and click time data buffer 21b.

When the microprocessor finds the MIDI music data code or codes and associated time stamp data code or codes, the answer at step S22 is given affirmative. The microprocessor determines the time at which the MIDI music data code or codes are to be supplied to the piano controller 22a, and timely transfers the MIDI music data code or codes to the piano controller 22a. Upon completion of the jobs at step S23, the microprocessor proceeds to step S30.

If, on the other hand, the microprocessor does not find any MIDI music data code in the MIDI out buffer 21d, the answer at step S22 is given negative, and the microprocessor directly proceeds to step S30. As will be described in hereinlater in detail, while the automatic player piano 22B is producing a piano tone or tones, the audio signal representative of tutor's oral directions is not supplied to the sound system 25B. The tutor's oral directions are reproduced through the sound system 25B in the silence of the automatic player piano 22B. The microprocessor, which is incorporated in the piano controller 22a, checks the loudness of the piano tones to be produced, and controls the switching module 21h at step S30.

Upon completion of the jobs at step S23, the microprocessor, which is incorporated in the controller 21B, checks the click time data buffer 21b to see whether or not the click time data code is stored therein as by step S24. If the microprocessor does not find any click time data code in the click time data buffer 21b, the answer at step S24 is given negative, and the microprocessor the working memory to see whether or not the videophone 23B notifies the microprocessor of the arrival of the click signal as by step S25. If the click signal has not reached, yet, the answer at step S25 is given negative, and the microprocessor returns to step S22. Thus, the microprocessor reiterates the loop consisting of steps S22, S23, S30, S24 and S25 until either click time data code or click signal reaches the audio-visual station 10H.

The click signal is assumed to reach the videophone unit 23B. Then, the answer at step S25 is given affirmative, and the microprocessor checks the flag "B" to see whether or not the click signal is delayed as by step S26. When the microprocessor finds the flag "B" to have been already changed to "1", the microprocessor determines that the click-signal is delayed from the associated click time data code, and sets the internal clock "B" with the click time data code as by step S208. Thus, the microprocessor, which serves as the clock setter 21e, adjusts the internal clock "B" to time "t". Subsequently, the microprocessor changes the flag "B" to zero, and resets the timer "B" to zero as by step S209. Upon completion of the jobs at step S209, the microprocessor proceeds to step S29.

If the microprocessor finds the flag "B" to be still zero at step S26, the answer at step S24 is given negative, and the microprocessor determines that the click time data code is delayed from the click signal. Then, the microprocessor starts the timer "A" as by step S27, and changes the flag "A" to 1 as by step S28. Upon completion of the job at step S28, the microprocessor proceeds to step S29.

When the microprocessor finds the click time data code in the click time data buffer 21b at step S24, the answer at step S24 is given affirmative, and the microprocessor checks the working memory to see whether or not the flag "A" is indicative of "1" as by step S202. When the flag "A" is indicative of zero, the microprocessor determines that the click time data code is delayed from the associated click signal, and adjusts the internal clock "B" 21a to (t+ÄT) as by step S203. Subsequently, the microprocessor changes the flag "A" to zero, and resets the timer "A" to zero as by step S204. Upon completion of the jobs at step S204, the microprocessor proceeds to step S29.

If the flag "A" is indicative of zero, the answer at step S202 is given negative, and the microprocessor determines that the click signal is delayed from the associated click time data code. Then, the microprocessor starts the timer "B" as by step S205, stores the click time data code in the click time data buffer 21b as by step S206, and changes the flag "B" to 1 as by step S207. Upon completion of the job at step S207, the microprocessor proceeds to step S29.

Although the timer "A" or timer "B" started to measure the lapse of time at step S27 or S205, there is not any guarantee that the associated click time data code or associated click signal reaches the audio-visual station 10H. The microprocessor checks the timer "A" or timer "B" to see whether or not the certain time period is expired as by step S29. If the associated click time data code or associated click signal has not reached the audio-visual station 10H before expiry of the certain time period, the answer at step S29 is given affirmative, and the microprocessor returns to step S21. This means that the microprocessor ignores the click signal or click time data code already reached. The microprocessor restarts the setting work after the next click time data code and associated click signal reaches the audio-visual'station 10H. Even though the microprocessor once skips the setting work, the time lag between the images of note bars and the rear images of tutor's hands is ignoreable.

On the other hand, if the timer "A" or "B" is indicative of a lapse of time shorter than the certain time period, the answer at step S29 is given negative, and the microprocessor checks the working memory to see whether or not the tutor instructs the music education support system to stop the lesson s by step S201. If the answer is given negative, the microprocessor returns to step S22, and continues the above-described sequence.

When the tutor stops the lesson, the answer at step S201 is given affirmative. Then, the microprocessor permits the switching module 21h to transfer the audio signal to the sound system as by step S210, and returns to the main routine program.

Figure 29:
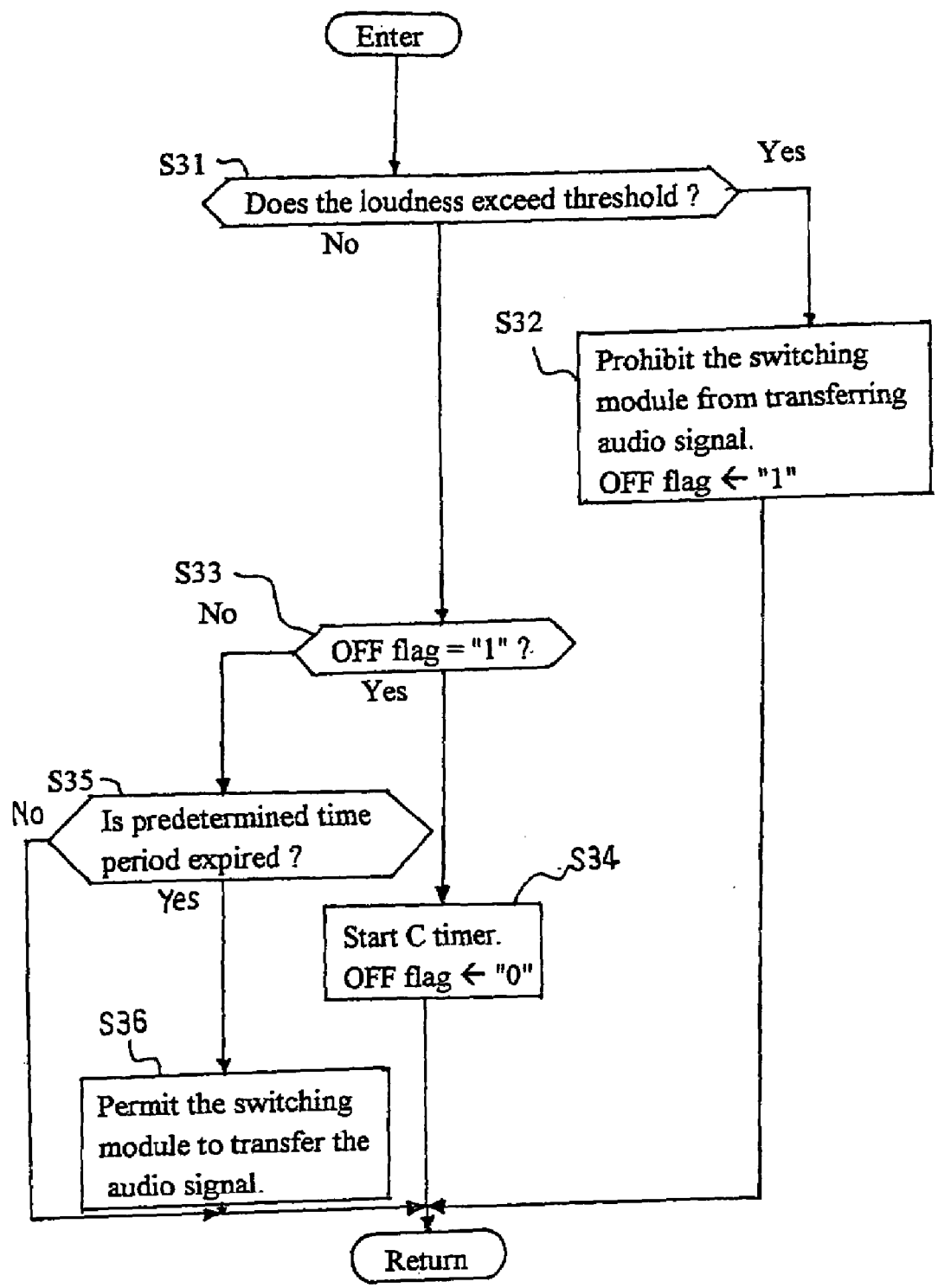
FIG. 29 is a flowchart showing a computer program on which a piano controller runs.

FIG. 29 shows a subroutine program for reproducing tutor's oral direction. The subroutine program is corresponding to step S30 in FIGS. 28A, and the microprocessor, which is incorporated in the piano controller 22a, periodically enters the subroutine program. Although the piano controller 22a selectively gives rise to key motion by means of the key actuators for producing the piano tones, it is known to skilled persons how the piano controller 22a processes the MIDI music data codes, and no further description is incorporated for the sake of simplicity.

When the microprocessor receives the MIDI music data code or codes from the controller 21B, the microprocessor produces an audio signal on the basis of the MIDI music data code or codes, and checks the audio signal to see whether or not the loudness exceeds a threshold as by step S31. The audio signal is only used for the comparison with the threshold, and any electronic tone is not produced from the audio signal. The threshold is equivalent to an extremely faint tone.

If the audio signal is rising or has been already raised, the answer at step S31 is given affirmative, the microprocessor prohibits the switching module 21h from transferring the audio signal to the sound system 25B, and changes the OFF flag to "1" as by step S32. As a result, even if the audio signal representative of the environment sound reaches the videophone unit 23B, the switching module 21h does not transfer the audio signal to the sound system, and the environment sound is not reproduced through the sound system. Thus, the trainee concentrates his or her ears to the piano tones produced through the automatic player piano 22B as the tutor's exhibition. Upon completion of the jobs at step 32, the microprocessor returns to the main routine program. Thus, while the automatic player piano 22B is producing the piano tone or tones, the microprocessor traces the route from step S31 to S32, and keeps the sound system 25B silent.

When the audio signal is decayed below the threshold, the answer at step S31 is given negative, and the microprocessor checks the working memory to see whether or not the OFF flag has been raised as by step S33. The answer at step S33 is given affirmative immediately after the decay of the audio signal. The microprocessor starts a timer "C", and takes down the OFF flag, i.e., changes the OFF flag to "0" as by step S34. Upon completion of the jobs at step S34, the microprocessor returns to the main routine program.

If the OFF flag has been already taken down, the answer at step S33 is given affirmative, and the microprocessor proceeds to step S35. The microprocessor checks the timer "C" to see whether or not a predetermined time period is expired at step S35. The predetermined time period may be several seconds. If the answer is given negative, the microprocessor returns to the main routine program. Thus, while the timer "C" is measuring the predetermined time period, and the microprocessor still keeps the switching module 21h in the off state, and makes the trainee concentrate herself or himself to the automatic player piano 22B.

Upon expiry of the predetermined time period, the answer at step S35 is given affirmative. Then, the microprocessor changes the switching module 21h to the on-state, and permits the audio signal to reach the sound system 25B as by step S36. Then, the tutor's oral directions are produced through the sound system 25B, and the trainee devotes his or her attention to the oral directions.

Although description on the display unit 22B is omitted, the real images of tutor's hands on the keys 12c are produced on the display unit 22B as similar to those of the first and second embodiments.

As will be understood from the foregoing description, the music education support system according to the present invention stops the oral directions during the tutor's exhibition, and transfers the tutor's oral directions during the silence of the automatic player piano 22B. This feature is desirable, because the trainee concentrates his or her efforts selectively on the exhibition and the oral directions.

It is possible for the piano controller 22a to permit the sound system 25B to produce the oral directions before reaching the MIDI music data codes representative of the note-off event, because the piano controller 22a monitors the audio signal. Thus, the piano controller 22a permits the tutor to give the oral directions to the trainee as much as possible.

Although particular embodiments of the present invention have been shown and described, it will be apparent to those skilled in the art that various changes and modifications may be made without departing from the spirit and scope of the present invention.

Modification of the First and Second Embodiments

For example, the electronic keyboards 12/24 do not set any limit on the technical scope of the present invention. Any sort of musical instrument is available on the audio-visual stations 10A/10B in so far as the musical instrument on the audio-visual station 10A can produce music data codes indicative of the pitch names. A tutor may produce the MIDI music data codes and time stamp data codes through a personal computer system where a suitable computer programs have been already installed. The electronic keyboard 12 may be replaced with a sequencer with built-in time stamper. The trainee M2 may practice another sort of musical instrument such as, for example, a trumpet or a stringed instrument. In this instance, the real images of these musical instruments are produced on the display unit 22.

The real images of tutor's feet on the pedals may be further produced on the display unit 22.

Only the video signal and click signal may be mixed into the digital mixed signal. In other words, the microphone may be not incorporated in the audio-visual station 10A/10D. In this instance, the images of note bars are produced together with the real images of tutor's hands on the keys 12c, and the trainee practices the fingering under the guidance of the real images and images of note bars.

The real-time lesson does not set any limit to the technical scope of the present invention. The digital mixed signal and the MIDI music data codes/time stamp data codes/click time data codes may be stored in a suitable information storage medium. In this instance, when a trainee wishes to take the lesson, the digital mixed signal and the MIDI music data codes/time stamp data codes/click time data codes are supplies from the information storage medium to the controller 21 and videophone 23.

The Internet does not set any limit to the technical scope of the present invention. The audio-visual station 10A may be connected to plural audio-visual stations 10B through a local area network.

The music education support system does not set any limit to the technical scope of the present invention. The audio-visual system is available for a remote concert. While a musician is playing a piece of music on the electronic keyboard, the movie camera picks up the musician, and the MIDI music data codes/time stamp data code/click time data codes and digital mixed signal are supplied from the audio-visual station 10A to the other audio-visual station 10B through the communication channels 10ca and 10cb. The MIDI music data codes are supplied from the controller 21 to an automatic player piano, and the audio-visual data codes are supplied to the display driver 21g synchronously with the MIDI music data codes. The acoustic piano tones are reproduced through the automatic player piano synchronously with the picture produced on a screen.

The real images of tutor's hands on the keys do not set any limit on the technical scope of the present invention. The movie camera picks up a dancer or dancers performed on a stage, and the piece of music on the stage is converted to the MIDI music data codes. The real images of dancer or dancers are transmitted through the communication channel 10cb to the videophone unit 23/23A, and are reproduced on a screen. The MIDI music data codes are transmitted through the other communication channel, and the piece of music is reproduced through a suitable musical instrument or instruments. The click time data codes and click signal make the real images and piece of music synchronized with one another.

The images of note bars do not set any limit on the technical scope of the present invention. When the timing at which the trainee is expected to depress keys comes, images of suitable marks may be produced in the vicinity of the keys or overlapped with the images of keys. If the marks previously appear in the scene, the color of marks may be changed at the time when the trainee is expected to depress the keys.

The two areas G1/G2 do not set any limit to the technical scope of the present invention. The real images, images of note bars and character images of tutor's messages may be produced in more than two areas.

The movie camera/microphone may be replaced with a video player. In this instance, a movie picture is supplied from the video player, and is mixed with the click signal before the transmission through the communication channel 10cb.

The digital mixed signal does not set any limit to the technical scope of the present invention. In case where the right and left channel signals are handled, it is possible to transmit the audio visual signal and click signal as the right channel signal and left channel signal. If the click signal is produced at a frequency which seldom takes place in the voice/picture, the low frequency range and high frequency range may be assigned to the click signal and the audio-visual signal, respectively.

The controller 11 may supply the click signal to the controller 21 before the lesson. In this instance, the controller 21 analyzes the click signal so as to determine the certain time periods on the basis of the intervals of the click signals.

The waveform of the click signal does not set any limit to the technical scope of the present invention. Any periodical signal is available for the audio-visual system according to the present invention in so far as the periodical signal is discriminative from the audio-visual signal.

In another music education support system according to the present invention, the MIDI music data codes may be supplied to the electronic keyboard 24 so as to produce the electronic tones.

The lapse of time from the previous MIDI music data code may be given to each MIDI music data code. In this instance, the clock 12b is replaced with a timer which measures the lapse of time from the previous MIDI music data code. In this instance, it is possible to convert them to the lapse of time from the initiation of the lesson. For example, the lapse of time may be accumulated so as to be converted to the lapse of time from the initiation of the lesson.

The fingering of the trainee M2 may be imaged in the screen. For example, while the trainee M2 is depressing the keys, the display driver 21g raises images of bars from the boundary between the area G1 and the area G2 over the depressed keys. The images of bars may be scrolled upwardly.

The images of note bars may express the key velocity, i.e., the loudness of the tones. For example, the images of note bars are differently colored depending upon the key velocity. Otherwise, the different symbols may be added to the images of note bars depending upon the key velocity.

In the first embodiment, the click time data code is added to each MIDI music data code. In a modification, when plural events concurrently take place, the controller 11 adds the click time data code to one of the MIDI music data codes firstly transmitted to the controller 21. The controller 21 checks the MIDI out buffer 21d to see whether or not there is a MIDI music data code which is not accompanied with any click time data code. If the controller 21 finds it, the controller interprets that the MIDI music data codes were produced concurrently with the previous MIDI music data code accompanied with the click time data code so as to determine the length of the image of note bar. Thus, some steps such as step S36 and S301 in the computer program shown in FIG. 8 is to be slightly modified.

The single display unit 22/22A do not set any limit on the technical scope of the present invention. The real images of tutor's hands on the keys and images of note bars may be separately produced on more than one display unit in so far as the real images of tutor's hands and images of note bars are correlated with each other. For example, the images of note bars are projected from a suitable projector onto the display unit where the real images are produced.

If MIDI music data codes are transferred between the audio-visual stations close to one another within an extremely short time period, the visual images will be synchronized with the data processing on MIDI music data codes in so far as a large number of MIDI music data codes are not concurrently produced on the transmitter side. In other words, a MIDI cable is available for the audio-visual system. However, in case where a large number of MIDI music data codes are concurrently produced, a time lag tends to occur due to the serial data transmission at the low rate through the MIDI cable so that the images of note bars are liable to be delayed from the images of tutor's hands on the keys. In this situation, the click time data codes and click signal are effective against the time lag. Thus, the present invention is applicable to the system in which the MIDI cable is used.

Modifications of the Third Embodiment

The automatic player pianos 12B/22B may be replaced with another sort of musical instrument such as, for example, electric keyboards and electronic strings. Otherwise, the oral directions are given to the trainee through a personal computer system or the sound system 25B.

The piano controller 22a may change the switching module 21h between the on-state and the off-state on the basis of the MIDI music data codes. The controller 21B may checks the MIDI music data codes to be whether or not the loudness exceeds the threshold. In this instance, the controller 21B directly controls the switching module 21h.

In case where the videophone unit 13B communicates with the videophone unit 23B through the right and left channels, the oral directions and the click signal may be separately transmitted through the right and left channels.

The concept of the third embodiment may be applied to the prior art music education support system disclosed in Japanese Patent Application laid-open No. Hei 7-199790. In the prior art music education support system, the electric keyboard of a tutor is connected to the electric keyboards of pupils, and the tutor gives oral directions from the microphone to the headphones. The MIDI music data codes are supplied from the tutor's electric keyboard or automatic player piano to the pupil's electric keyboard or automatic player pianos, and the controller stops the oral directions in the tutor's exhibition. Thus, the remote lesson does not set any limit to the technical scope of the present invention.

The music education support system does not set any limit to the technical scope of the present invention. A concert may be carried out on the audio-visual station 10G, and the MIDI music data codes and voice messages are supplied to the other audio-visual station 10H. In this instance, while the music is produced through the automatic player piano or other sort of musical instrument on the audio-visual station 10G, any voice message does not reach the audience near the other audio-visual station.

Moreover, the lesson may have been already recorded in a suitable information storage medium. In this instance, the MIDI music data codes/time stamp data codes, click time data codes and digital mixed signal are supplied from the recorder to the audio-visual station 10H.

The oral directions may be controlled through the audio-visual station 10G. In this instance, while the MIDI music data codes are transmitted from the audio-visual station 10G to the other audio-visual station 10H, the videophone unit 13B does not mix the audio signal representative of tutor's oral directions with the video signal and click signal. In case where the lesson is recorded in a suitable information storage medium, the recorder may records the oral directions on the condition that the MIDI music data codes do not reach there.

The controller 21B may further include the display controller 21g so as to produce the images of note bars on the display unit 22B. Of course, the real images of tutor's hands on the keys 12c may be produced in the lower area, and the images of note bars are produced on the upper area in correlation with each other as similar to the first and second embodiments.

Claim languages are correlated with the system components of the embodiments as follows. Each of the audio-visual stations 10B/10E is corresponding to a "music station". The images of note bars and real images of tutor's hands on the keys 12c are corresponding to "visual-images of tones" and "visual images of a performance", respectively. "Pieces of music data" and "pieces of video data" are carried through the MIDI music data codes and audio-visual signal or video signal. "Pieces of first timing data" and "pieces of second timing data" are carried through the click time data codes and click signal, respectively. The packet receiver module 21c and videophone unit 23/23A serve as a "receiver" and another "receiver", respectively. The internal clock "B" 21a, click time data buffer 21b, MIDI out buffer 21d and clock setter 21e as a whole constitute a "timing adjuster". The area G1 and area G2 serve as "two image producing areas".

The timing generator 21f and internal clock "B" 21a as a whole constitute a "timing generator". The communication channels 10ca and 10cb form parts of a "communication system". The oral directions are corresponding to "voice". The automatic player piano 22B except for the piano controller serves as a "tone generating system", and the sound system, which includes the loud speakers, is corresponding to a "signal-to-sound converter".

What is claimed is:

1. A music station for producing visual images of tones to be produced together with visual images of a performance, comprising:

a receiver connected to a communication channel, and receiving pieces of music data representative of said tones to be produced and pieces of first timing data mixed with said pieces of music data;

another receiver connected to another communication channel independent of said communication channel, and receiving pieces of video data representative of said performance carried out in synchronism with said tones produced at another station remote from said music station and pieces of second timing data mixed with said pieces of video data and delivered to said another communication channel concurrently with the delivery of said pieces of first timing data to said communication channel, respectively;

a timing adjuster connected to said receiver and said another receiver, and eliminating a time lag from between each of said pieces of first timing data and associated one of said pieces of second timing data so as to establish said pieces of video data and said pieces of music data in synchronization with one another;

a display unit having plural image producing areas at least two of which are assigned to visual images of said performance and visual images of said tones, respectively; and a display driver connected to said receiver, said another receiver and said display unit, producing an image-carrying signal representative of said visual images of said performance and another image-carrying signal representative of said visual images of said tones, and supplying said image-carrying signal and said another image-carrying signal to said display unit so that said visual images of said performance and said visual images of said tones are produced in the at least two areas, respectively, in correlation with one another.

2. The music station as set forth in claim 1, in which said communication channel and said another communication channel introduce another time lag and yet another time lag into a transmission of said pieces of music data and said pieces of first timing data and a transmission of said pieces of video data and said pieces of second timing data, respectively, and said another time lag is different from said yet another time lag so that said timing adjuster eliminates the difference between said another time lag and said yet another time lag from between the reception of said pieces of music data and said pieces of first timing data and the reception of said pieces of video data and said pieces of second timing data as said time lag.

3. The music station as set forth in claim 2, in which said timing adjuster includes an internal clock measuring a lapse of time, and a clock setter for setting said internal clock with a proper time determined on the basis of a time indicated by each piece of first timing data and said time lag.

4. The music station as set forth in claim 1, in which said pieces of video data are representative of visual images of hands over visual images of manipulators selectively manipulated with visual images of the fingers of said hands in a similar manner to the fingers of a human player, and said visual images produced on the basis of said pieces of said music data are indicative of pitches of said tones to be produced through the manipulation on said manipulators.

5. The music station as set forth in claim 4, in which said visual images of said tones appear in the image producing area before associated manipulators of a musical instrument are manipulated, and are moved toward the visual images of said associated manipulators assigned the pitches identical with said pitches represented by said pieces of music data so as to indicate said pitches of said tones to be produced.

6. The music station as set forth in claim 4, in which said visual images of said tones are further indicative of time periods over which said associated manipulators of said musical instrument are to be manipulated.

7. The music station as set forth in claim 6, in which said visual images of said tones become smaller with time, and disappear from the image producing area when said associated manipulators of said musical instrument are to be released.

8. The music station as set forth in claim 4, in which said visual images of said tones are further indicative of timings at which the associated manipulators of said musical instrument are to be manipulated.

9. The music station as set forth in claim 8, in which said visual images of said tones are moved toward the visual images of the associated manipulators, and reach said visual images of said associated manipulators when said associated manipulators of said musical instrument are to be manipulated.

10. The music station as set forth in claim 8, in which said visual images of said tones are further indicative of time periods over which the associated manipulators of said musical instrument are to be manipulated, and disappear at said visual images of said associated manipulators when said associated manipulators of said musical instrument are to be released.

11. The music station as set forth in claim 1, in which said display driver periodically renews a scene where said images of said tones are produced so that said visual images of said tones are moved toward visual images of manipulators assigned pitches identical with pitches represented by said pieces of music data as if said scene is scrolled.

12. The music station as set forth in claim 11, in which said display driver successively changes the size of said visual images of said tones while the associated manipulators of said musical instrument are being manipulated.

13. A music station for producing visual images of tones, comprising:
  a receiver connected to a communication channel, and receiving pieces of music data representative of said tones to be produced and pieces of time data each representative of a time at which associated one of said tones is to be produced;
  a display unit having an image producing area where said visual images of said tones are to be produced;
  a timing generator connected to said receiver, and analyzing said pieces of time data so as to determine timings at which said visual images of said tones appear in said image producing area on said display unit;
  a memory storing pieces of visual data expressing said visual images; and
  a display driver connected to said receiver, said timing generator, said memory and said display unit, producing an image-carrying signal representative of said visual images of said tones on the basis of said pieces of visual data corresponding to said pieces of music data, and supplying said image-carrying signal to said display unit so as to produce said visual images of said tones in said image producing area on said display unit as if said visual images of said tone are produced at said timings
  another receiver connected to another communication channel independent of said communication channel and receiving pieces of video data representative of other visual images of hands over other visual images of manipulators selectively manipulated with other visual images of the fingers of said hands; and
  a timing adjuster connected to said receiver and said another receiver and eliminating a time lag between each of pieces of first timing data mixed with said pieces of music data and associated one of pieces of second timing data mixed with said pieces of video data so as to establish said pieces of video data and said pieces of music data in synchronization with one another,
  wherein said display driver further produces another image-carrying signal representative of said other visual images of said hands over said manipulators in another image producing area contiguous to said image producing area.

14. The music station as set forth in claim 13, in which said pieces of music data and said pieces of time data are serially transmitted through said communication channel to said receiver, and said display driver serially processes said pieces of music data in such a manner that said visual images of said tones are produced in a certain size in so far as said time data indicates that the corresponding tones are to be concurrently produced.

15. The music station as set forth in claim 14, in which said pieces of music data are respectively accompanied with said pieces of time data.

16. The music station as set forth in claim 14, in which one of said pieces of time data is shared among the pieces of music data to be concurrently produced.

17. The music station as set forth in claim 13, in which said visual images of tones are moved toward the other visual images of the associated manipulators assigned pitches identical with pitches of said tones represented by said pieces of music data.

18. A music station for producing a music passage of tones and voice, comprising:
  a receiver connected to a communication system, and receiving pieces of music data representative of said tones;
  a tone generating system connected to said receiver so as to produce said music passage of said tones;
  another receiver connected to said communication system, and receiving pieces of audio data representative of said voice for producing an audio signal;
  a signal-to-sound converter for converting said audio signal to said voice;
  a controller connected between said receiver and said tone generating system, and analyzing said tones to be produced to see whether or not a loudness of said tones exceeds a threshold for producing a control signal; and
  a switch connected between said another receiver and said signal-to-sound converter, and responsive to said control signal so as to interrupt said audio signal while said loudness is keeping over said threshold.

19. The music station as set forth in claim 18, in which said pieces of music data are representative of pitches of said tones and loudness of said tones, and said controller produces an audio signal on the basis of said pieces of music data for the analysis.

20. The music station as set forth in claim 18, in which said tone generating system is a musical instrument responsive to said pieces of music data for producing said tones, and said signal-to-sound converter includes a loud speaker system for producing said voice.

* * * * *